(12) United States Patent
Cole et al.

(10) Patent No.: US 10,331,657 B1
(45) Date of Patent: Jun. 25, 2019

(54) CONTENTION ANALYSIS FOR JOURNAL-BASED DATABASES

(71) Applicant: Amazon Technologies, Inc., Seattle, WA (US)

(72) Inventors: Timothy Daniel Cole, Seattle, WA (US); Artem Danilov, Kirkland, WA (US); Andrew Wayne Ross, Seattle, WA (US); John Michael Morkel, Seattle, WA (US); Tate Andrew Certain, Seattle, WA (US); Allan Henry Vermeulen, Corvallis, OR (US); Christopher Richard Jacques De Kadt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 859 days.

(21) Appl. No.: 14/868,267

(22) Filed: Sep. 28, 2015

(51) Int. Cl.
*G06F 16/30* (2019.01)
*G06F 16/23* (2019.01)
*G06F 16/901* (2019.01)
*G06F 16/2453* (2019.01)
*G06F 16/2455* (2019.01)

(52) U.S. Cl.
CPC ...... *G06F 16/2365* (2019.01); *G06F 16/2315* (2019.01); *G06F 16/2454* (2019.01); *G06F 16/24565* (2019.01); *G06F 16/901* (2019.01)

(58) Field of Classification Search
CPC .............. G06F 17/30371; G06F 17/30595
See application file for complete search history.

(56) References Cited

U.S. PATENT DOCUMENTS

| | | | |
|---|---|---|---|
| 5,132,954 A * | 7/1992 | Kulakowski | G11B 7/00745 369/275.3 |
| 5,335,343 A | 8/1994 | Lampson et al. | |
| 5,671,407 A | 9/1997 | Demers et al. | |
| 5,701,480 A | 12/1997 | Raz | |
| 7,127,716 B2 | 10/2006 | Jin et al. | |
| 7,430,740 B1 | 9/2008 | Molloy et al. | |
| 7,668,876 B1 | 2/2010 | Kulkarni | |
| 7,730,034 B1 | 6/2010 | Deflaux et al. | |
| 7,792,693 B2 | 9/2010 | Bultmeyer et al. | |
| 7,908,311 B2 | 3/2011 | O'Loughlin et al. | |
| 7,949,662 B2 | 5/2011 | Farber et al. | |
| 8,019,849 B1 | 9/2011 | Lopilato et al. | |

(Continued)

OTHER PUBLICATIONS

International Search Report and Written Opinion, dated Dec. 7, 2015, Amazon Technologies, Inc., pp. 1-11.

(Continued)

*Primary Examiner* — Mahesh H Dwivedi
(74) *Attorney, Agent, or Firm* — Robert C. Kowert; Meyertons, Hood, Kivlin, Kowert & Goetzel, P.C.

(57) ABSTRACT

An analytics tool of a journal-based multi-data-store database obtains respective rejection cause descriptors for a set of transactions rejected by the journal manager of the database due to read-write conflicts. A particular rejection cause descriptor indicates a query predicate used for a read set of a transaction request which was rejected by a journal manager of the database due to a read-write conflict between the read set and a previously-committed transaction. The analytics tool prepares a database contention analysis using the rejection cause descriptors, and transmits the analysis to a client.

20 Claims, 26 Drawing Sheets

(56) References Cited

U.S. PATENT DOCUMENTS

| | | | |
|---|---|---|---|
| 8,055,711 | B2 | 11/2011 | Fachan et al. |
| 8,078,582 | B2 | 12/2011 | Wang et al. |
| 8,108,343 | B2 | 1/2012 | Wang et al. |
| 8,209,213 | B2 | 6/2012 | Raisanen |
| 8,510,270 | B2 | 8/2013 | Pareek et al. |
| 8,548,945 | B2 | 10/2013 | Dwyer et al. |
| 8,650,155 | B2 | 2/2014 | Corbin et al. |
| 8,676,752 | B2 | 3/2014 | Kundu et al. |
| 9,990,391 | B1 * | 6/2018 | Cole ................ G06F 17/30371 |
| 2003/0217119 | A1 | 11/2003 | Raman et al. |
| 2005/0273527 | A1 | 12/2005 | Olstad et al. |
| 2007/0162516 | A1 | 7/2007 | Thiel et al. |
| 2009/0077164 | A1 | 3/2009 | Phillips et al. |
| 2010/0057826 | A1 | 3/2010 | Chow et al. |
| 2010/0174840 | A1 | 7/2010 | Blainey et al. |
| 2010/0332448 | A1 | 12/2010 | Holenstein et al. |
| 2011/0161391 | A1 | 6/2011 | Araujo et al. |
| 2011/0276977 | A1 | 11/2011 | van Velzen et al. |
| 2012/0079490 | A1 | 3/2012 | Bond et al. |
| 2012/0166407 | A1 | 6/2012 | Lee et al. |
| 2013/0042146 | A1 | 2/2013 | Unger et al. |
| 2014/0304380 | A1 | 10/2014 | Waas et al. |
| 2015/0378774 | A1 * | 12/2015 | Vermeulen .............. G06F 9/466 707/703 |
| 2016/0044520 | A1 | 2/2016 | Iyer et al. |
| 2016/0070589 | A1 * | 3/2016 | Vermeulen .............. G06F 9/466 711/153 |
| 2016/0180262 | A1 | 6/2016 | Brauer et al. |

OTHER PUBLICATIONS

U.S. Appl. No. 14/316,680, filed Jun. 26, 2014, Allan Henry Vermeulen.
U.S. Appl. No. 14/316,674, filed Jun. 26, 2014, Allan Henry Vermeulen et al.
U.S. Appl. No. 14/316,630, filed Jun. 26, 2014, Allan Henry Vermeulen.
U.S. Appl. No. 141491,454, filed Jun. 26, 2014, Allan Henry Vermeulen et al.
U.S. Appl. No. 14/316,622, filed Jun. 26, 2015, Allan Henry Vermeulen et al.
U.S. Appl. No. 141316,619, filed Jun. 26, 2015, Allan Henry Vermeulen.
U.S. Appl. No. 14/482,661, filed Sep. 10, 2014, Allan Henry Vermeulen.
U.S. Appl. No. 14/482,677, filed Sep. 10, 2014, Allan Henry Vermeulen et al.
U.S. Appl. No. 14/482,668, filed Sep. 10, 2014, Allan Henry Vermeulen et al.
U.S. Appl. No. 14/491,444, filed Sep. 19, 2014, Allan Henry Vermeulen et al.
U.S. Appl. No. 14/491,371, filed Sep. 19, 2014, Allan Henry Vermeulen et al.
U.S. Appl. No. 14/537,788, filed Nov. 10, 2014, Lei Ye et al.
U.S. Appl. No. 14/579,742, filed Dec. 12, 2014, Christopher Richard Jacques De Kadt et al.
U.S. Appl. No. 14/657,043, filed Mar. 13, 2015, Upendra Bhalchandra Shevade et al.
U.S. Appl. No. 14/753,475, filed Jun. 29, 2015, Allan Henry Vermeulen et al.
U.S. Appl. No. 14/753,484, filed Jun. 29, 2015, John Michael Morkel et al.
U.S. Appl. No. 14/753,495, filed Jun. 29, 2015, Timothy Daniel Cole et al.
U.S. Appl. No. 14/753,505, filed Jun. 29, 2015, Allan Henry Vermeulen et al.
U.S. Appl. No. 14/868,275, filed Sep. 28, 2015, Timothy Daniel Cole et al.
U.S. Appl. No. 14/868,271, filed Sep. 28, 2015, Timothy Daniel Cole et al.
U.S. Appl. No. 14/833,000, filed Aug. 21, 2015, Timothy Daniel Cole et al.
U.S. Appl. No. 14/833,005, filed Aug. 21, 2015, John Michael Morkel et al.
U.S. Appl. No. 14/833,003, filed Aug. 21, 2015, Timothy Daniel Cole et al.
U.S. Appl. No. 14/833,009, filed Aug. 21, 2015, Andrew Wayne Ross et al.
U.S. Appl. No. 14/833,008, filed Aug. 21, 2015, John Michael Morkel et al.
Sergio Almeida, et al., "ChainReaction: a Causal + Consistent Datastore based on Chain Replication", Apr. 15-17, 2013, pp. 85-98.
Scott Lystig Fritchie, "Chain Replication in Theory and in Practice", Sep. 30, 2010, pp. 1-11.
Robbert Van Renesse, et al., "Chain Replication for Supporting High Throughput and Availability", 2004, pp. 91-104.
"Blackboard System", Wikipedia, Accessed Dec. 3, 2014, pp. 1-5.
Wikipedia, "Apache Wave", Downloaded May 8, 2015, pp. 1-9.
"Git-Rewriting History", http://gitscm.com/book/en/v2/GitToolsRewritingHistory, Downloaded May 8, 2015, pp. 1-10.
David Roundy, "Darcs User Manual", http://darcs.net/maunual/bigpage.html, Downloaded May 7, 2015, pp. 1-87.
Wikipedia, "Operational Transformation", Downloaded May 8, 2015, pp. 1-9.
"Samza", http://samza.apached.org/, Downloaded Jun. 3, 2015, p. 1.
Wikipedia, "SipHash", Downloaded May 31, 2015, pp. 1-3.
U.S. Appl. No. 14/833,001, filed Aug. 21, 2015, Timothy Daniel Cole et al.
Invitation to Pay Additional Fees for PCT/US2015/049470, dated Dec. 1, 2015, Amazon Technologies Inc., pp. 1-10.
Ozgur Ulusoy, "Processing Real-Time Transactions in a Replicated Datebase System", Distributed and Parallel Datebases, vol. 2, No. 4, Sep. 10, 1993, pp. 405-436.
Philip A. Bernstein, et al., "Concurrency Control and Recovery in Database Systems", Retrieved from the Internet URL: https://courses.cs.washington.edu/courses/cse490h/11wi/CSE490H_files/CSE550BHG-Ch7.pdf, Jan. 1987, pp. 1-58.

* cited by examiner https://<website>.com/WritesAnalyzer — 901

903

Here is a list of primary key values of objects to which multiple writes have been committed in the last <T> minutes, sorted in decreasing order of the number of writes.

905

| # writes | Tablename and key | Key value | Committed transaction sequence numbers |
|---|---|---|---|
|  |  |  |  |
|  |  |  |  |
| ... |  |  |  |
|  |  |  |  |

To view a summary of write distribution metrics over a time period, set your time range and click on the button below:

| Enter start time here | Enter end time here | Get summary | ← 907

To view write metrics per table or key range, specify the target table and key range and click on the button below:

| Enter table name (default=all) | Enter key range(default = all) | Get table metrics | ← 909

FIG. 9

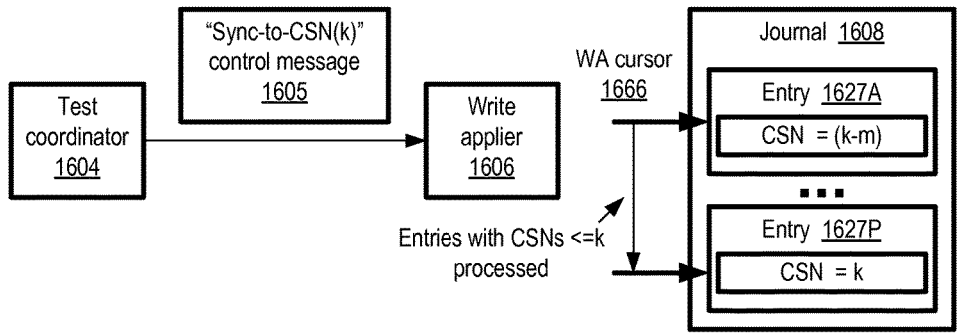
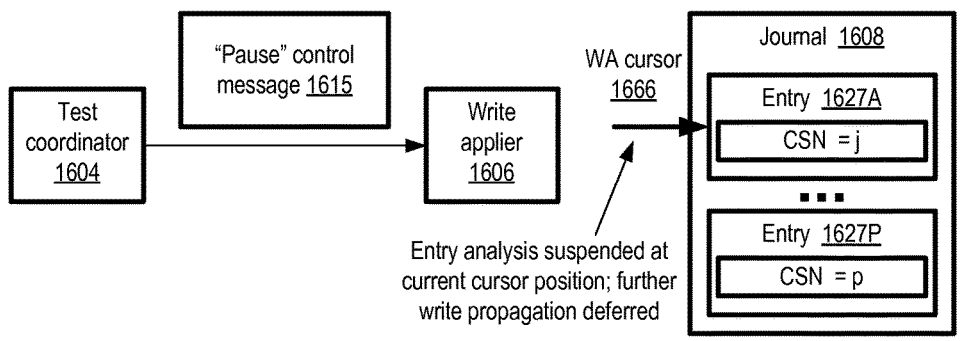
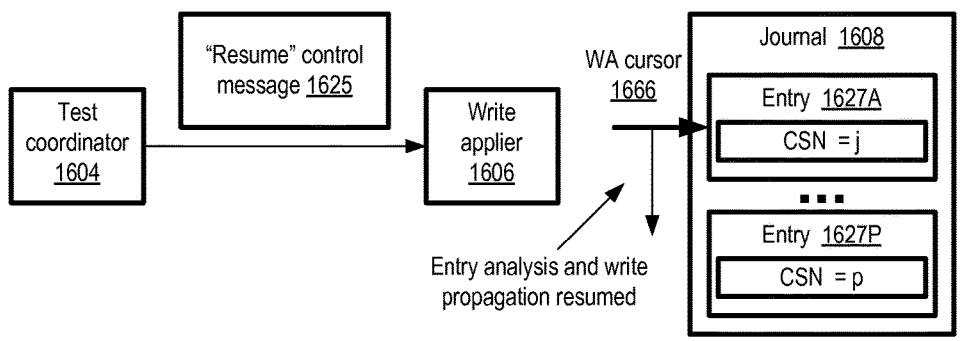
FIG. 16

CONTENTION ANALYSIS FOR JOURNAL-BASED DATABASES

BACKGROUND

In recent years, more and more computing applications are being implemented in distributed environments. A given distributed application may, for example, utilize numerous physical and/or virtualized servers spread among several data centers of a provider network, and may serve customers in many different geographical locations. In many cases, particularly in cloud-based computing environments, a given application may involve performing reads and writes at several different data stores, such as various instances of relational databases, non-relational databases, and the like. Some commonly used data store architectures may support the traditional ACID (atomicity, consistency, isolation and durability) properties associated with the relational data model for operations within a given data store, but may not support such properties for groups of operations involving multiple data stores. Other data store architectures may not natively support the ACID property even within groups of operations directed to a single data store instance.

Developers of applications that would benefit from support for transactions that cross data store boundaries are sometimes forced to implement their own transaction management mechanisms. Such ad-hoc mechanisms are often hard to maintain, especially as the set of object types at the different data stores evolve based on changing application requirements, and as more features are added to the distributed applications themselves. In some cases, not all the data stores may provide support for the same sets of primitive types, or the same kinds of data manipulation operations, which may further complicate the task of managing complex transactions. Furthermore, given the network delays and various types of failures that may be encountered in typical distributed environments over time, some transaction management techniques may not be robust enough to support the service levels required for mission-critical operations.

BRIEF DESCRIPTION OF DRAWINGS

FIG. 9 illustrates an example web-based programmatic interface that may be implemented to provide write distribution metrics of a journal-based storage system, according to at least some embodiments.

FIG. 16 illustrates example control messages which may be used to schedule operations at a journal-based storage system, according to at least some embodiments.

Figure 1:
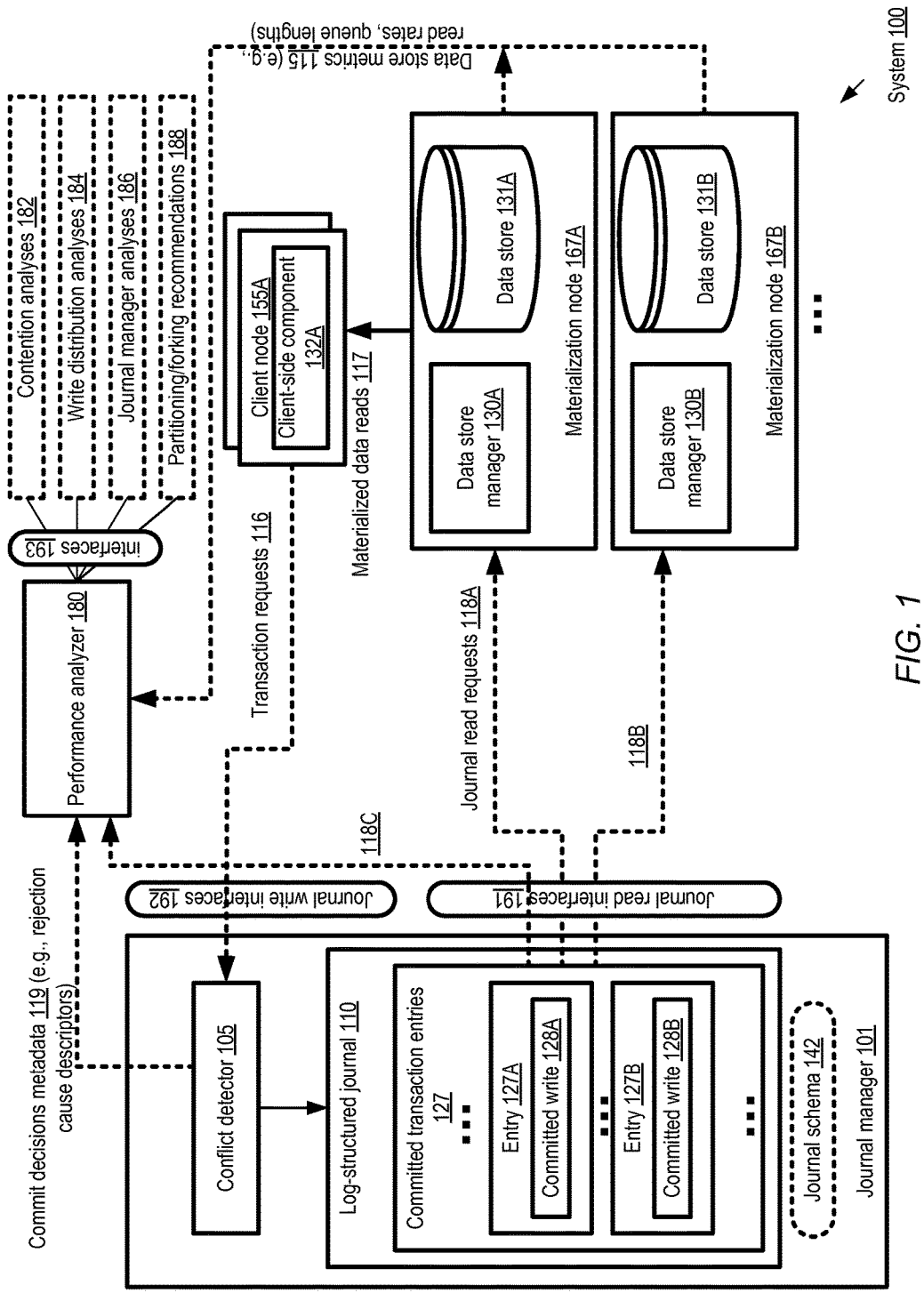
FIG. 1 illustrates an example system environment in which a journal-based multi-data-store database and associated analysis tools may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for implementing tools such as performance analyzers and testing coordinators of a journal-based multi-data-store database are described. In at least some embodiments, a plurality of data stores, some of which may implement different data models and data manipulation languages than others, and some of which may materialize different subsets of the database content than others, may be registered as respective materialization nodes or members of the database. In various embodiments, client-side components of the database may prepare transaction requests representing proposed state changes to the database locally, and submit the transaction requests to a journal manager. The journal manager may perform read-write conflict detection, for example, to determine whether objects read during the preparation of a transaction request may have been modified by subsequently-committed transactions (whose write sets are indicated in respective committed transaction entries appended to the journal). If no conflict is detected, a transaction request may be accepted for commit, and a new committed transaction entry corresponding to the transaction request may be appended to the journal. The committed transaction entries of the journal may each include a respective commit sequence number, indicative of the order in which the journal manager processed the corresponding transaction requests. Each materialization node may have an associated write applier responsible for examining the entries of the journal sequentially and propagating the relevant writes (i.e., those writes which are to be recorded at that materialization node) to the materialization node. The optimistic concurrency control algorithm implemented by the journal manager may enable higher transaction rates to be sustained for at least some types of applications than would have been possible using traditional locking-based concurrency control techniques, especially in environments where the level of contention (which leads to read write conflicts) is low. In at least some embodiments, the same set of committed transaction entries may be materialized in several different ways at respective materialization nodes, e.g., to meet the requirements of respective sets of applications.

If a journal manager rejects a transaction request, e.g., as a result of detecting a read-write conflict indicating contention for a particular portion of the database, the submitter of the transaction request may either abandon the request or re-submit it at some later point. For various applications employing the journal-based database, some portions of their data sets may have higher rates of contention (and consequently, higher rates of transaction rejections) than others. If enough information regarding the most frequent causes of transaction rejections can be provided, contention alleviation strategies (such as reorganizing the data into smaller data objects, or rearranging the relative timings of various types of transaction submissions) may be implemented in at least some embodiments. Contention analyses may also provide insight into application behavior, which may eventually be useful in improving the applications. Similar benefits may also be obtained with respect to analyses of committed write distributions—e.g., which portions of a primary key range of a table is being updated most frequently.

In at least some embodiments, an analytics tool such as a performance analyzer tool may be implemented at one or more computing devices associated with a journal-based multi-data-store database or storage system. Such a performance analyzer may communicate with, and collect data from, various components of the storage system in various embodiments, including for example the journal manager, write appliers, and/or data store managers of the materialization nodes. The performance analyzer may also be granted the permissions necessary to read the committed transaction entries of the journal in at least some embodiments (e.g., similar to the permissions granted to write appliers responsible for propagating committed writes to the materialization nodes' storage devices). In one embodiment, a performance analyzer may obtain (e.g., from the journal manager) respective rejection cause descriptors corresponding to at least some rejected transactions. A rejection cause descriptor with respect to a given rejected transaction request may indicate details about the read-write conflict which led to the rejection. Different levels of details may be provided in different implementations. For example, in one embodiment, the query predicate(s) of the read set of the transaction request (for which one or more conflicting committed writes were identified by the journal manager) may be indicated in the rejection cause descriptor. In another embodiment, the value of a key (e.g., a primary key of a particular row of a table, to which a read of the proposed transaction and a conflicting committed write were directed) may be indicated in the rejection cause descriptor. In some embodiments, an indication of the conflicting committed transaction(s) which led to the rejection may also be provided in the descriptor—e.g., a sequence number of a conflicting committed transaction entry may be included, or some other identifier of the conflicting committed transaction may be included. In some embodiments, in addition to (or instead of) obtaining rejection cause descriptors, the performance analyzer may obtain the accepted write descriptors included in various committed transaction entries.

The performance analyzer may implement one or more programmatic interfaces (e.g., a web-based console, a set of application programming interfaces (APIs), a command-line tool, and/or a graphical user interface (GUI)) in various embodiments for providing or displaying the results of its analysis on the collected data. In response to a contention analysis request submitted via such a programmatic interface, for example, a report or display based on analyzing collected rejection cause descriptors may be provided to a client. For example, a sorted set of keys to which reads were directed in rejected transactions, sorted in decreasing order of the number of rejections associated with each key, may be provided in one response. In another response, a sorted set of keys to which conflicting writes (which led to transaction rejections) were directed may be included. In response to a programmatic request for a write analysis, results of processing collected accepted write descriptors may be provided—for example, showing the keys of the most-frequently-updated records of the database. In some embodiments, the performance analyzer may provide summaries of contention metrics and/or write distribution metrics for specified time intervals. Real-time views of contention metrics and/or write distribution metrics may be provided in at least some embodiments—e.g., visually highlighting the portions of the database for which the highest rates of contention (or the highest rates of committed writes) have been observed over the last X minutes. In at least one embodiment, the performance analyzer may also collect metrics of the journal manager's performance—e.g., the rate at which transaction requests have been received/processed, the rate at which writes are propagated, and the like. In one embodiment, an intelligent performance analyzer may provide recommendations for configuration changes based on the analysis of collected metrics—e.g., a recommendation to implement a partitioning policy to distribute the workload associated with materializing the database among multiple materialization nodes based on the values of particular data object attributes may be generated, and/or a recommendation to fork a child journal to distribute the journal manager's workload may be generated.

Example System Environment

FIG. 1 illustrates an example system environment in which a journal-based multi-data-store database and associated analysis tools may be implemented, according to at least some embodiments. As shown, system 100 includes a journal manager 101 responsible for implementing an optimistic concurrency control algorithm with respect to transaction requests 116 submitted by client-side components such as 132 of a multi-data-store database. A number of programmatic interfaces may be implemented by the journal manager 101, including for example write interfaces 192 (used at least for submissions of transaction requests 116) and/or read interfaces 191 (used at least for materializing committed writes at various data stores) in the depicted embodiment. Log-structured journal 102 comprises a plurality of committed transaction entries 127, such as entries 127A and 127B with respective committed writes 128A and 128B. Each committed transaction entry 127 which may include a commit sequence number indicative of the order in which the corresponding transaction request was processed by the journal manager 101. A given transaction request 116 may include, for example, a write set descriptor indicating one or more proposed writes or state changes of the database (which may be dependent on the results of one or more materialized data reads 117), a read set descriptor indicating the objects which were read during preparation of the transaction request, and a conflict detector (e.g., a sequence number) indicative of the state of the database at the time the reads were performed. A conflict detector 105 of the journal manager may determine whether a read-write conflict exists between the read set of a transaction request 116 and a selected subset of the committed transaction entries 127 (e.g., a subset identified using the conflict check delimiter in the transaction request as described below in further detail). If no conflict is identified, the transaction request may be accepted for commit and a new committed transaction entry (indicating the writes of the transaction request) may be appended to the journal 102. In contrast, if a conflict is identified, the transaction request may be rejected. In some cases, a response indicating the outcome of the commit decision may be provided to the transaction request submitter (e.g., to client-side component 132 at a client node 155 of the system). In the case of a rejection, in some cases the submitter may prepare another transaction request (e.g., based on re-reading the data objects which formed part of the read set descriptor of the rejected transaction request, but with a different conflict check delimiter representing a more recent observed state of the database) and re-try the transaction.

The state changes indicated in the journal entries 127 may collectively represent the authoritative source of the state of the database contents in the depicted embodiment. At least a respective portion of the database content may be materialized at each of several data stores, such as data store 131A of materialization node 167A and data store 131B of materialization node 167B in the depicted embodiment. Each materialization node 167 may be registered as a reader or consumer of journal entries 127. In some embodiments, a data store manager 130 (e.g., 130A or 130B) may establish a respective cursor on the journal, such that the committed transaction entries 127 are examined in sequence (e.g., in order of increasing commit sequence number) by the cursor via journal read interfaces 191, and some or all of the writes that are indicated in the entries 127 are applied or propagated at the corresponding data store 131. In at least one embodiment, writes may be propagated to a given materialization node 167 asynchronously with respect to the propagation of writes to other materialization nodes, and/or asynchronously with respect to the operations of the journal manager and transaction submitters. For example, a respective asynchronous write applier (e.g., a process or thread of execution) may be established for or at each of the materialization nodes or data store managers for examining the journal sequentially and propagating the appropriate set of writes. In at least one embodiment as described below in further detail, different materialization strategies may be utilized for different materialization nodes 167—e.g., the same set of state changes may be represented at respective materialization nodes using different sets of attributes or different data structures. Data stores 131 may implement respective data models in some embodiments—e.g., some data stores may comprise instances of a relational database, while others may comprise instances of a non-relational database. The terms "multi-data-store database" and "multi-data-store storage system" may be used synonymously herein. Of course, a given storage system or database may, at least at some points in time, comprise just a single member data store—that is, while multiple members may be permitted, the storage system may not be required to have multiple members.

In various embodiments, a data-store-independent transaction language to be used for transaction requests 116 may be indicated in a journal schema 142. The journal schema may also indicate the attribute sets and attribute data types of various data objects (e.g., tables) of the multi-data-store database. The journal schema may be determined based on the overlap among the capabilities of the different materialization nodes—e.g., if a particular data store such as 131A can support integers which can be expressed using no more than 32 bits, while another data store 131B can support 64-bit integers, 32-bit integers may be permitted as attribute data types in the journal schema and 64-bit integers may not be permitted. The journal schema 142 may itself evolve over time, and changes to the journal schema may also be indicated via committed transaction entries 127, with the latest versions of the schema being materialized at the data stores 131. In some embodiments, a proactive acceptability verification protocol may be used for changes to the journal schema—e.g., some subset or all of the registered data store managers 130 may be required to indicate that a proposed journal schema change can be processed at their materialization node, before a transaction request representing the proposed journal schema change is submitted for commit analysis to the journal manager. Such a proposed journal schema change may become effective only if the commit analysis has a positive outcome (i.e., even after the registered data stores have verified that the proposed change is acceptable, the proposed change may still be rejected if a conflict with another recently-committed journal schema change is identified).

The data stores 131 may be referred to as member data stores of the database or storage system. The member data stores 131 may differ from each other in various characteristics such as their supported data models and/or data manipulation languages, level of data consistency supported, transaction support, data persistence/durability level, and the like. For example, one data store may comprise an instance of a NoSQL or non-relational database that does not implement a standard version of the structured query language (SQL)), while a second data store may comprise an instance of a relational database, and a third data store may comprise an instance of an in-memory database. Each of the data stores may be registered for transaction management by the journal manager 101 in the depicted embodiment, e.g., in response to programmatic registration requests. The terms "concurrency control" and "transaction management" may be used as synonyms herein with respect to the state change management functionality provided by the journal manager. In effect, the journal manager may be responsible for implementing a replicated state machine corresponding to a collection of data objects indicated in a journal schema, with the committed transaction entries expressing state changes in a data-store-independent language in the depicted embodiment. In some embodiments, several different types of entries may be stored in the journal corresponding to respective transaction requests, including entries representing data modifications, journal schema modifications, redactions of other entries (i.e., operations to instruct journal entry processors such as write appliers to skip the processing of earlier-inserted entries), and the like. Some transaction requests may require conflict detection, while others may not. A transaction category detector may receive the transaction requests, and pass those transaction requests requiring conflict detection to the conflict detector 105; for other transaction requests (including message-only requests), respective entries may be added to the journal without analysis by the conflict detector 105.

At least some of the writes indicated in a given write-containing transaction request may be dependent on the results of one or more of the reads in some embodiments. For example, a requested transaction may involve reading one value V1 from a location L1 at a data store DS1, a second value V2 from a second location L2 at a data store DS2, computing a function F(V1, V2) and storing the result of the function at a location L3 at some data store DS3. In some locking-based concurrency control mechanisms, exclusive locks may have to be obtained on L1 and L2 to ensure that the values V1 and V2 do not change before L3 is updated. In contrast, an optimistic concurrency control mechanism may be used by the journal manager 101 of FIG. 1, in which no locks may have to be obtained. Instead, in the depicted embodiment, the conflict detector 105 may determine, based at least in part on the contents of the transaction request and on a set of committed transaction entries of the journal 110, whether one or more of the data items read in the requested transaction may have been updated since they were read from their respective data stores. A sequence number based technique may be used to determine whether such read-write conflicts exist in at least some embodiments, as described below in further detail. If the conflict detector 105 determines that none of results of the proposed transaction's reads have been affected by subsequently committed writes, the requested transaction may be accepted for commit, and records representing such accepted-for-commit transactions may be added to the journal 110. The terms "approve" and "accept" may be used as synonyms herein with respect to requested transactions that are not rejected.

If some of the transaction's read data was updated since the corresponding reads occurred (or if a probability that the data was updated is estimated by the conflict detector to be greater than a threshold), a requested transaction may instead be rejected or aborted in the depicted embodiment. This type of approach to concurrency control may be deemed optimistic in that decisions as to whether to proceed with a set of writes of a transaction may be made initially under the optimistic assumption that read-write conflicts are unlikely. As a result, at least in scenarios in which read-write conflicts are in fact infrequent, higher throughputs and lower response times may be achieved than may be possible if more traditional locking-based techniques are used. In the case where a transaction is accepted for commit, in some embodiments contents of a corresponding journal entry 127 may be replicated at some number of nodes of a replication graph (as described below in further detail with respect to FIG. 5) in the depicted embodiment before the commit is considered successful. In some embodiments, the requesting client-side component 132 may be notified when the requested transaction is committed. In at least one embodiment, the client-side component such as 132 may be informed when a transaction is rejected, so that, for example, a new transaction request may be generated and submitted for the desired updates.

For each transaction that is committed, in at least some embodiments a commit sequence number (or some other identifier indicative of the commit) may be generated and stored as part of the corresponding journal entry. Such a commit sequence number may, for example, be implemented as a counter or as a logical timestamp. The commit sequence number may be determined, for example, by the conflict detector 105 in some embodiments, or at a different component associated with the journal (such as the committer node of a replication graph being used) in other embodiments.

In at least some embodiments, as described below in further detail, in addition to a read set descriptor and a write set descriptor, a given transaction request 116 which modifies a data object may include the write payload (i.e., the set of data bytes that are to be stored for each write), a conflict check delimiter (an indication of a subset of the committed transaction entries that should be examined to accept/reject the transaction), and/or other elements such as a transaction type indicator. Some or all of these constituent elements of a transaction request may be stored within the corresponding journal entry together with the commit sequence number for the transaction. In at least one embodiment, the journal manager 101 may provide an indication of the latest committed state of the database (such as the highest commit sequence number generated thus far), e.g., in response to a query from a data store manager or a client-side component. The write appliers may indicate the commit sequence numbers corresponding to the writes that they apply in various embodiments. Thus, at any given point in time, a client-side component may be able (e.g., by querying the data store managers) to determine the commit sequence number corresponding to the most-recently-applied write at a given materialization node 167.

In various embodiments, during the preparation of a transaction request 116 at a client node such as 155, the most-recently-applied commit timestamps may be obtained from the data stores that are accessed during the transaction, and one or more of such commit sequence numbers may be indicated in the transaction request as the conflict check delimiter. For example, consider a scenario in which, at the time that a particular client-side component 132 initiates a transaction that includes a read of a location L1 at a data store DS1, the commit sequence number corresponding to the most recently applied write at DS1 is SN1. Assume further that in this example, the read set of the transaction only comprises data of DS1. In such a scenario, SN1 may be included in the transaction request 116. The conflict detector 105 may identify journal entries with sequence numbers greater than SN1 as the set of entries to be examined for read-write conflicts for the requested transaction. If any of the write sets of the identified commit records overlaps with the read set of the requested transaction, the transaction may be rejected/aborted; otherwise, the transaction may be approved for commit in this example scenario. Details regarding the manner in which conflict detection operations may be implemented in various embodiments are provided below.

The optimistic concurrency control mechanism illustrated in FIG. 1 may allow more complex types of atomic operations to be supported than may have been possible using the underlying data stores' native concurrency control mechanisms in at least some scenarios. For example, some high-performance non-relational data stores may only allow single-item transactions (i.e., writes may be permitted one at a time, but if multiple writes are submitted in a single batch update, atomicity/consistency guarantees may not be provided for the multiple writes taken together). With the journal-based approach described above, a single transaction that encompasses writes to multiple locations of the non-relational data store (and/or other data stores as well) may be supported with relative ease.

A number of applications may be implemented using the optimistic concurrency control algorithm and the flexible architecture of the database illustrated in system 100. In at least one embodiment, one or more analytics tools such as a performance analyzer 180 may be implemented to provide application owners and/or other interested parties with insights regarding various types of transaction processing-related events at the database. For example, the performance analyzer may obtain one or more types of commit decisions metadata 119 from the conflict detector and/or other sub-components of the journal manager, and use the metadata 119 to provide responses to various types of performance-related client queries. Corresponding to rejected transaction requests, respective rejection cause descriptors may be obtained by the performance analyzer in the depicted embodiment. A given rejection cause descriptor may indicate, for example, the particular read query predicates with respect to which conflicting committed writes were found by the conflict detector, and/or the identifier (e.g., sequence number) of the committed transactions which conflicted with the rejected transaction. The level of detail of the commit decisions metadata 119 may vary in different embodiments—e.g., in some embodiments, the entire rejected transaction request and/or the entire conflicting committed transaction entries may be obtained by the performance analyzer 180, while in other embodiments only the primary keys of the read set and/or the conflicting write sets may be included in the metadata. In at least some embodiments, the performance analyzer 180 may be granted read access to the committed transaction entries 127 of the journal. In such embodiments, the performance analyzer 180 may utilize journal read interfaces 191 to perform various types of statistical analyses with respect to committed transactions, in addition to performing the analysis of rejected transactions performed using rejection cause descriptors. Among other types of information regarding committed transactions, in some embodiments the performance analyzer may be able to identify which portions of the database (e.g., which sub-ranges of primary keys) are being updated most frequently over various time periods, trends in the rate of writes directed to various tables or other objects, and so on.

The performance analyzer 180 may implement its own set of programmatic interfaces 193 in the depicted embodiment, such as one or more web-based consoles, application programming interfaces (APIs), command-line tools and/or graphical user interfaces. The programmatic interfaces 193 may be used by performance analyzer clients to submit various types of requests, such as requests for contention analyses 182, write distribution analyses 184 and the like, and to receive responses to such requests. In at least one embodiment, the performance analyzer 180 may also collect other metrics regarding the operations of the journal manager 101, such as the rates at which transaction requests are received/processed, the rates at which journal entries are being read for materialization, and so on. Journal manager analyses 186 indicating such metrics may also be provided programmatically by the performance analyzer 180 in some embodiments. In at least one embodiment, the performance analyzer may proactively prepare recommendations 188 for one or more types of configuration changes, e.g., based on the performance trends it identifies using collected metrics. Recommendations 188 may suggest that distributing the materialization workload (e.g., by setting up respective materialization nodes 167 for respective partitions of the database, where the partitions are defined in terms of values of data object keys) may help overall database performance, and/or that distribution commit processing workload by forking off a child journal may help overall performance. In some embodiments, clients of the performance analyzer 180 may indicate (e.g., using interfaces 193) whether they wish to be provided with recommendations or not.

In at least one embodiment, a performance analyzer may also collect performance metrics 115 from various materialization nodes directly—e.g., the rates at which journal entries are being read at each data store, queue lengths at various components of the materialization nodes, resource utilization levels (e.g., CPU utilization, disk utilization, memory utilization etc.) at the materialization nodes, and the like. For example, a given data store (e.g., an instance of a relational database, or an instance of a "NoSQL" non-relational database) may have its own set of analysis tools, and the performance analyzer 180 may interact with such data-store-specific tools using respective plug-ins or API sets. Using the information collected and unified from different components of the database, a performance analyzer 180 may be able to provide statistical overviews of the database operations as a whole, and may also enable clients to drill down to desired levels of detail for individual components using easy-to-use interfaces. Clients may be able to utilize the output of the performance analyzer to make various types of optimization choices to meet or exceed the requirements of the applications built using the multi-data-store database (e.g., changing the granularity of highly-contended-for database records, establishing new materialization nodes, etc.).

Overview of Journal-Based Transaction Processing

Figure 2:
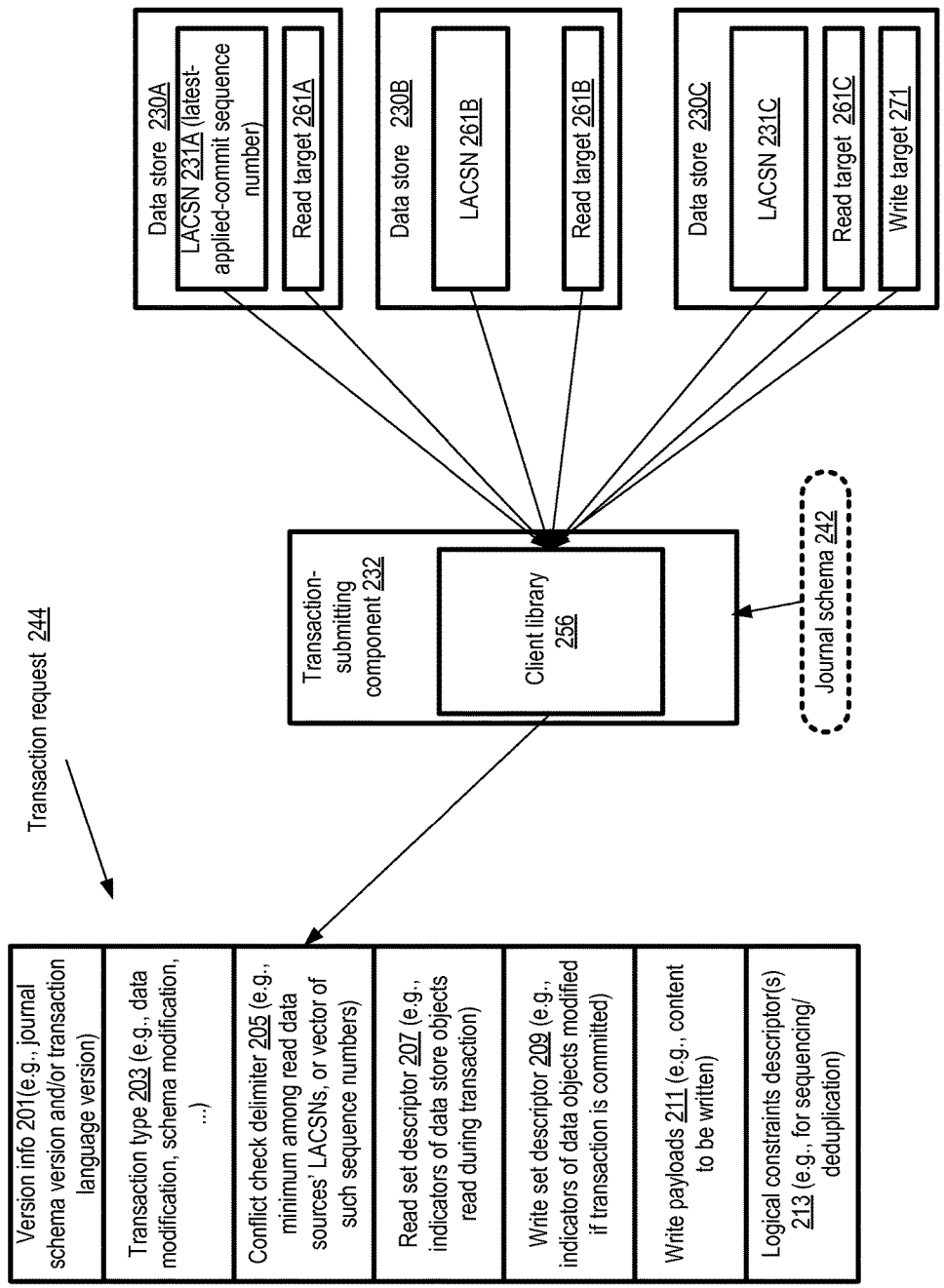
FIG. 2 illustrates an overview of transaction requests which may be submitted to a journal manager of a multi-data-store storage system, according to at least some embodiments.

FIG. 2 illustrates an overview of transaction requests which may be submitted to a journal manager of a multi-data-store storage system, according to at least some embodiments. As shown, a transaction request 244 may include some combination of versioning information 201, a transaction type indicator 203, a conflict check delimiter 205, a read set descriptor 207, a write set descriptor 209, write payload(s) 211, and/or logical constraint descriptors 213 in the depicted embodiment. In some embodiments, authorization to submit transaction requests similar to request 244 may be granted to data store managers at various materialization nodes, as well as to client-side components of the database.

In the depicted embodiment, a transaction-submitting component 232 may comprise a client library 256 which may be utilized to assemble or prepare the transaction request. In at least some embodiments, the client library may automatically record information about the read targets 261A, 261B, and 261C (e.g., corresponding to respective data objects whose attribute details are specified in the journal schema 242) respectively within data stores 230A, 230B and 230C from which data is read during the transaction. In some embodiments, the read set descriptor 207 may be generated by applying transformation functions (e.g., hash functions) to the read query predicates. For example, if a read request logically equivalent to the SQL (Structured Query Language) statement "select salary from EmployeeTable where (name equals 'Alan') or (employeeID equals '123')" were issued by the transaction-submitter 232, the following procedure may be used to represent the portion of the read set corresponding to the select statement in one implementation. First, the query predicates (name equals 'Alan') or (employeeID equals '123') may be normalized into a tuple (e.g., 'name:Alan,employeeID:123') expressed in a particular format indicated in journal schema 242. Then, a hash function or other transformation function (which may also be specified in the journal schema as the function to be used to generate the read descriptor) may be applied to convert the normalized tuple(s) into integers (e.g., "–55, 1312"). The output of the transformation function may be included in the read set descriptor 207 in the transaction request 244 in some embodiments. In other embodiments, such transformations of read queries may not be used. In at least some embodiments, the entire text of the read queries corresponding to the read set (e.g., "select salary from EmployeeTable where (name equals 'Alan') or (employeeID equals '123')" in the above example) may also or instead be included in a transaction request 244.

Information about the write target 271 (of data store 230C in the depicted example) to which data is written in the proposed transaction may also be recorded by the client library 256, e.g., by applying similar transformation functions to queries whose results may be affected by the writes. For example, in one embodiment, the journal schema 242 may indicate one or more query restriction descriptors indicating the sets of data object attributes for which read-write conflicts are going to be detected at the database. A set of queries (Q1, Q2, . . . ) directed to such attributes may be identified by the client library, such that results of the queries would be affected by the proposed write directed to target 271. The predicates of those queries may then be converted into integers using an algorithm involving normalization followed by transformation in one implementation, in a manner similar to the approach described for the read set descriptor above, and the integers may be included in write set descriptor 209. In embodiments in which both the read set and the write set are represented using sets of integers produced by transformation functions applied to corresponding queries, the task of identifying potential read-write conflicts may be simplified to checking whether any of the integers of a read set description of a proposed transaction are present in the write set descriptors of transactions that have been committed since the operations to read the objects indicated in the read set were performed. Of course, depending on the transformation functions used, the presence of the same integer in a read set and a committed write set may represent a false positive in some embodiments: e.g., the query predicate "attr1:value1" of a read set may have been hashed to the same integer as a different predicate "attr2:value2" of a query affected by a committed write. In at least some embodiments, in addition to or instead of a transformed representation of the write set descriptor, the full text of the proposed write operation directed to target 272 may be included in the transaction request 244. In some embodiments in which transformation functions are used for encoding read set queries and/or queries affected by write sets, any of various techniques for transformation inversion (e.g., reverse mappings from the transformed versions back to the untransformed versions of queries) may be used by the performance analyzer when preparing contention analyses.

In some implementations, the client library 256 may also obtain, from each of the data stores 230, a corresponding latest-applied commit sequence number (LACSN) 231 (e.g., 231A-231C) of the most recent transaction whose writes have been applied at the data store. In one embodiment, such LACSNs 231 may be retrieved before any of the reads of the transaction are issued to the corresponding data stores, for example. In another embodiment, the LACSNs 231 may be retrieved from a given data store 230 just before the first read that is directed to that data store within the current transaction is issued.

In the depicted embodiment, the version number of the journal schema 242 and/or the version number of the data-store independent transaction language being used for the transaction request 244 may be indicated in version information fields 201. In some embodiments, a number of different categories of transactions may be supported—e.g., data object modification transactions, journal schema modification transactions, reaction transactions to enable write appliers to skip processing of previously-stored journal entries, acceptability-verification-related transactions used to pre-approve journal schema changes, and the like. The transaction category may be indicated in a separate transaction type field 203 in the depicted embodiment. In some embodiments, the transaction type may be implicit rather than explicit, e.g., the type of state change being requested may be apparent based on the write set descriptor and/or other elements of transaction request 244. The conflict check delimiter 205 may be derived from a function to which the LACSNs 231 are provided as input in some embodiments. For example, in one implementation, the minimum sequence number among the LACSNs obtained from all the data stores read during the transaction may be used as the delimiter. In another implementation, a vector or array comprising the LACSNs from each of the data stores may be included as the conflict check delimiter 205 of the transaction request descriptor. The conflict check delimiter 205 may also be referred to herein as a committed state identifier, as it represents a committed state of one or more data stores upon which the requested transaction depends. The conflict check delimiter 205 may be used by the journal manager to identify the subset of committed transaction entries to be used to perform conflict detection with the transaction request 244 in various embodiments.

As discussed above, in some embodiments, transformation functions may be applied to read queries to generate the read set descriptor 207, and/or similar transformation functions may be applied to write-affected queries (a set of queries whose results may be affected by the proposed writes) to generate write set descriptor 209 in various embodiments. In some embodiments, instead of the query-based transformation, a selected transformation function may instead be applied to the locations/addresses of the read targets to obtain a set of hash values to be included in read descriptor 207. Similarly, a selected transformation function (either the same function as was used for the read descriptor, or a different function, depending on the implementation) may be applied to the location of the write(s) of a transaction to generate the write set descriptor 209 in some embodiments. In another embodiment in which read set descriptors and/or write set descriptors are generated based on locations rather than query contents, hashing may not be used; instead, for example, an un-hashed location identifier may be used for each of the read and write set entries. The write payload 211 may include a representation of the data that is to be written for each of the writes included in the transaction. Logical constraints 213 may include signatures used for duplicate detection/elimination and/or for sequencing specified transactions before or after other transactions in some embodiments. Some or all of the contents of the transaction request 244 may be stored as part of the journal entries (e.g., committed transaction records) in some embodiments. In some embodiments, for example, the full text of the read queries corresponding to the read set, and/or the full text of the write operations corresponding to the write set, may be stored in the committed transaction entries.

It is noted that the read and write targets from which the read set descriptors and/or write set descriptors are generated may represent different storage granularities, or even different types of logical entities, in different embodiments or for different data stores. For example, for a data store comprising a non-relational database in which a particular data object is represented by a combination of container name (e.g., a table name), a user name (indicating the container's owner), and some set of keys (e.g., a hash key and a range key), a read set may be obtained as a function of the tuple (container-ID, user-ID, hash key, range key). For a relational database, a tuple (table-ID, user-ID, row-ID) or (table-ID, user-ID) may be used. In various embodiments, the journal manager may be responsible, using the contents of a transaction request and the journal, for identifying conflicts between the reads indicated in the transaction request and the committed writes indicated in the journal.

Figure 3:
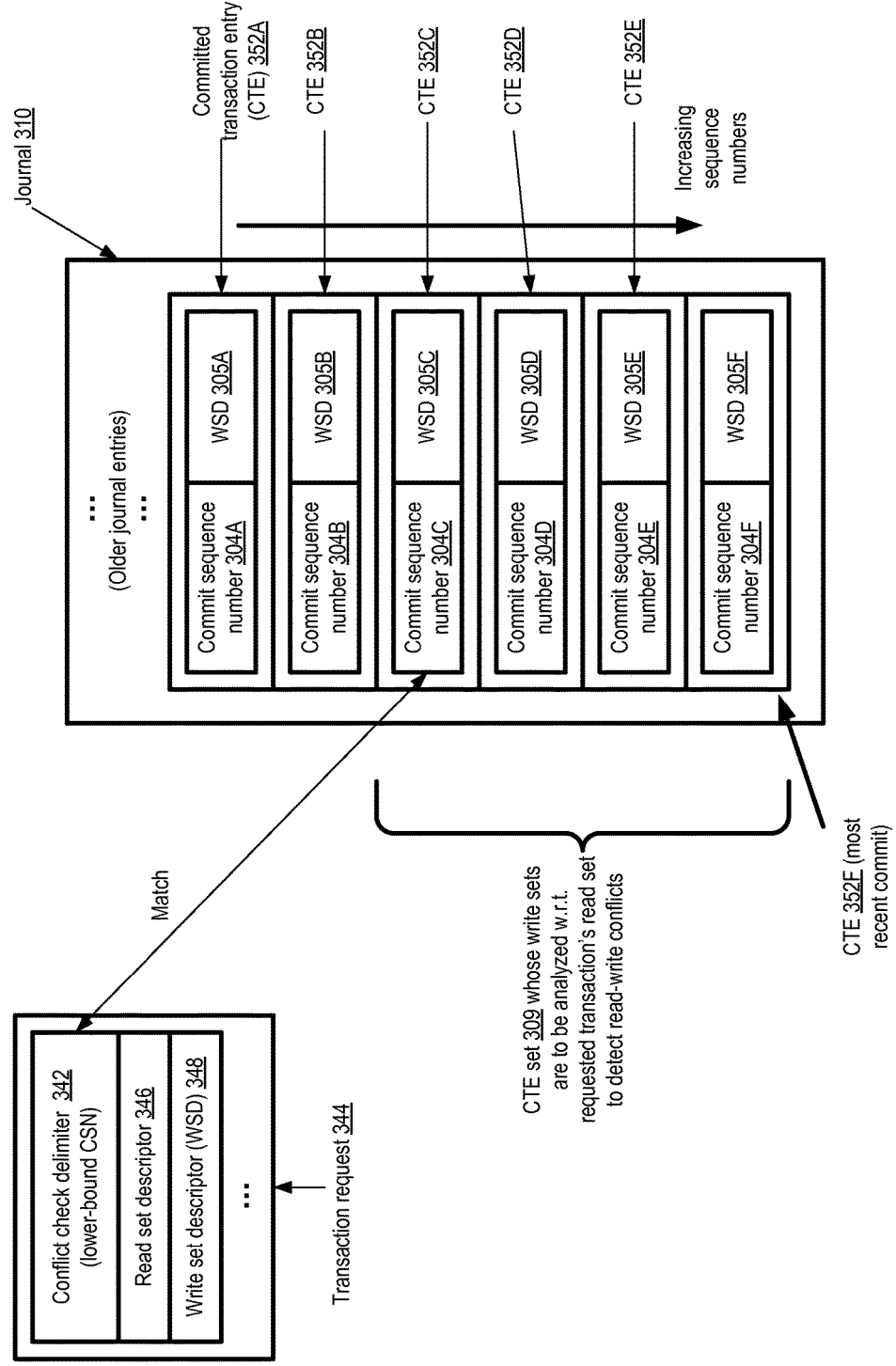
FIG. 3 illustrates an overview of conflict detection operations which may be performed by a journal manager, according to at least some embodiments.

FIG. 3 illustrates an overview of conflict detection operations which may be performed by a journal manager, according to at least some embodiments. Such operations may be performed for at least a subset of the transaction categories supported in various embodiments, such as data object modification transactions and/or journal schema modification transactions. In the depicted example, committed transaction entries (CTEs) 352 stored at journal 310 are shown arranged in order of increasing commit sequence numbers from the top to the bottom of the figure. The latest or most recently committed transaction is represented by CTE 352F, with commit sequence number (CSN) 304F and write set descriptor (WSD) 305F. Each of CTEs 352A, 352B, 352C, 352D and 352E comprises a corresponding CSN 304 (e.g., CSNs 304A-304E respectively) and a corresponding WSD 305 (e.g., WSDs 305A-305E).

As shown, transaction request 344 includes a conflict check delimiter (or committed state identifier) 342, a read set descriptor 346 and a write set descriptor 348. (The write payload and various other elements of the requested transaction such as the elements discussed in the context of FIG. 2 are not shown in FIG. 3). The conflict detector of the journal manager may be required to identify a set of CTEs of journal 310 that are to be checked for conflicts with the read set of the requested transaction. The conflict check delimiter 342 indicates a lower-bound CSN that may be used by the conflict detector to identify the starting CTE of set 309 to be examined for read-write conflicts with the requested transaction in the depicted embodiment, as indicated by the arrow labeled "Match". Set 309 may include all the CTEs starting with the matching sequence number up to the most recent committed transaction (CTE 352F) in some embodiments. If any of the writes indicated by the CTE set 309 overlap with any of the reads indicated in the transaction request 344, such a read-write conflict may lead to a rejection of the requested transaction. A variety of algorithms may be used to check whether such an overlap exists in different embodiments. In one embodiment, for example, one or more hashing-based computations or probes may be used to determine whether a read represented in the read set descriptor 346 conflicts with a write indicated in the CTE set 309, thereby avoiding a sequential scan of the CTE set. In some implementations, a sequential scan of CTE set 309 may be used, e.g., if the number of records in the CTE set is below a threshold. If none of the writes indicated in CTE set 309 overlap with any of the reads of the requested transaction, the transaction may be accepted, since none of the data that were read during the preparation of the transaction request can have changed since they were read. In at least one embodiment, a transaction request may also indicate an upper bound on the sequence numbers of journal entries to be checked for conflicts—e.g., the conflict check delimiter may indicate both a starting point and an ending point within the set of CTEs 352.

In embodiments in which hash functions or other similar transformation functions are used to represent queries corresponding to reads (in the read set descriptors) and queries which would be affected by writes (in the WSDs), it may sometimes be the case that a detected conflict is a false positive, e.g., due to hash collisions. For example, if a the read set descriptor includes the integer "10" as the representation of a read query RQ, and one of the WSDs of the CTE set 309 happens to include the integer "10" as the representation of an unrelated query WAQ (write-affected query) whose result would be affected by a committed write, the transaction request 344 may be rejected despite the fact that the two queries RQ and WAQ did not truly represent a read-write conflict. By choosing transformation functions with appropriate statistical properties, the probability of such collisions and false positives may be reduced in various embodiments. By analyzing the full text of the read queries and committed write operations with which conflicts were identified, it may be possible for a performance analyzer tool to identify the fraction of transaction rejections which were caused by false positives in some embodiments.

Figure 4:
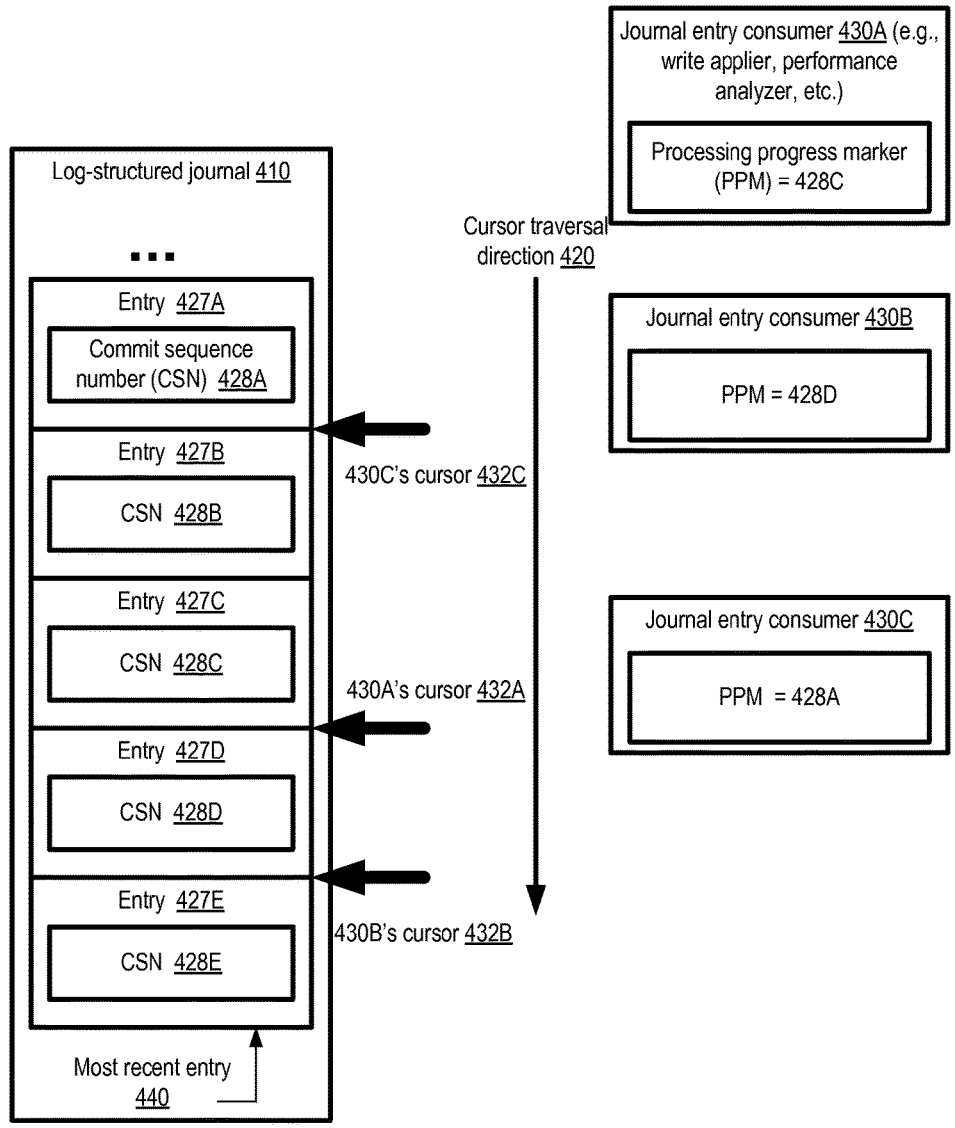
FIG. 4 illustrates an example of asynchronous processing of journal entries by journal entry consumers such as write appliers, according to at least some embodiments.

As mentioned earlier, in various embodiments committed writes may be propagated to materialization nodes by respective write appliers which examine and process the journal sequentially. In some embodiments, entities other than write appliers (such as a performance analyzer) may also read or consume journal entries; thus, generally speaking, several different kinds of journal entry consumers may be active at a given multi-data-store database. FIG. 4 illustrates an example of asynchronous processing of journal entries by journal entry consumers such as write appliers, according to at least some embodiments. At a point of time corresponding to FIG. 4, the journal 410 comprises a plurality of entries 427 inserted in order of respective commit sequence numbers (CSNs) 428, with the most recent entry 440 being entry 427E with CSN 428E. The most recent entry may sometimes be referred to as the "head" of the journal.

In effect, each of the journal entry consumers 430 may maintain a cursor onto the sequence of commit entries of the journal, and process the entries in the order in which the entries were inserted into the journal. For example, cursor 432A is established for consumer 430A, cursor 432B is maintained for consumer 430B, and cursor 432C is maintained for consumer 430C in the depicted example. Each of the consumers 430 may be implemented, for example, as a separate process or thread of execution in some embodiments. As indicated by arrow 420, each of the cursors processes the entries of journal 410 in the same order, e.g., in increasing order of CSNs 428 of the entries. At the point of time illustrated in FIG. 4, entries with CSNs up to 428C have been processed at consumer 430A, entries corresponding to CSNs up to 428D have been processed at consumer 430B, and entries corresponding to CSNs up to 428A have been processed at consumer 430C. A respective processing progress marker (PPM) may be stored or maintained at each consumer node in the depicted embodiment, indicating the CSN of the most recent journal entry whose processing has been completed at that node. Each of the journal consumers may process journal entries independently of the other consumers in the depicted embodiment, and may not necessarily be aware of the existence of other consumers.

Figure 5:
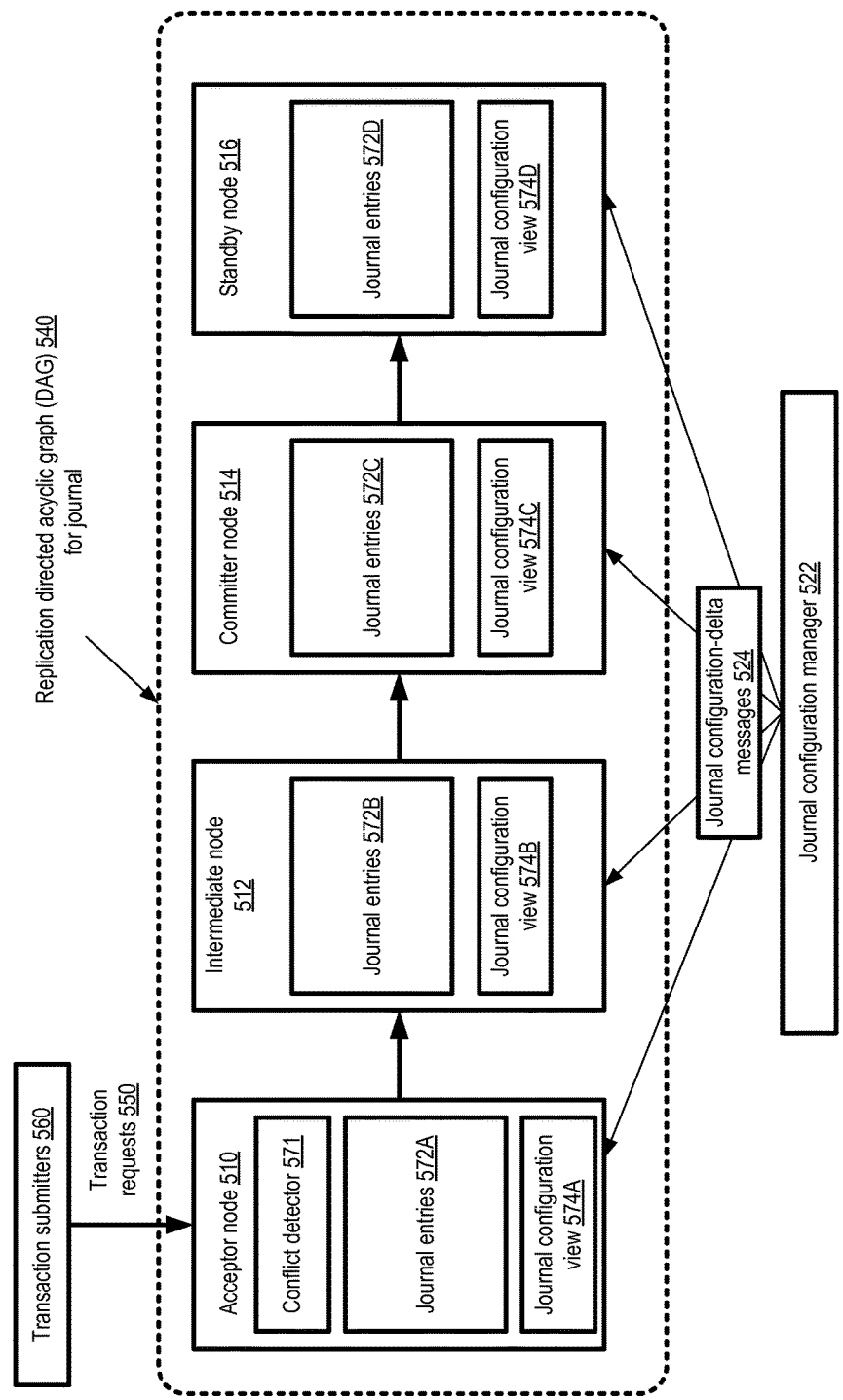
FIG. 5 illustrates an example replication directed acyclic graph (DAG) which may be used to implement a journal of a multi-data-store storage system, according to at least some embodiments.

In some embodiments, the journal of a multi-data-store storage system may be replicated for enhanced data durability and/or higher levels of availability. FIG. 5 illustrates an example replication directed acyclic graph (DAG) which may be used to implement a journal of a multi-data-store storage system, according to at least some embodiments. In general, a replication DAG 540 may include one or more acceptor nodes 510 to which transaction requests 550 may be submitted by submitters 560 (such as client-side components or data store managers), one or more committer nodes 514, zero or more intermediary nodes 512 each positioned along a replication pathway comprising DAG edges leading from an acceptor node to a committer node, and zero or more standby nodes 516 that are configured to quickly take over responsibilities of one of the other types of nodes in the event of a node failure. In the embodiment depicted in FIG. 5, the acceptor node includes a conflict detector 571 of the journal manager. In other embodiments, instead of being incorporated within an acceptor node, the conflict detector may be implemented separately.

In at least some embodiments, each node of a particular replication DAG such as 540 may be responsible for replicating journal entries. The journal entries may be propagated along a set of edges from an acceptor node to a committer node of the DAG along a replication pathway. In FIG. 5, the current replication pathway starts at acceptor node 510, and ends at committer node 514 via intermediary node 512. For a given journal entry (e.g., an entry indicating a committed data object modification or a committed journal schema change), one replica may be stored at each of the nodes along the replication path, e.g., in journal entries 572A, 572B and 572C. Each journal entry propagated within the DAG may include a respective sequence number or a logical timestamp that is indicative of an order in which the corresponding transaction request was processed (e.g., at the acceptor node 510). When a particular journal entry reaches a committer node, e.g., after a sufficient number of replicas of the entry have been saved along the replication pathway, the corresponding transaction may be explicitly or implicitly committed. If for some reason a sufficient number of replicas cannot be created, the journal entries may be logically and/or physically removed (e.g., by setting a "removed" flag) in some embodiments from the nodes (if any) at which they have been replicated thus far. After a commit, the writes of a transaction may be propagated or applied to a set of destinations (such as storage devices at which the contents of the member data stores are located) as described earlier, e.g. by respective write appliers. In some implementations, only a subset of the DAG nodes may be read in order to propagate committed writes to their destinations. In other embodiments, journal entries may be read from any of the DAG nodes. In at least one embodiment, write appliers may be implemented as respective threads or processes that may run at the same hosts at one or more of the DAG nodes. In other embodiments, write appliers may run on different hosts than the DAG nodes. A journal entry may also be transmitted eventually to standby node 516, and a replica of it may be stored there after it has been committed, so that the standby node 516 is able to replace a failed node of the DAG quickly if and when such a failover becomes necessary.

In at least one embodiment, a particular replication node may be designated as a source from which analytic tools such as a performance analyzer read journal entries. For example, in one embodiment a performance analyzer may read journal entries from a standby node 516 instead of reading the entries from other nodes of the replication path (thereby reducing the read workload of the acceptor, intermediate and committer nodes). In other embodiments, a performance analyzer may read journal entries from any of the nodes.

A journal configuration manager 522 may be responsible for managing changes to DAG configuration (e.g., when nodes leave the DAG due to failures, or join/re-join the DAG) by propagating configuration-delta messages 1624 asynchronously to the DAG nodes in the depicted embodiment. Each configuration-delta message may indicate one or more changes to the DAG configuration that have been accepted or committed at the journal configuration manager 522. In some embodiments, each replication node may implement a respective deterministic finite state machine, and the journal configuration manager may implement another deterministic finite state machine.

The protocol used for managing DAG configuration changes may be designed to maximize the availability or "liveness" of the DAG in various embodiments. For example, the DAG nodes may not need to synchronize their views of the DAG's configuration in at least some embodiments; thus, the protocol used for transition record propagation may work correctly even if some of the nodes along a replication pathway have a different view of the current configuration of the journal DAG than other nodes. In FIG.

5, each of the nodes may update its respective journal configuration view 574 (e.g., 574A, 574B, 574C or 574D) based on the particular sequence of configuration-delta messages 524 it has received from the configuration manager 522. It may thus be the case, in one simple example scenario, that one node A of a DAG 540 continues to perform its state transition processing responsibilities under the assumption that the DAG consists of nodes A, B, C and D in that order (i.e., with a replication pathway A-to-B-to-C-to-D), while another node D has already been informed as a result of a configuration-delta message that node C has left the DAG, and has therefore updated D's view of the DAG as comprising a changed pathway A-to-B-to-D. The configuration manager may not need to request the DAG nodes to pause processing of transactions and corresponding journal entries in at least some embodiments, despite the potentially divergent views of the nodes regarding the current DAG configuration. Thus, the types of "stop-the-world" configuration synchronization periods that may be required in some state replication techniques may not be needed when using replication DAGs of the kind described herein to implement persistent journals for distributed transaction management. Although a linear replication pathway is shown in FIG. 5, in general, a replication pathway may include branches at least at some points of time (e.g., during periods when some DAG nodes have received different configuration delta messages than others). Under most operating conditions, the techniques used for propagating DAG configuration change information may eventually result in a converged consistent view of the DAG's configuration at the various member nodes, while minimizing or eliminating any downtime associated with node failures/exits, node joins or node role changes. It is noted that in some embodiments, journal entries may be stored without using the kinds of replication DAGs illustrated in FIG. 5.

In at least some embodiments, the nodes of a replication DAG may each be implemented as a respective process or thread running at a respective host or hardware server. The hosts themselves may be physically dispersed, e.g., within various data centers of a provider network. In one embodiment, a provider network at which journal-based transactions are implemented may be organized into a plurality of geographical regions, and each region may include one or more availability containers, which may also be termed "availability zones" herein. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. In some such embodiments, one or more nodes of a replication DAG 540 may be implemented at a different availability container than other nodes of the replication DAG, thereby increasing the robustness and durability of the journal.

Rejection Cause Descriptors

Figure 6:
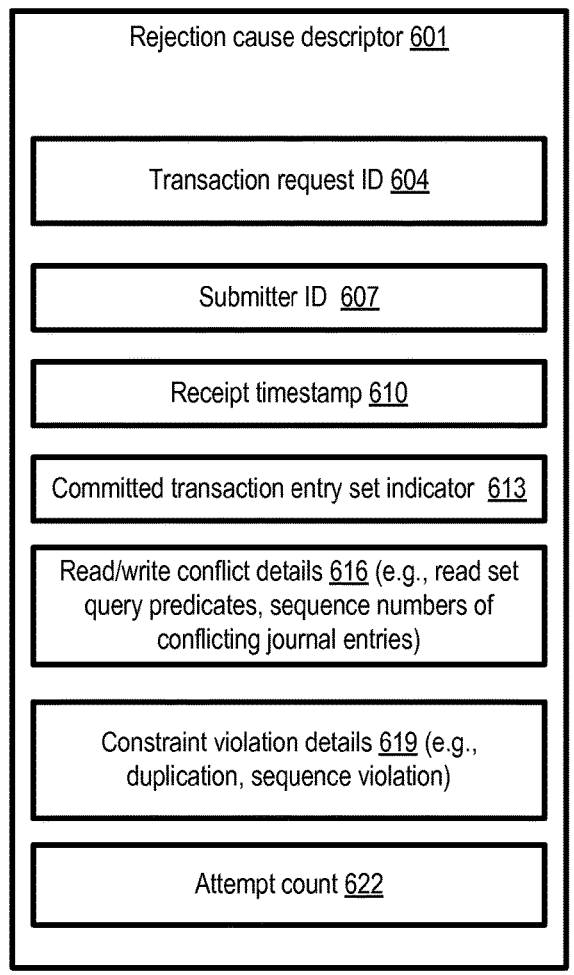
FIG. 6 illustrates example elements of a rejection cause descriptor which may be obtained for a rejected transaction of a journal-based storage system, according to at least some embodiments.

In a database at which a journal-based optimistic concurrency control algorithm of the kind discussed above is used, proposed transactions for which read-write conflicts have been identified may be rejected as discussed earlier. Several different queries or query predicates may have been used for the reads which form a given rejected transaction's read set, and it may sometimes be the case that the submitter of the transaction request (or the owner of the application for which the transaction request was prepared) may benefit from some indication as to the specific reason why the transaction was rejected. Such information, especially when aggregated over many different rejected transactions, may be useful, for example, to identify highly-contended-for portions of the database, which in turn may in some cases eventually lead to a redesign of the application or to configuration changes (e.g., journal schema changes) which may help lower contention levels and thereby lower transaction rejection rates. In order to provide such rejection-related information, in at least some embodiments respective rejection cause descriptors may be obtained at or by a performance analyzer from the journal manager responsible for implementing the optimistic concurrency control algorithm. FIG. 6 illustrates example elements of a rejection cause descriptor which may be obtained for a rejected transaction of a journal-based storage system, according to at least some embodiments. As shown, rejection cause descriptor 601 may include a transaction request identifier 604, a submitter identifier 607, a receipt timestamp 610, an indication 613 of the committed transaction entry set examined for conflict detection with respect to the rejected transaction, read/write conflict details 616, constraint violation details 619, and/or an attempt count 622 in the depicted embodiment.

In some embodiments, each transaction request may be assigned an identifier 601, e.g., by the transaction submitter and/or by the journal manager at which the request is received. The identifier may be used to log the progress of the transaction request—e.g., within various database logs or audit record. In some embodiments, an identifier 607 (e.g., an IP address, hostname, process name or process identifier, or some combination of such information) of the submitter of the rejected transaction may be included in the rejection cause descriptor 601. An indication of the local wall-clock time at which the transaction request was received at a journal manager may be stored in receipt timestamp 610 in some embodiments. In at least one embodiment, an indication of the time at which the decision to reject the transaction was made may also or instead be included in the descriptor 601.

As discussed above in the context of FIG. 3, the journal manager responsible for rejecting the transaction request may have identified a committed transaction entry set for read-write conflict analysis with a transaction request based on a conflict check delimiter. The range of sequence numbers of the committed transaction entry set, or some other identification of the members of that set, may be stored in the committed transaction entry set indicator 613 in the depicted embodiment. Details 616 regarding the specific read/write conflicts identified using the committed transaction entry set and the read set of the transaction request may include, for example, indications of the read query predicates, an identifier (such as a sequence number) of each committed transaction entry with which a conflict was identified for a given read query predicate, and/or the full texts of the read query and conflicting write(s) in various embodiments. In some embodiments, one or more keys (e.g., primary keys) of the records of the read set and/or the conflicting write set may be included in the read/write conflict details 616.

In at least some embodiments, a transaction request may be rejected on the basis of logical constraint violations (e.g., instead of or in addition to being rejected due to read-write conflicts). Any of several types of logical constraints may be enforced at a journal-based database, including for example de-duplication constraints and/or sequencing constraints. For some distributed applications operating in networks in which packets may be lost or delivered out of order, or in which transaction-submitting nodes may sometimes appear to have failed even though they remain active, it may be the case that duplicate transaction requests may sometimes be generated. If the business logic of the application demands that a given transaction be permitted only once, a de-duplication constraint may be enforced. In accordance with a duplicate detection algorithm, an exclusion signature (which may differ from the write set descriptor in some embodiments) representing the proposed writes of the transaction may be included in a transaction request together with a duplication check delimiter. The duplication check delimiter may be used to identify a set of committed transaction entries with respect to which duplication checks are to be performed, and the exclusion signature of the request may be compared with respective exclusion signatures stored in each of the committed transaction entries identified using the duplication check delimiter. If the exclusion signature of the requested transaction matches an exclusion signature of a committed transaction, the request may be rejected.

Similarly, for some applications a transaction submitter may wish to ensure that a particular transaction request TR1 is committed only if another transaction TR2 has already been committed. Such a sequencing constraint may be implemented by including a required signature (representing TR2's writes) in TR1, and storing sequencing signatures in each committed transaction entry (e.g., derived from the writes of the entry). During TR1's commit processing, the journal manager may identify a subset of committed transaction entries (e.g., using a sequencing check delimiter sequence number indicated in TR1) to be examined to determine whether TR2 has been committed. If the required signature indicated in TR1 matches the sequencing signature of one of the committed transaction entries CTE1, this may indicate that CTE1 represents the commit of TR2, so that the sequencing constraint requirement of TR1 has been met. In embodiments in which de-duplication, sequencing, or other types of logical constraints are enforced, and a transaction request is rejected due to a violation of such a constraint, various details regarding the violation may be included in constraint violation details element 619 of a rejection cause descriptor 601. In at least some embodiments in which a transaction request may be resubmitted after it is rejected, an indication of the number of times a given rejected transaction has been submitted may be provided via attempt count field 622. A high attempt count for a rejected transaction may indicate severe contention, and may be a useful datum provided by a performance analyzer. In various embodiments, one or more of the elements shown in FIG. 6 may not be included in a rejection cause descriptor 601, while other elements not shown in FIG. 6 may be incorporated within a rejection cause descriptor in other embodiments.

Performance Analyzer Interfaces

Figure 7:
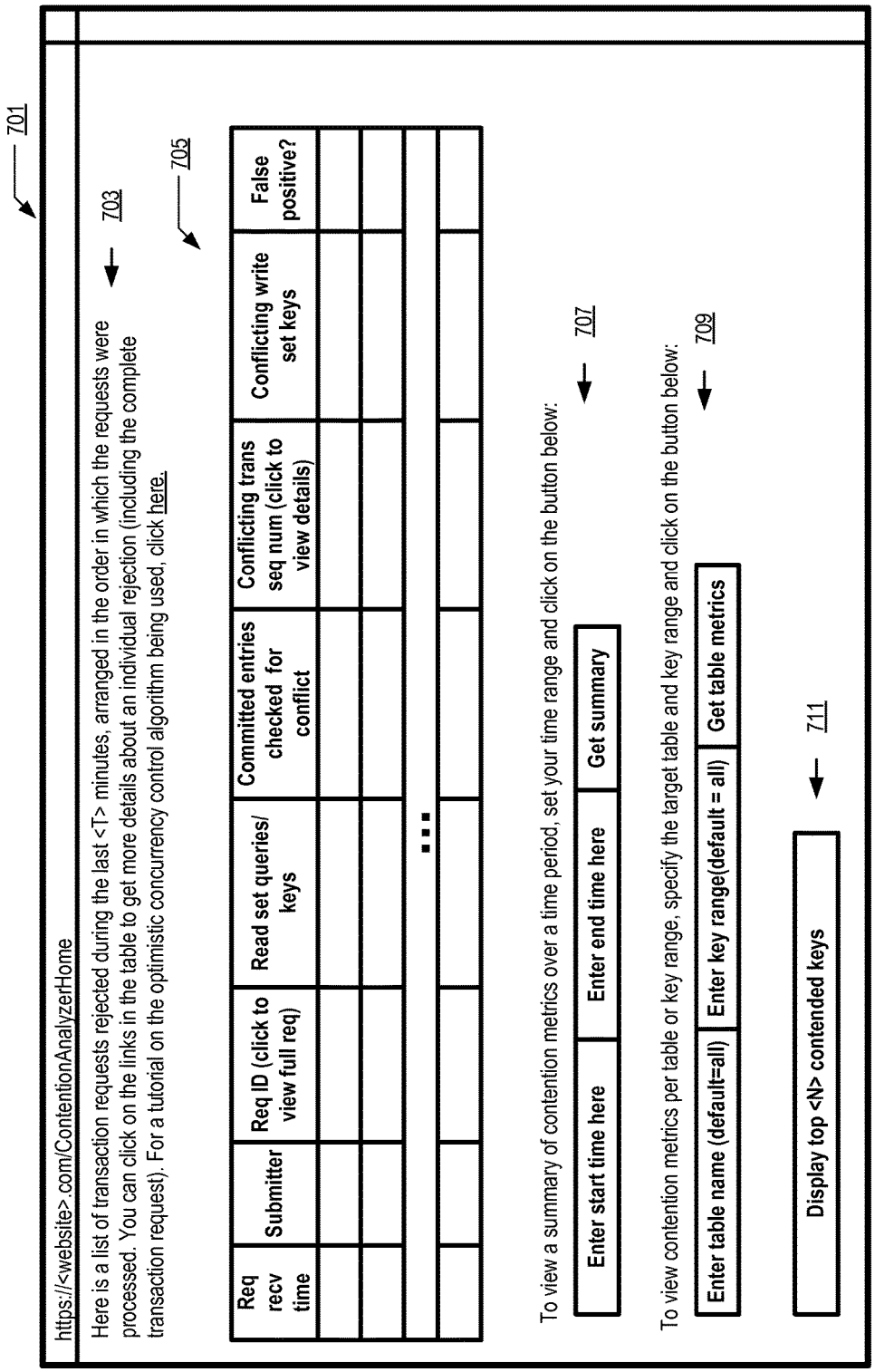
FIG. 7 illustrates an example web-based programmatic interface that may be implemented to provide contention analysis metrics of a journal-based storage system, according to at least some embodiments.

As indicated in FIG. 1, several different kinds of analyses or recommendations may be provided programmatically by a performance analyzer of a journal-based multi-data-store database. FIG. 7 illustrates an example web-based programmatic interface that may be implemented to provide contention analysis metrics of a journal-based storage system, according to at least some embodiments. As shown, web page 701 of the interface may include a message area 703, a table 705 of contention-related data pertaining to some number of recently-rejected transactions, and one or more controls (e.g., 707, 709, and 711) to provide additional contention-related metrics in the depicted embodiment. In message area 701, an overview of the table 703 may be provided, e.g., indicating that the table's entries represent transactions rejected during a particular time window of T minutes. In addition, a link to information about the optimistic concurrency control algorithm employed at the storage system may be provided in message area 703.

Each row of table 705 may correspond to a particular rejected transaction request, with the rows sorted based on the times at which the requests were received (indicated in the "Req recv time" column). The "submitter" column may indicate the source (e.g., the host or IP address of the submitter) of the transaction request. An identifier of the rejected transaction (which may have been generated by the submitter, the journal manager, or collectively by the submitter and the journal manager) may be indicated in the "Req ID" column, together with a link which can be clicked to reach a page displaying the entire transaction request. The query predicates and/or keys of the read set queries may be indicated in the "Read set queries/keys" column. Identifiers (e.g., sequence numbers) of the committed transaction entries which were checked for read-write conflicts with the rejected transaction may be indicated in the "Committed entries checked for conflict" column, and the sequence numbers of the particular committed transactions with which conflicts were identified may be shown in the "Conflicting trans seq num" column. The keys of the write set with which apparent conflicts were found may be shown in "Conflicting write set keys". In one embodiment in which the submitted transactions and committed transaction entries include transformed versions (rather than the full text) of the read set queries and/or the queries whose results are affected by write sets, the performance analyzer may obtain and use a set of reverse mappings to identify the keys and/or key values from their transformed versions for inclusion in table 705.

As discussed above, in some cases transformation procedures may be applied to the read queries to obtain the read set descriptors used for conflict detection, and similar transformation procedures may be used for write set descriptors. In some cases, hash functions may be used to represent the reads and writes checked for conflicts, and hash collisions may lead to false positives—i.e., scenarios in which the transformed representations of the read and write sets suggest that a conflict has occurred, even though the actual (un-transformed) reads may not have conflicted with the actual (un-transformed) writes. In some cases, e.g., if the performance analyzer is able to obtain the un-transformed read and write requests from the journal manager or from the committed transaction entries, the performance analyzer may be able to determine whether a transaction was rejected due to a false positive conflict detection. The rightmost column of table 703 may indicate, for any given rejection, whether the performance analyzer was able to determine that the rejection was the result of such a false positive conflict detection in the depicted embodiment. If a large number of false positives have led to transaction rejections, in at least some embodiments this may suggest that the transformation functions being used to represent read sets and write sets are not optimal (as the false positives may have resulted from hash collisions, for example). In at least one embodiment, an application owner or client may request that the transformation function (which may be specified as part of the journal schema of the database) be changed if there are frequent false positives, e.g., by initiating the proactive acceptability verification procedure used for journal schema modifications.

Clients of the performance analyzer may be able to obtain summaries of contention metrics (e.g., overall rejection rates as a percentage of submitted transaction rates, maximum and minimum rejection rates, etc.) for desired time intervals using web-page control 707 in the depicted embodiment. Information regarding rejected transactions containing proposed writes or reads directed to particular data objects (such as specified tables in the case of a relational data model) or key ranges of particular data objects may be obtained using control 709 in the depicted embodiment. A list of the most highly-contended keys (e.g., primary keys of objects for which read-write conflicts were detected most frequently) may be obtained via control 711. It is noted that although data objects such as tables are used as examples in FIG. 7-FIG. 10, similar performance information associated with objects of data models which do not comprise tables may be provided by performance managers in at least some embodiments.

Figure 8:
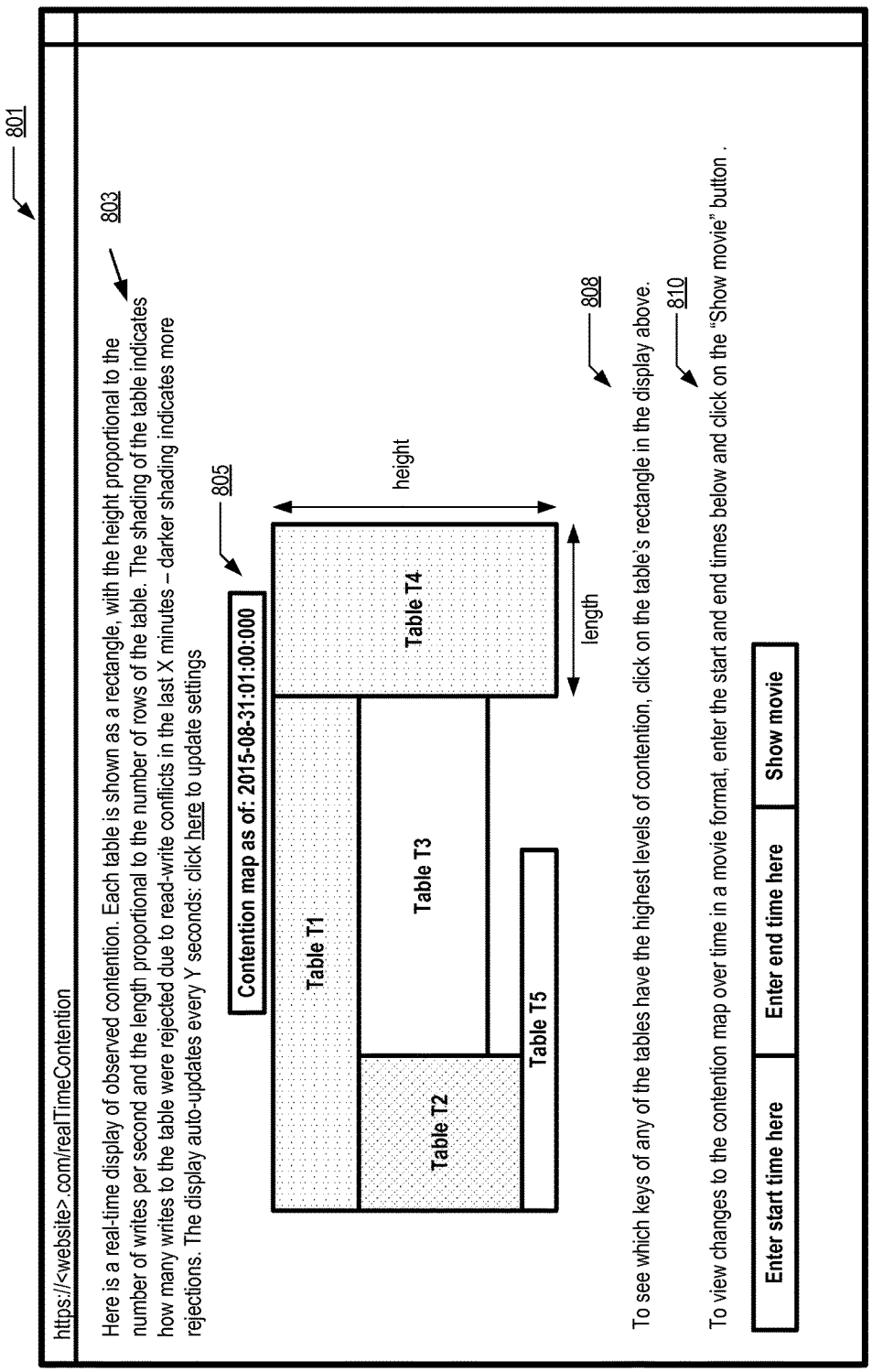
FIG. 8 illustrates an example web-based real-time display of contention analysis metrics of a journal-based storage system, according to at least some embodiments.

FIG. 8 illustrates an example web-based real-time display of contention analysis metrics of a journal-based storage system, according to at least some embodiments. Web page 801 includes a message area 803, a contention map 805 containing information regarding various tables of the database, and instructions 807 and 810 for obtaining additional views. As explained in message area 803, each of the rectangles shown in contention map 805 represents one table (e.g., table T1, T2, T3, T4 or T5). The length (size along the horizontal axis), height (size along the vertical axis) and coloring/shading of a rectangle are respectively used to represent three different characteristics or metrics of the corresponding table. The length of a rectangle is proportional of the number of distinct rows in the table, the height is proportional to the writes/second directed to the table, and the shading of the rectangle indicates the rate of rejected transactions directed to the table (with a darker shade indicating more rejections and therefore more contention). The real-time update frequency (Y seconds) of the display is indicated in message area 803; settings such as the refresh frequency and/or the mappings associated with rectangle lengths, heights and shading may be changed by clicking on a link provided in the message area.

A timestamp corresponding to the latest update is displayed just above the rectangles of contention map 805 in the depicted embodiment. Below the contention map, instructions 807 indicate that details about the contention levels (e.g., as indicated by the number of read-write conflicts identified) of particular key value or key range for any given table can be obtained by clicking on the rectangle representing the table. Web page 801 also includes controls (as indicated in instruction 810) to enable the display of changes to the tables' contention levels, sizes, and write rates, in a movie or continuous-motion format. It is noted that any of a wide variety of formats may be used for displaying real-time contention data in different embodiments. In one embodiment, for example, a tabular view (e.g., with one row of automatically-updated measures per database table) may be used, or a pie-chart view may be used. In some embodiments, clients of the performance analyzer may be able to indicate or select the kinds of metrics they wish to have displayed in real time, and the mappings between the metrics and the elements of a graphical or tabular display.

In addition to the kinds of contention-related information indicated in FIG. 7 and FIG. 8, an analytics tool component of a journal-based multi-data-store storage system may also provide or display other kinds of metrics in at least some embodiments. FIG. 9 illustrates an example web-based programmatic interface that may be implemented to provide write distribution metrics of a journal-based storage system, according to at least some embodiments. As shown, web page 901 comprises a message area 903, a table 905 with information frequently-updated portions of the database, and one or more controls (e.g., 907 or 909) to provide additional write-related metrics. As indicated in message area 903, table 905 indicates the primary key values of various data objects (e.g., table records or rows) to which multiple writes have been directed in a recent time interval (T minutes), sorted in decreasing order of the total number of writes. The four columns of table 905 (from left to right as displayed on web page 901) indicate the number of writes directed to the record, the table and primary key attribute name, the key value, and the committed transaction sequence numbers corresponding to the writes in the depicted embodiment. In some embodiments, the user of the performance analyzer may be able to obtain details (e.g., the complete contents of the committed transaction entries) by clicking on links provided in the table 905.

Write distribution summaries for customer-selected time periods may be obtained using control 907 in the depicted embodiment. Write counts for customer-selected tables and/or customer-selected key ranges may be obtained via control 909. In at least some embodiments, a real-time and/or graphical display similar to that shown for contention-related metrics in FIG. 8 may be provided for write distribution metrics by a performance analyzer.

Figure 10:
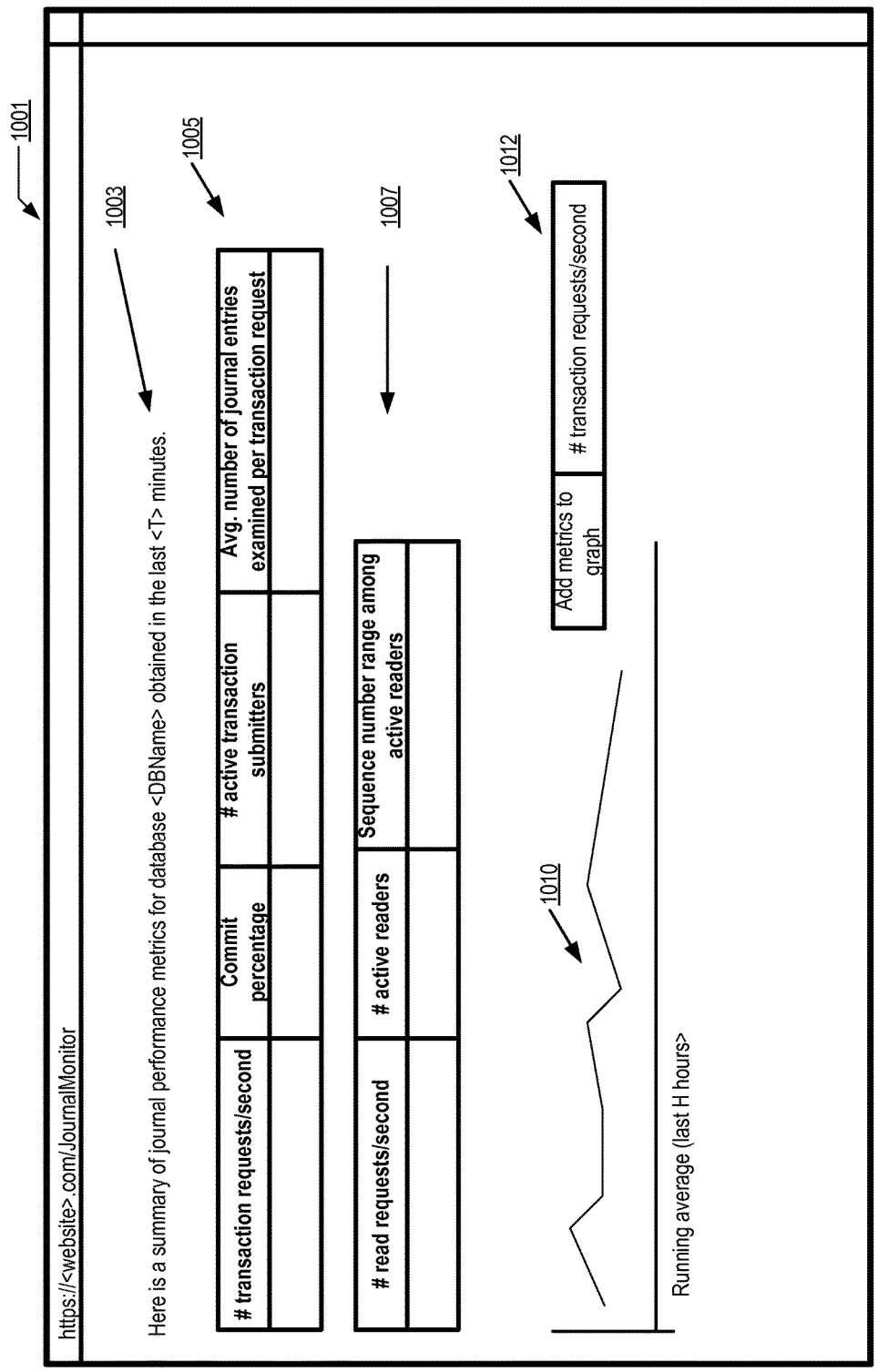
FIG. 10 illustrates an example web-based programmatic interface that may be implemented to provide performance metrics of a journal manager of a storage system, according to at least some embodiments.

FIG. 10 illustrates an example web-based programmatic interface that may be implemented to provide performance metrics of a journal manager of a storage system, according to at least some embodiments. Web page 1001 includes a message area 1003, table 1005 displaying transaction request metrics, table 1007 displaying journal read metrics, and a customizable graph 1010 to which metrics may be added by users. In table 1005, the number of transaction requests processed per second by the journal manager of a database indicated in message area 1003 is displayed in the leftmost column, averaged over a recent time interval. Other columns indicate the percent of those transaction requests that resulted in commits (as opposed to rejections), the number of active transaction submitters for the time interval, and the average number of journal transaction entries examined for conflict detection or logical constraint checking by the journal manager per transaction request.

The first two columns in table 1007 of web page 1001 indicate the number of read requests handled per second at the journal (e.g., including requests from various write appliers responsible for propagating committed writes to materialization nodes) and the number of active readers connected to the journal. The third column indicates the range of sequence numbers of the journal entries which were read during the recent time interval—indicating, for example, how far apart the cursors of the readers are. Graph 1010 displays the transaction requests per second for the last H hours. Using control 1012, additional metrics may be added to graph 1010 in the depicted embodiment. In some embodiments, an automatically-refreshed representation of the kinds of journal manager metrics displayed in web page 1001 may be provided by the performance manager. In various embodiments, metrics other than those shown in the example web-based interfaces of FIG. 7-FIG. 10 may be provided to users of the performance analyzer.

Configuration Change Recommendations

Figure 11:
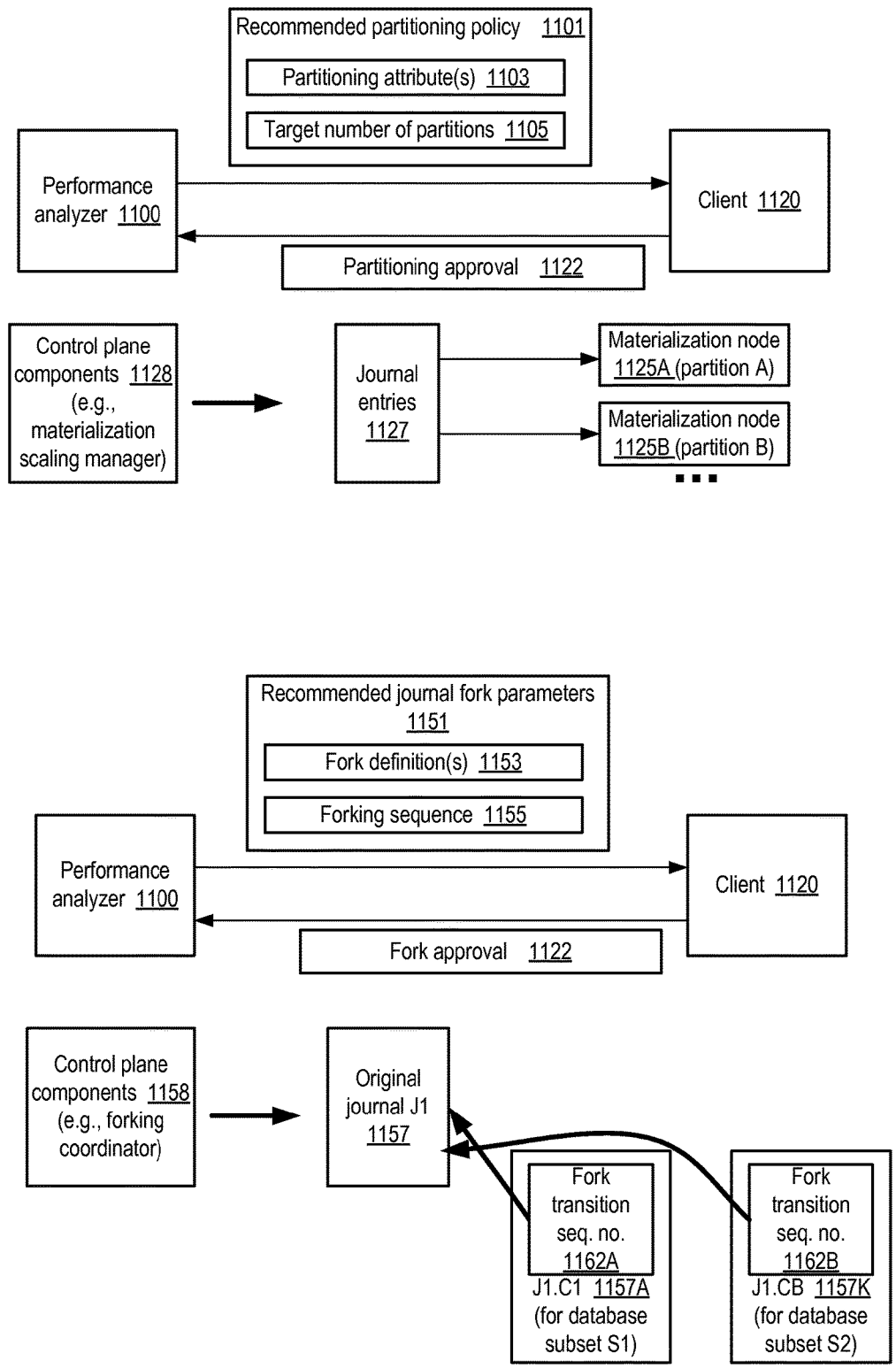
FIG. 11 illustrates example configuration change recommendations which may be generated by an intelligent performance analyzer of a journal-based storage system, according to at least some embodiments.

In at least some embodiments, instead of materializing all the data of a particular table (or other subset of the database) at one materialization node, the workload associated with materializing the table may be split among several different materialization nodes by implementing a system-recommended or client-selected partitioning policy. In other embodiments, one or more new journals (each with its own journal manager) may be forked from an existing journal to help distribute the workload associated with commit processing. In some embodiments, intelligent analytics tools which can recommend configuration changes involving materialization partitioning policies and/or journal fork operations based on the analysis of collected metrics may be implemented within the control plane (administrative) components of the multi-data-store database. FIG. 11 illustrates example configuration change recommendations which may be generated by an intelligent performance analyzer of a journal-based storage system, according to at least some embodiments.

The performance analyzer 1100 may examine metrics pertaining to the temporal and key-based distribution of writes among and within various tables, and generate a recommended partitioning policy 1101 in the depicted embodiment. The partitioning policy 1101 may indicate, for example, a set of partitioning attributes 1103 (e.g., a subset of the attributes which make up the primary keys of one or more tables) and a target number of partitions into which the selected table(s) should be subdivided for materialization purposes. For example, if a table T1 has a primary key comprising three attributes Attr1, Attr2 and Attr3, some combination of those three attributes may be selected as the set of attributes whose values should be used to define partition boundaries. In some embodiments, the recommended partitioning policy may include the attribute values which define the partition boundaries—e.g., Attr1 values of between 0 and 10000 may be assigned to partition 1, Attr1 values greater than or equal to 10000 may be assigned to partition 2, and so on. In scenarios in which the distribution of write is skewed, the ranges selected for the different partitions may also be non-uniform in size. For example, if writes to data objects with Attr1 values 1-3 occur far more frequently that writes to data objects with Attr1 values of 4 or higher, the recommended partitioning policy may suggest four partitions: partition A for Attr1 value 1, partition B for Attr1 value 2, partition C for Attr1 value 3, and partition D for all other Attr1 values.

The recommended partitioning policy may be transmitted programmatically to a client 1120 of the database in the depicted embodiment. The client may determine whether to accept or reject the recommendation, and transmit a programmatic response. If the response comprises an approval 1122 of the recommended partitioning policy, in some embodiments the control plane of the multi-data-store database may initiate the establishment of the required materialization nodes. For example, in the depicted embodiment, a materialization scalability manager 1128 of the database control plane may establish one or more new materialization nodes, such as node 1125A for a recommended partition A and node 1125B for a recommended partition B. In some embodiments, the client 1120 may initiate the establishment of the materialization nodes corresponding to the approved partitioning policy. After the appropriate number of materialization nodes has been established, respective write appliers of the nodes may start processing committed transaction entries 1127 of the journal, propagating respective subsets of the writes indicated in the entries to the different materialization nodes.

Based at least in part on metrics collected from the journal manager, an intelligent performance analyzer 1100 may prepare a set of recommended journal fork parameters 1151 in some embodiments, and transmit the parameters to a client 1120. The parameters 1151 may include, for example, a set of fork definitions 1153 indicating which subsets of the data should be handled at respective forked journals, and a forking sequence 1155 indicating an order in which the new forks should be created. If the client 1120 approves the forking parameters, a control plane component such as a forking coordinator 1158 may implement a phased transition to a new set of journals. In one embodiment, for example, transaction processing operations directed at a particular to-be-forked subset S1 of the database (e.g., both the analysis of new transaction requests directed to S, and the propagation of committed writes of S1 to the materialization nodes set up for S1) may be temporarily suspended by the forking coordinator (e.g., by updating metadata entries accessible to transaction submitters and write appliers). During the interval that transaction processing for S1 is suspended, transaction processing for the remainder of the database may continue without being impacted by the suspension in the depicted embodiment. The forking coordinator may identify a fork transition sequence number corresponding to a selected entry in the parent journal or original journal J1. A new child journal such as J1.C1 may be established, and a pointer to the parent journal J1 indicating the fork transition sequence number (e.g., 1162A) may be stored in the new child journal. The pointer may indicate that committed transaction entries pertaining to S1 with sequence numbers lower than the fork transition sequence number are to be found in J1, while committed transaction entries pertaining to S1 with higher sequence numbers than the fork transition sequence number are to found in J1.C1. After child journal J1.C1's journal manager is activated, transaction processing related to subset S1 may be restarted (e.g., by updating the metadata entries), with new transaction requests associated with S1 being sent to J1.C1's journal manager, and write appliers reading committed transaction entries with respect to S1 from J1.C1. A similar phased transition (involving temporary suspension of transaction processing operations for a different subset S2 of the data, the establishment of a different child journal J1.C2 with a pointer to a second fork transition sequence number 1162B, etc.,) may be orchestrated by the forking coordinator. In this way, the workload associated with commit processing and journal entry storage may be distributed among multiple journals in the depicted embodiment based on the analysis and recommendations of the performance analyzer. In some embodiments, journal forking and/or the implementation of partitioning policies for materialization may not be supported.

Methods for Implementing Performance Analyzers

Figure 12:
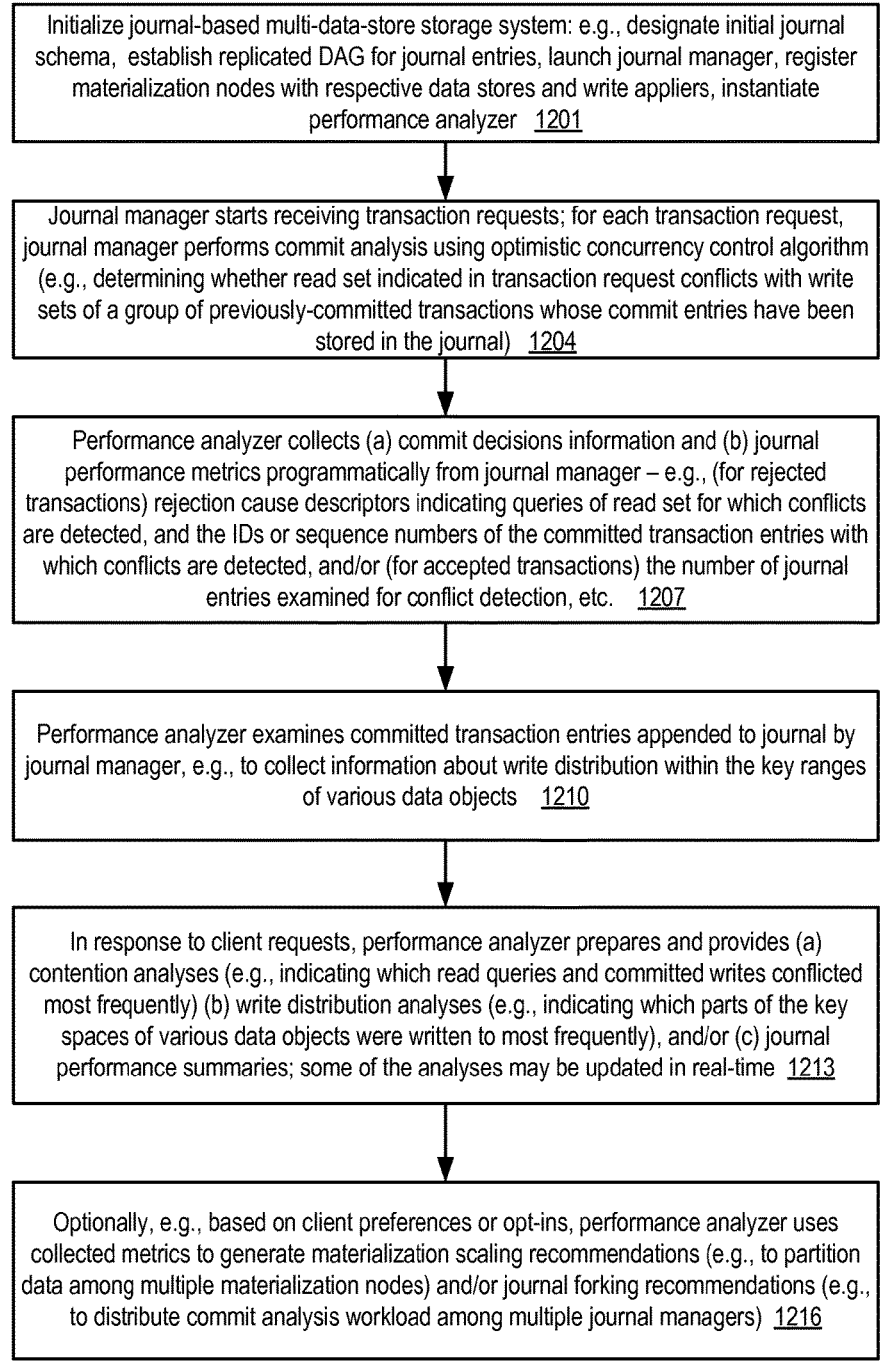
FIG. 12 is a flow diagram illustrating aspects of operations that may be performed at a performance analyzer of a journal-based multi-data-store storage system, according to at least some embodiments.

FIG. 12 is a flow diagram illustrating aspects of operations that may be performed at a performance analyzer of a journal-based multi-data-store storage system, according to at least some embodiments. The storage system may be initialized (element 1201), for example, by registering the materialization nodes, designating an initial version of a journal schema, establishing a replicated DAG for the journal entries, instantiating a journal manager, setting up journal entry processors (such as write appliers), initializing analytics tools including a performance analyzer and the like. In at least some embodiments, the performance analyzer may be implemented at one or more computing devices of the control plane or administrative portion of the storage service. Each of the data stores of the materialization nodes may have a respective concrete schema specifying characteristics of the data objects on which transactions are to be managed using the journal, and the journal schema may be based at least in part on the various concrete schemas of the members. The set or range of values allowed for various data object attributes in the journal schema may be selected to maximize the overlap between the value ranges permitted by the concrete schemas. The journal schema may also include or reference a specification of a data-store-independent transaction language to be used to submit transactions of various categories, e.g., data object modification transactions, journal schema modification transactions, and the like. In some embodiments, any changes proposed to the journal schema may have to be pre-approved by at least a subset of the materialization nodes.

After the storage system has been initialized, transaction requests may be received at the journal manager (element 1204), e.g., from various authorized transaction submitters such as client-side components, and processed in accordance with an optimistic concurrency control algorithm. A particular transaction request may contain, for example, a write set descriptor indicating one or more proposed writes, a read set descriptor indicating one or more data objects which were read during the preparation of the transaction request (and therefore may have affected the contents of the proposed writes), and a conflict check delimiter to be used during commit analysis. The proposed writes may be directed, for example, to a data object and/or to the journal schema. The commit analysis performed by the journal manager may include, for example, identifying a subset of committed transaction entries of the journal based on the conflict check delimiter indicated in the transaction request, and determining whether a read-write conflict exists between the read set of the transaction request and the write set descriptors of the subset of committed transaction entries. In some embodiments, as discussed above, read-write conflict detection may comprise comparing transformed representations (e.g., a set of integers generated by the transaction submitter using a hash function) of the read queries corresponding to the read set with transformed representations of queries whose results would be affected by committed writes indicated in the subset of journal entries. If the transformed representations indicate an overlap between the read set of the transaction request and previously-committed write, the transaction request may be rejected; otherwise, the transaction may be accepted for commit and a new committed transaction entry (e.g., containing some or all of the elements of the transaction request, including the write set descriptor) may be appended to the journal. Each journal entry may comprise a sequence number indicative of the order in which the journal manager processed the corresponding transaction request relative to the requests of other transactions represented in the journal.

The performance analyzer may collect data from several different sources in the depicted embodiment. For example, a respective rejection cause descriptor may be obtained from the journal manager for various rejected transactions (as indicated in element 1207). A given rejection cause descriptor may indicate, for example, one or more read query predicates (or entire queries) of the rejected transaction, and/or identifiers (e.g. sequence numbers) of the conflicting committed transactions identified during commit analysis. In some embodiments, all the elements of the rejected transaction request and/or the conflicting committed transaction entries may be included in the rejection cause descriptor. In at least one embodiment in which read set descriptors are prepared by transaction submitters using transformation functions such as hash functions, the performance analyzer may collect both the untransformed version of the read set (e.g., the full text of the queries or query predicates) and the transformed version. Similarly, both un-transformed and transformed versions of write set descriptors may be obtained by the performance analyzer in some embodiments. Having both the transformed and un-transformed representations of the conflicting reads and writes may enable the performance analyzer to identify false positive conflict detections in some embodiments—e.g., scenarios in which an apparent conflict is (incorrectly) detected due to a hash collision or some other transformation-related reason. For committed transactions, in some embodiments the performance analyzer may collect information about the number of journal entries examined for conflict detection. In one embodiment, the performance analyzer may also collect metrics of journal manager performance which may not be directly related to contention—e.g., the number of transaction requests handled per second, the number of concurrently-active transaction submitters, the number of read requests (e.g., from write appliers) handled per second, the number of concurrently-active write appliers, and so on.

The performance analyzer may also examine the journal entries via the journal's read interfaces (element 1210) in at least some embodiments, e.g., to collect information regarding the distribution of committed writes within the value ranges of various data object attributes. The performance analyzer may implement a number of programmatic interfaces to enable clients to submit performance-related queries and receive responses to such queries. The interfaces may include, for example, one or more web pages (e.g., similar to the web pages shown in FIG. 7-FIG. 10), APIs, command-line tools and/or graphical user interfaces. Ad indicated in element 1213, the performance analyzer may provide contention analyses (e.g., generated using the collected rejection cause descriptors), write distribution analyses (e.g., based on the data collected regarding committed transactions from the journal manager or from journal entries), journal manager performance summaries/reports and the like in response to client requests received via the programmatic interfaces. In at least one embodiment, the performance analyzer may use the data it has collected to provide configuration change recommendations to clients (element 1216), such as materialization scaling recommendations (e.g., to establish respective materialization nodes for respective partitions of the database) and/or journal forking recommendations (e.g., to establish one or more child journals whose journal managers can take over some of the commit analysis workload of the journal currently in use).

Test Frameworks with Deterministic Scheduling Controls for Journal-Based Databases In distributed journal-based databases of the kind described above, several types of components (e.g., write appliers, transaction submitters, and journal managers) may typically perform their operations asynchronously and independently with respect to each other. The results of particular commit analyses performed by the journal manager may depend on the order in which events associated with the preparation of the corresponding transaction requests happened to occur. For example, depending on whether a particular committed write was propagated to a materialization node before or after contents of a read set of a transaction request were read from that materialization node, the transaction request may be rejected or approved for commit. In general, in a distributed system in which network packets may be delayed or lost, it may be hard to predict the order in which various events such as write propagations, reads of materialized data, receipts of transaction requests and the like are going to be completed. In some embodiments, applications whose data is managed using the journal-based database may be tested for correctness using a framework which provides controls for deterministically scheduling the operations performed at the different components of the database relative to each other in various orders, so that the behavior of the application in a variety of scenarios can be tested more efficiently than if all the entities involved in transaction preparation and processing acted independently.

Figure 13:
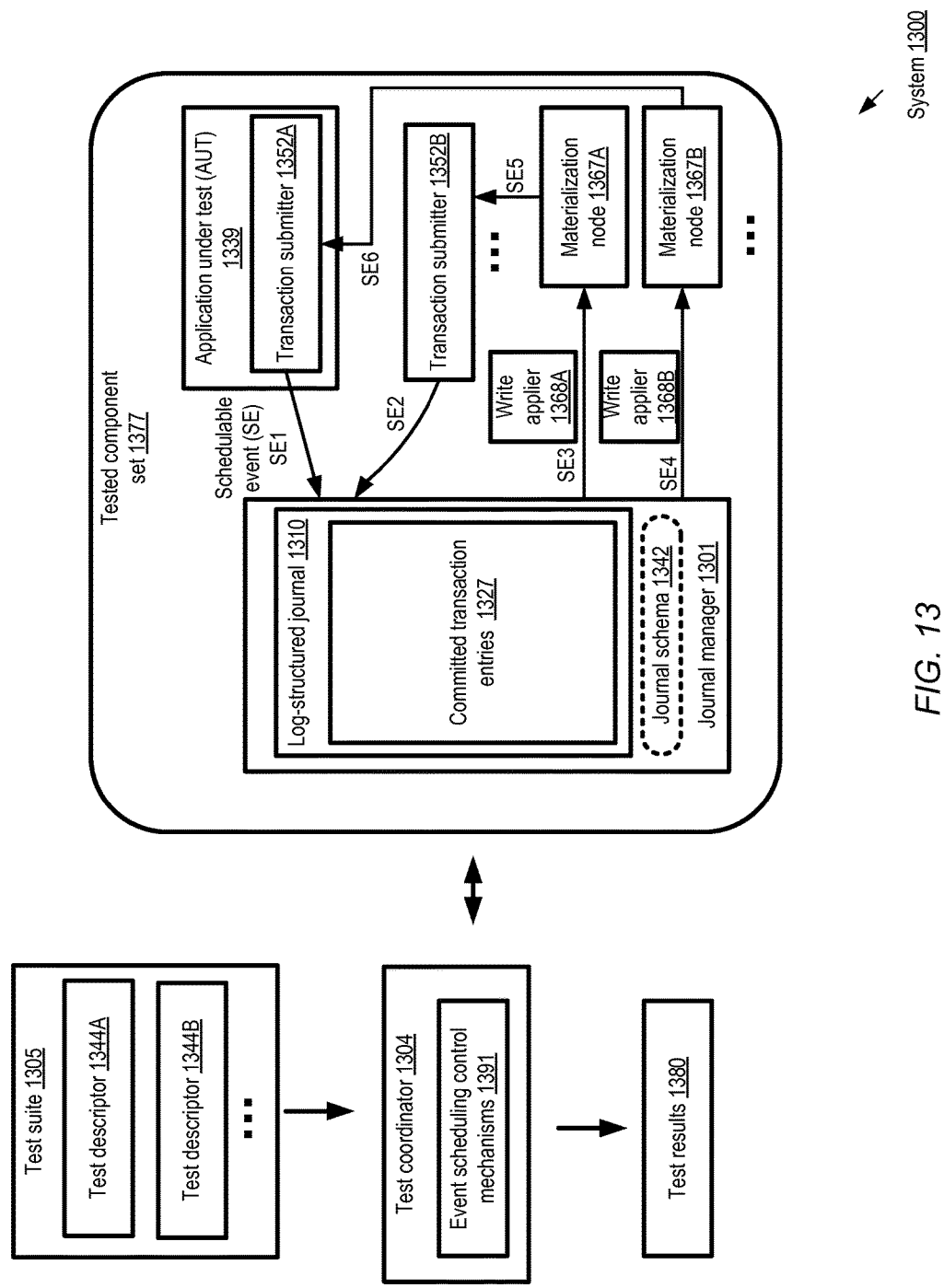
FIG. 13 illustrates an example system environment for testing applications whose data are managed using journal-based storage systems, according to at least some embodiments.

FIG. 13 illustrates an example system environment for testing applications whose data are managed using journal-based storage systems, according to at least some embodiments. System 1300 includes a test coordinator 1304 responsible for implementing a test suite 1305 on a test component set 1377 which includes an application under test 1339. Application under test (AUT) 1339 may comprise any of a wide variety of single-threaded or multi-threaded applications whose data set is stored at one or more data stores at respective materialization nodes 1367, such as nodes 1367A and 1367B. Transactions representing proposed changes to the state of the AUT's data are submitted to a journal manager 1301, e.g., from one or more transaction submitters 1352A which are part of the AUT and/or from one or more transaction submitters 1352B external to the AUT in the depicted embodiment. The journal manager implements an optimistic concurrency control algorithm of the kind described earlier to determine whether a given transaction request is to be accepted for commit. A transaction request may include a write set descriptor indicating one or more proposed writes to one or more data objects in the depicted embodiment, a read set descriptor indicating one or more reads of materialized data from the materialization nodes (where the writes may depend on results of the reads), and a conflict check delimiter which can be used to select a subset of committed transaction entries 1327 of a log-structured journal 1310 to be checked for possible conflicts with the reads of the read set.

If the journal manager 1301 detects a read-write conflict (e.g., if a write indicated in the subset of committed transaction entries could have affected the contents of the read set of a transaction request), the transaction request may be rejected. If no conflict is detected, the transaction request may be approved for commit, and a new committed transaction entry indicating the write set descriptor may be added to the journal 1310 by the journal manager. Each committed transaction entry may include a commit sequence number. A data-store-independent transaction language used for the transaction requests may be indicated in a journal schema 1342, which may also indicate the attributes of various data objects as well as the data types or allowed ranges of the attributes in the depicted embodiment. Each materialization node 1367 may have an associated write applier 1368 (e.g., write applier 1368A for node 1367A, and write applier 1368B for node 1367B). The write appliers 1368 may each examine the entries of the journal in sequence number order and propagate the relevant subset of writes to respective destinations representing data stores at their materialization nodes 1367. In at least some test execution environments, write appliers may propagate the writes to storage or memory destinations that emulate the data stores, instead of using full-fledged or production-level data stores.

In the depicted embodiment, the test coordinator 1304 may utilize event scheduling control mechanisms 1391 to cause transaction processing-related events indicated in test descriptors 1344 (e.g., 1344A and 1344B) to occur in a desired order. A given test descriptor 1344 may, for example, indicate a particular order in which a read R1 of a materialized version of a data object, a propagation P1 of a write which can affect the data read by R1, and/or the submission of a transaction request TR1 whose read set includes R1 are to occur in a given test of the AUT 1339. In addition to an event sequence, a given test descriptor 1344 may also include a number of other elements in various embodiments, such as a specification of an initial state of the AUT 1339 prior to the event sequence, a specification of an expected final state of the AUT after the event sequence completes, and the like, as described below in further detail. Examples of the kinds of schedulable events whose relative ordering can be arranged using the mechanisms 1391 are indicated by the "SE" labels in FIG. 13. For example, SE5 and SE6 represent examples of the reading of materialized data from materialization nodes, SE1 and SE2 represent the submissions if transaction requests, and SE3 and SE4 represent the propagation of committed writes to the materialization nodes from the journal by write appliers. In some implementations, a given test descriptor may comprise several different event sequences, e.g., sequences in which the relative order of various events is shuffled so as to mimic different kinds of scenarios may be experienced by the AUT in production environments.

In some embodiments, the test coordinator 1304 may determine various desired properties of a test execution environment (e.g., the mappings between the test component set 1377 and processes or threads, the number of different computer hosts to be used for the tested components, whether persistent storage or volatile memory is to be used for the journal and materialized data, and so on) in which one or more tests corresponding to test descriptors 1344 are to be run. The test coordinator 1304 may then instantiate the test components, such as the journal manager, the write appliers, the (emulated or real) data stores, and a test version of the AUT itself, using a set of resources allocated for a selected test execution environment. Corresponding to a given test descriptor 1344, an initial set of data may be loaded (e.g., comprising various journal entries 1327, materialized data objects at nodes 1367, and the like). The test coordinator may then utilize the scheduling control mechanisms 1391 to cause the events of the test descriptor's event sequence to occur in the desired order. The event sequence may result, for example, in one or more transaction requests being rejected, and/or one or more transaction requests being accepted for commit. The behavior of the AUT in response to the events of the event sequence may be examined, e.g., by capturing application state indicators produced as output by the AUT, or by examining contents of data structures of the AUT. In some cases, an indication of only the final state of the application (i.e., the state reached after the event sequence completes) may be required for a given test descriptor 1344; in other cases, respective indications of several intermediate states of the AUT corresponding to different events of the event sequence may be captured. The test coordinator 1304 may store the indications of the AUT state in test results 1380 in the depicted embodiment. If the results indicate that the AUT did not respond as expected, this may help with debugging the AUT. In contrast, if the AUT behaved as expected, this may increase confidence in the correctness of the AUT prior to deploying the application in a production environment. Using the test coordinator's control mechanisms 1391 and the appropriate test execution environment, it may become possible to subject the AUT at a relatively low cost to a variety of event sequences representing different optimistic concurrency control scenarios which may be hard to reproduce reliably in a production environment.

Figure 14:
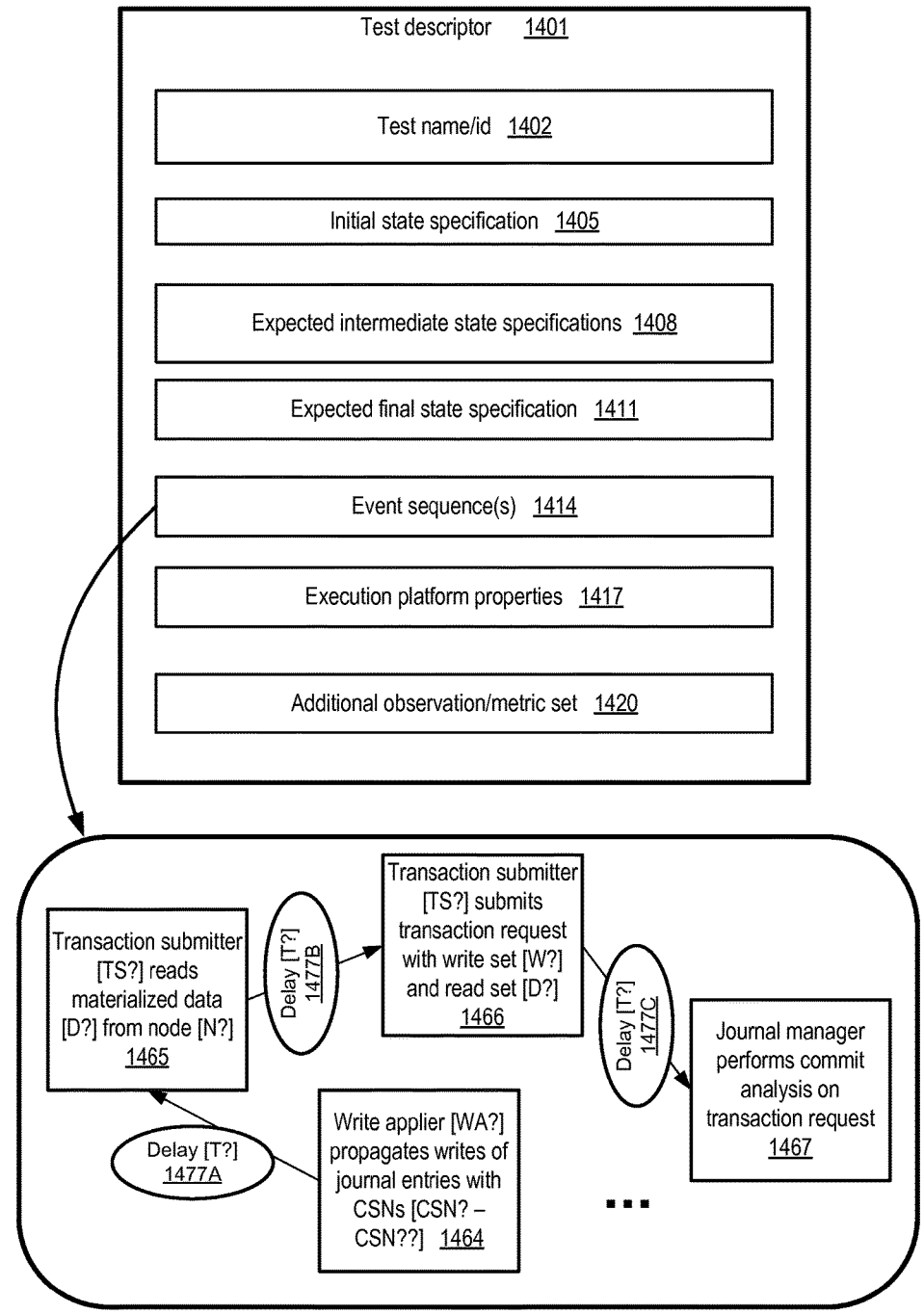
FIG. 14 illustrates example components of a test descriptor to be used to test an application utilizing a journal-based storage system, according to at least some embodiments.

FIG. 14 illustrates example components of a test descriptor to be used to test an application utilizing a journal-based storage system, according to at least some embodiments. As shown, test descriptor 1401 may include a test name or identifier 1402, an initial state specification 1405, expected intermediate state specifications 1408, an expected final state specification 1411, one or more event sequences 1414, desired execution platform properties 1417, and an additional observation or metric set 1420 in the depicted embodiment. The initial state specification 1405 may include, for example, an indication of a data set to be loaded into the journal and/or the materialization nodes of the execution environment prior to the implementation of the event sequences 1414. In some embodiments, respective indications of the desired state of the application under test after respective events of the event sequence have been performed may be stored in the intermediate state specifications 1408. Such state indications may include, for example, contents of various data structures internal to the application, contents of the journal and materialization nodes, messages written by the application under test to an application log, and so on. Similarly, the expected final state of the application 1411 may be expressed in the test descriptor 1401 in terms of the contents of application data structures, the journal, materialization nodes, logs, and the like in different embodiments. In some embodiments, intermediate state specifications may not be included in at least some test descriptors.

An event sequence 1414 may include details of the relative scheduling of various types of events associated with transaction processing in the depicted embodiment. The types of events may include, for example, write propagation events 1464, materialized read events 1465, transaction submissions 1466, and/or commit analyses 1467. Events may be scheduled using configurable inter-event delays such as 1477A-1477C. Examples of parameters for which values may be specified for each instance of an event type and for the delays are indicated using question marks in FIG. 14. For example, for a write propagation event 1464, parameters may include the set of sequence numbers [CSN?-CSN??] and the particular write applier [WA?] responsible for transmitting the writes to the storage/memory destinations representing the data stores of materialization nodes. For a read operation 1465, the particular transaction submitter [TS?], the data object to be read [D?} and the materialization node [N?] may be indicated via parameters. For a transaction submission, parameters may include the submitter [TS?], the read set [D?] and the write set [W?]. The duration of the delays [T?] may be specified via parameters in some embodiments. The delays may be expressed in real or wall-clock time in some embodiments, and using logical timestamps (e.g., commit sequence number changes) in other embodiments. Other combinations of properties of the various events and/or inter-event delays may be parameterized in some embodiments. Required or preferred properties 1417 of text execution environments may include, for example, the kinds of hosts or computer servers to be used, the process architecture to be used for the different components, and so on. Additional observations 1420 to be captured during the test may include, for example, contention-related metrics captured by a performance analyzer, write distribution metrics, the time it takes to set up and execute the test, and so on. In at least some embodiments, a test descriptor may not necessarily include all the elements indicated in FIG. 14, or may include one or more elements not shown in FIG. 14.

Figure 15:
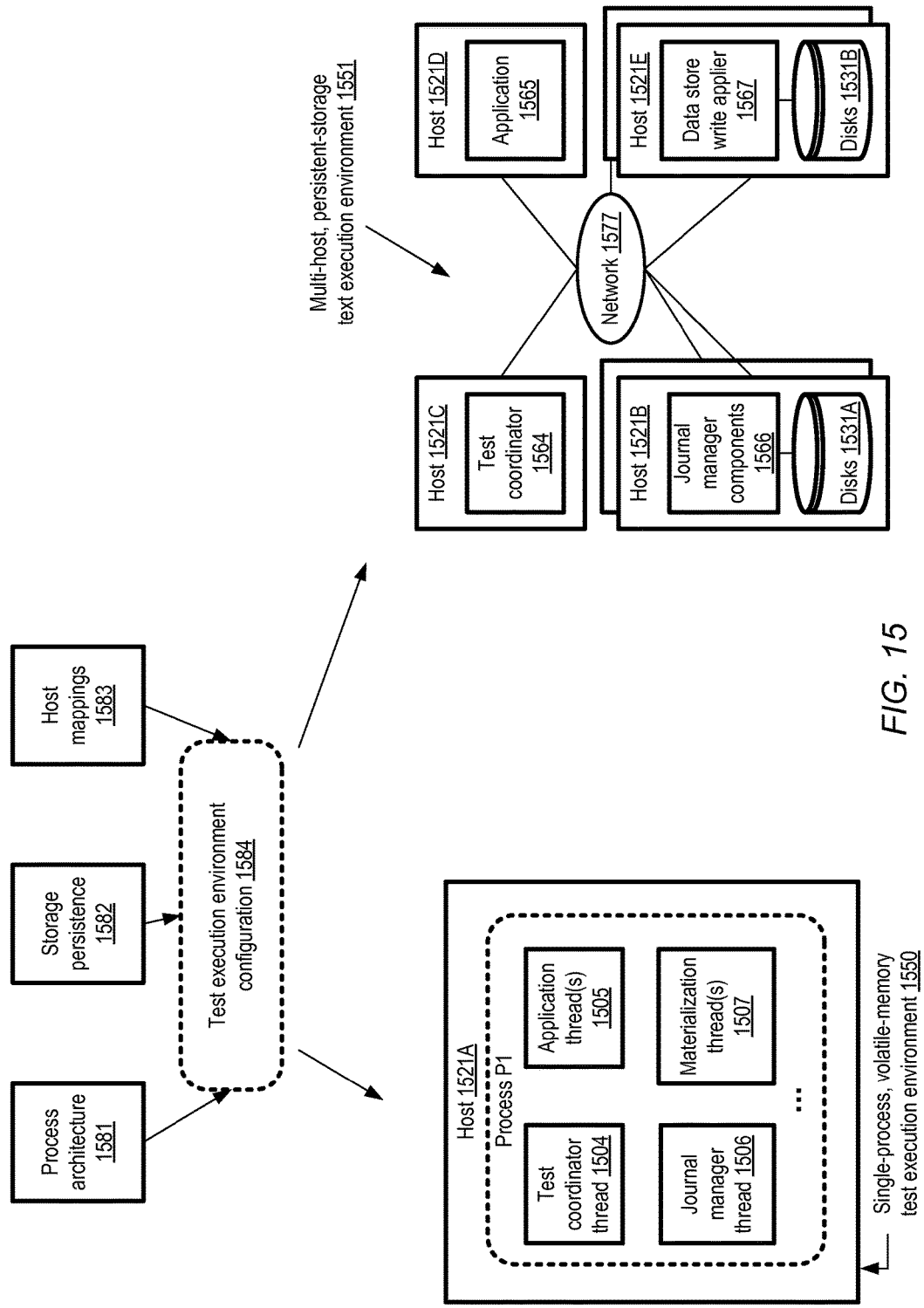
FIG. 15 illustrates example test execution environments which may be employed for a journal-based storage system, according to at least some embodiments.

FIG. 15 illustrates example test execution environments which may be employed for a journal-based storage system, according to at least some embodiments. Several different kinds of decisions may have to be made regarding the manner in which various tested components are implemented. For example, various options regarding the process/thread architecture 1581 to be employed, the desired persistence level of the memory or storage devices 1582, and/or the mappings between computer hosts and the components may be available. A fairly wide spectrum of execution environment configurations 1584 may be available in some embodiments.

At one end of the spectrum, referred to in FIG. 15 as a single-process, volatile-memory test execution environment 1550, the various test components may be implemented as respective threads of execution within one process P1 running at a particular host 1521. Thus, process P1 may include one or more test coordinator threads 1504, one or more application threads 1505 representing the logic of the application under test, one or more journal manager threads 1506, and one or more materialization-related threads 1507 (e.g., threads representing write appliers and/or data store managers). The journal entries as well as the materialized data may all be stored in volatile memory in environment 1550—that is, the destinations representing the data stores to which the write appliers propagate their writes may be implemented as data structures within volatile memory. In contrast, in multi-host, persistent-storage execution environment 1551, a plurality of hosts connected via a network 1577 may be used. One or more processes of test coordinator 1564 may be run at host 1521C, journal manager components 1566 may be run at host 1521B, processes representing the application under test 1565 may be run at host 1521D, and write appliers for various data stores may be run at respective hosts 1521E. The journal entries may be stored at persistent storage devices such as disks 1531A, and materialized versions of the data objects may be stored at disks 1531B. Fully functional instances of the materialization nodes' data stores (e.g., relational database instances, or non-relational database instances) may be used as the destinations for write appliers in some text execution environments. In at least one embodiment, a replicated DAG similar to that shown in FIG. 5 may be employed for the journal in a test execution environment. A given test descriptor may be used to run tests in several different execution environments in some embodiments. For example, depending on the resources and time available for testing, the application may first be tested in a single-process environment similar to environment 1550. If any application flaws are identified in the relatively simple single-process environment, they may be resolved. The modified application may later be tested, e.g., using the same event sequences, in a multi-host environment which may be similar to the production environment for which the application was designed.

FIG. 16 illustrates example control messages which may be used to schedule operations at a journal-based storage system, according to at least some embodiments. Three types of control messages for scheduling events associated with write appliers are shown—a synchronize message, a pause message, and a resume message. In at least some embodiments, the event scheduling control mechanisms 1391 available to a test coordinator 1604 may include other message types as well, such as messages for scheduling transaction submissions or journal managers' commit analyses.

The test coordinator 1604 may send a "sync-to-CSN(k)" control message 1605 to a write applier 1606 to cause the write applier to propagate the writes of all the committed transaction entries 1627 with commit sequence numbers (CSNs) less than or equal to K in the depicted embodiment, while the states of remaining components of the test environment remain frozen or unchanged in at least some embodiments. The write applier's cursor 1666 onto the journal may be moved from its current position (at the journal entry 1627A) to the entry with CSN k as a result of message 1605. No new transaction requests may be submitted during the time it takes the write applier to apply the writes of the entries 1627A-1627P, and no new committed transaction entries may be added to the journal 1608. A "pause" control message 1615 sent by test coordinator 1604 may result in the suspension or deferral of the receiving write applier 1606's activities—that is, the cursor 1666 of the write applier may remain at its present position (corresponding to CSN j in the example shown) in the journal, and further write propagation may be deferred, until a "sync-to-CSN" message 1605 or a "resume" message 1625 is received. In response to a resume control message 1625, the write applier 1606 may start analyzing the entries added to the journal at and/or after the most recently-examined entry as of the time that the pause control message was received, and write propagation for the subsequent entries (e.g., entries with CSNs j through p) may be resumed.

Figure 17:
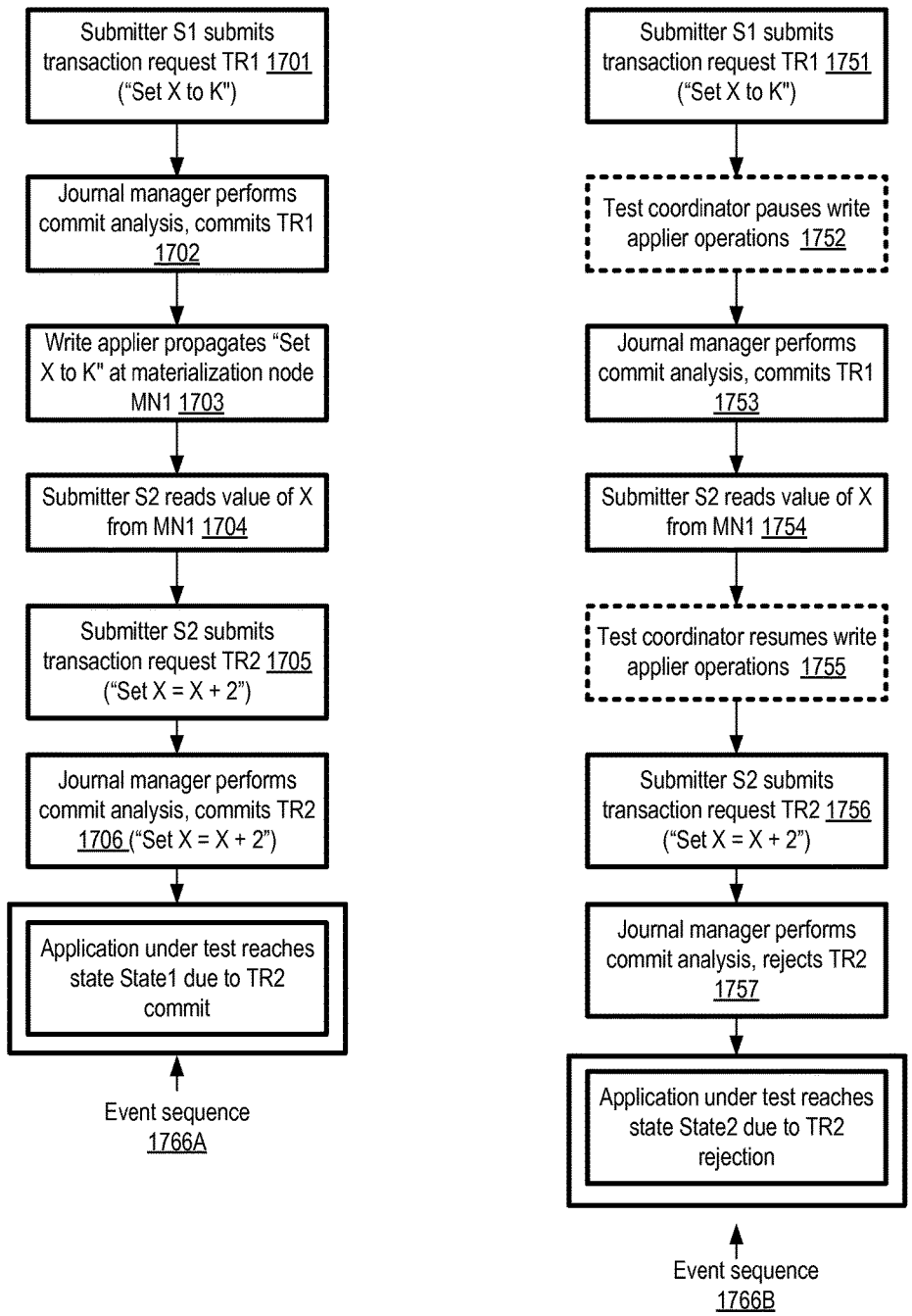
FIG. 17 illustrates examples of event sequences which may be used for testing applications of a journal-based storage system, according to at least some embodiments.

FIG. 17 illustrates examples of event sequences which may be used for testing applications of a journal-based storage system, according to at least some embodiments. As a result of the use of write applier-related control mechanisms by the test coordinator in one of the two event sequences shown (1766B), a particular transaction request is rejected in one of the event sequences, while a very similar transaction request is accepted for commit in the other event sequence. As a result, the test coordinator is able to evaluate the correctness of the response of the application under test to the two different outcomes with respect to that transaction request.

Event sequence 1766A begins with event 1701, in which a transaction submitter S1 prepares and submits a transaction request TR1 to the journal manager of the storage system. TR1 includes a proposed write to set the value of a data object X to X1 ("Set X to K"). The journal manager performs commit analysis with respect to TR1, and TR1 gets accepted for commit in event 1702. A journal entry representing the commit of TR1, and including the write setting the value of X to K is added to the journal. In event 1703, a write applier reads the journal entry corresponding to TR1 and propagates the write to a materialization node MN1. As a result, the value K is stored for data object X at the materialization node. A different transaction submitter S2 then reads the materialized value of X (i.e., K) from MN1 (event 1704). In event 1705, S2 then prepares and submits a transaction request TR2 which includes a proposed write to increase the value of X by 2 ("Set X=X+2"). TR2 may also indicate a read set which includes data object X, and a conflict check delimiter indicating the committed state of the database as represented at MN 1 at the time the contents of the read set were obtained from MN1. Using the read set and the conflict check delimiter for its commit analysis, the journal manager accepts TR2 for commit in event 1706. As a result of TR2's commit, the application under test reaches a particular state State1 (which may be indicated by a log message indicating the value which X has reached (K+2), for example).

Event sequence 1766B begins with an event 1751 (the submission of TR1, with a proposed write to set the value of X to K) which is equivalent to event 1701 of event sequence 1766A. In the next event 1752, the test coordinator uses its control mechanisms to pause the write applier. TR1's commit analysis is performed in event 1753, and TR1 is committed. Because the write applier operations are suspended, the new value of X is not materialized at MN1 at this point in event sequence 1766B. Transaction submitter S2 reads the value of X from MN1 in event 1754, and obtains the pre-TR1 value of X. The test coordinator resumes the operations of the write applier in event 1756. Submitter S2 prepares transaction request TR2 with a proposed write to add 2 to X, and submits TR2 to the journal manager in event 1756. This time, the journal manager's commit analysis indicates that the commit of TR1 conflicts with TR2, so TR2 is rejected in event 1757. The application under test reaches a different state State2, associated with the rejection of TR2, at the end of event sequence 1766B than it did at the end of event sequence 1766A.

Figure 18:
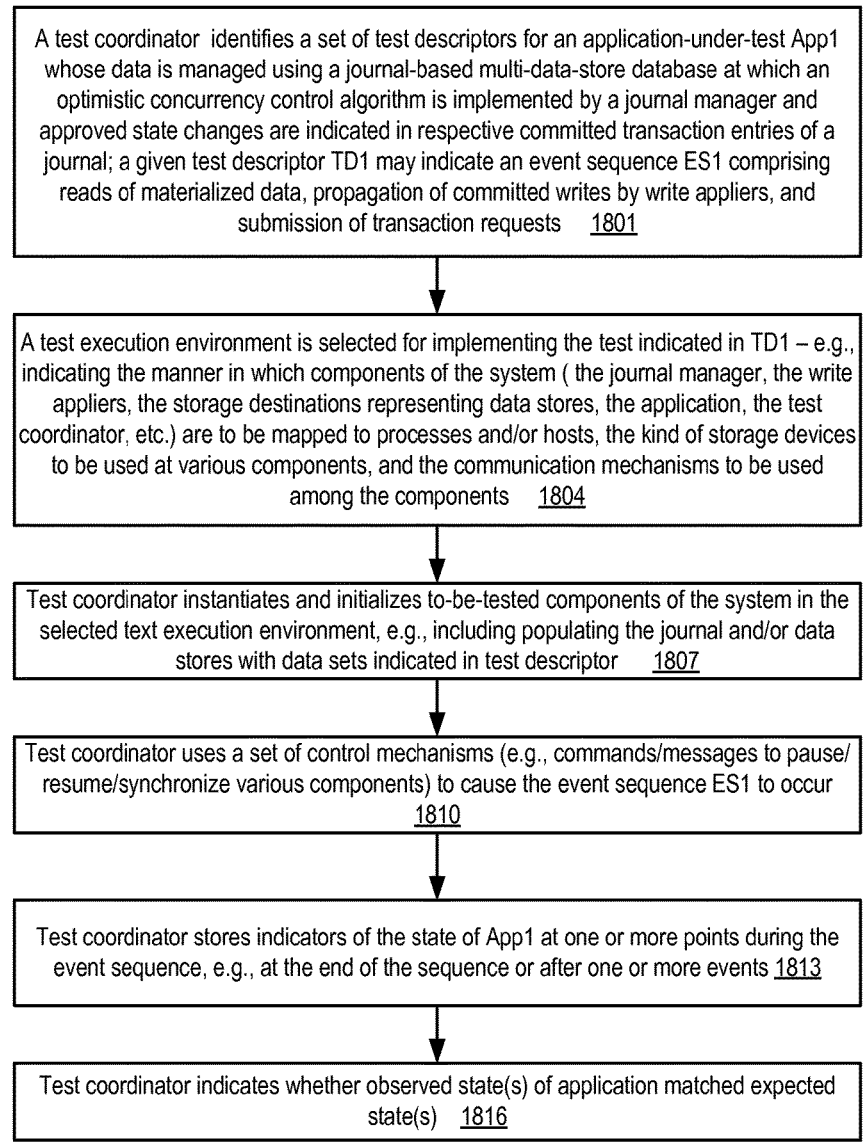
FIG. 18 is a flow diagram illustrating aspects of operations that may be performed by a test coordinator of an application which utilizes a journal-based multi-data-store storage system, according to at least some embodiments.

FIG. 18 is a flow diagram illustrating aspects of operations that may be performed by a test coordinator of an application which utilizes a journal-based multi-data-store storage system, according to at least some embodiments. An optimistic concurrency control protocol may be used for commit decisions by a journal manager of the storage system as described above, with respective committed transaction entries (containing respective sequence numbers) appended to the journal for each transaction request accepted for commit. As shown in element 1801, the test coordinator identifies one or more test descriptors to test the correctness of the responses of the application with respect to various transaction processing events. A given test descriptor TD1 may include, among other elements, an event sequence consisting of some combination of reads of materialized data objects, propagation of committed writes by write appliers to one or more data stores at respective materialization nodes, and submissions of transaction requests to a journal manager.

A test execution environment may be selected by the test coordinator for implementing the events indicated in TD1 (element 1804). The choices to be made regarding the test execution environment may include the mappings of the tested components (e.g., a test version of the application, the journal manager, write appliers, transaction submitters and the like) to processes or threads, the kind of storage or memory devices to be used for the journal entries and/or the materialized data, the number of computer hosts to be used, how the components are to communicate, and so on. The test coordinator may then instantiate and initialize the state of the various components to be tested (element 1807). The initialization may include, for example, populating the journal with a set of entries indicated in the test descriptor TD1, populating the data stores with a set of data objects indicated in the test descriptor, and so on.

The test coordinator may then use a set of control mechanisms (such as messages which can be used to pause, restart or synchronize operations at each of the tested components) to cause the sequence of events indicated in TD1 to occur in the selected test execution environment (element 1810). The coordinator may collect information (e.g., contents of internal data structures of the application, messages logged by the application, etc.) indicating a state reached by the application at various points during, and/or at the end of, the event sequence in the depicted embodiment (element 1813). In at least some embodiments in which the test descriptor TD1 indicates one or more expected states of the application (e.g., respective intermediate expected states at points during the event sequence, and an end state expected after the event sequence completes), the test coordinator may indicate whether the expected states were actually observed with respect to the test execution (element 1816).

Alternative Materialization Strategies

In some cases, a given set of committed transaction entries of a journal-based database may be used by a number of different applications with respective distinct requirements regarding the way the data is to be analyzed or manipulated. For example, in a relational database, the contents of a given table may typically represent only the most-recent changes applied to each record or row, and some applications may be designed to analyze such latest-updates-only versions of the data from materialization nodes. Overwriting a record in place may thus represent one common materialization strategy. In a journal-based database, all the state changes that have occurred to each of the rows or records of the table over time are preserved, so it may also be possible to store respective timestamped representations of each of the state changes, instead of overwriting the records or rows in place. For an application designed for temporal analysis (e.g., to identify trends in the way various attribute values are changed, or to detect the rates at which different parts of the data change), a materialization strategy that indicates timestamps for respective state changes may be more appropriate. In at least some cases, different materialization strategies may enable support for respective types of queries or query interfaces (e.g., a time-series query interface may be implemented in the case of the time-stamped-version materialization strategy, which may be hard to do using the latest-updates-only materialization strategy). In some cases, different materialization strategies may result in respective sets of attributes being stored.

Figure 19:
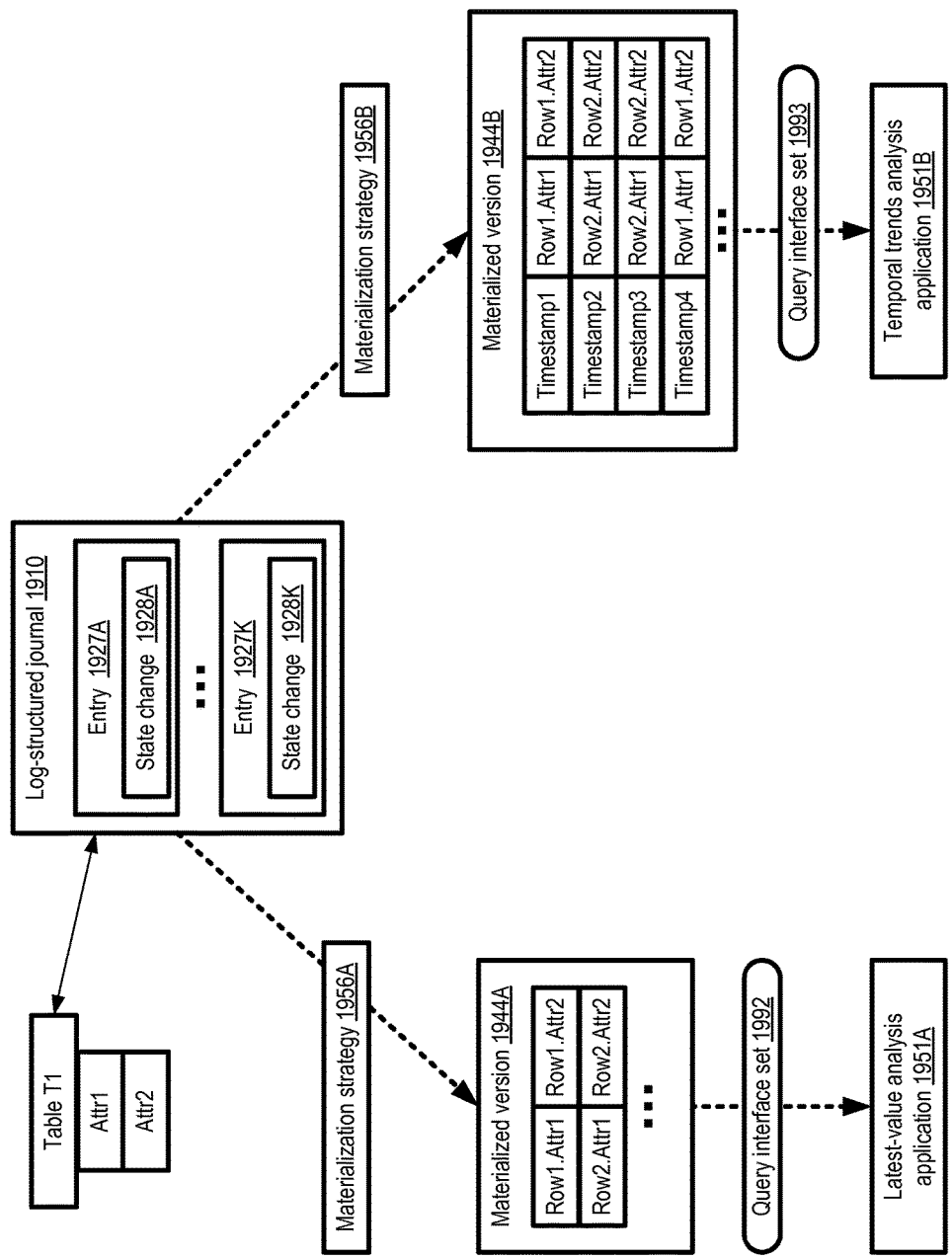
FIG. 19 illustrates an example of alternative materialization strategies which may be applied to a set of committed transaction entries of a journal-based multi-data-store storage system to meet the needs of different applications, according to at least some embodiments.

FIG. 19 illustrates an example of alternative materialization strategies which may be applied to a set of committed transaction entries of a journal-based multi-data-store storage system to meet the needs of different applications, according to at least some embodiments. Log-structured journal 1910 includes a plurality of committed transaction entries 1927, such as entry 1927A and entry 1927K. Each entry indicates one or more state changes (e.g., state changes 1928A and 1928K in entries 1927A and 1927K respectively) of with a database which includes a table T1 with two attributes Attr1 and Attr2. In at least some embodiments, the attributes of table T1 and their respective data types may be defined in a journal schema of the kind discussed earlier. Several different types of applications which access and manipulate the contents of Table T1 may be developed at the storage system over time in the depicted embodiment. At any given point in time, for example, application 1951A may analyze only the current values of the various rows or records of table T1, while application 1951B may be designed to analyze trends in the state changes affecting the records or rows of table T1.

In the embodiment depicted in FIG. 19, respective materialization strategies 1956A and 1956B respectively suited to the needs of two kinds of applications 1951A and 1951B may be employed to generate two different materialized versions (1944A and 1944B) of the same set of underlying state changes 1928 represented by the committed transaction entries 1927. In materialization version 1944A, which may be stored at a particular data store at one materialization node, changes to pre-existing rows of table T1 may be applied in place. If a particular state change 1927 results in a new value of Row1.Attr1, for example, the previous value of Row1.Attr1 may be overwritten in materialized version 1944A. An application such as 1951A may access the current versions of the rows via query interface set 1992, but an application such as 1951B may not be able to track the history of changes to the data using materialized version 1944A alone. In contrast, as part of materialization strategy 1956B, each change to the content of Table T1 is represented by a respective row of materialized version 1944B, which contains a timestamp attribute value (e.g., Timestamp1, Timestamp2, etc.) in addition to the values of Attr1 and Attr2. For example, changes to Row1 over some time period are represented in FIG. 19 by two rows: one with Timestamp1 and another with Timestamp4. Similarly, changes to Row2 are represented by the rows with Timestamp2 and Timestamp3. In some implementations, logical timestamp values (e.g., similar to, or based on, commit sequence numbers assigned by the journal manager to the corresponding committed transaction entry) may be used, while in other implementations the timestamp values may be derived from wall clock values (e.g., the materialization node's wall clock time at which the corresponding row is stored, or the journal manager's wall clock time when the corresponding journal entry is read from or appended to the journal).

The timestamp attributes shown in materialized version 1944B may be considered one example of supplemental or derived attributes, which may be used to indicate relationships (e.g., sequencing or temporal relationships, logical relationships such as parent-child or peer-peer relationships, etc.) among table rows or other data objects. Query interface set 1993 may provide support for temporal or timestamp-based queries (such as queries logically equivalent to "list all the changes to Row1 which occurred in the interval between Timestamp-k and Timestamp-l" or "how many changes to Row2 occurred, on average, for each change to Row1?"), which may be better suited for application 1951B's operations than the query interface set 1992. Of course, an application such as 1951A, which is interested only in the results of the most recent state changes, may also be able to utilize query interface set 1993 in the depicted embodiment, although it may be simpler for application 1951A to use the queries 1992 supported by materialized version 1944A. The total amount of storage space used to represent the same underlying set of state changes may differ for different materialization strategies in some cases. For example, the total number of rows stored at the data store used for materialized version 1944B may at least in some cases be higher than the number of rows used for materialized version 1944A, and the size of each row may also be larger in materialized version 1944B due to the inclusion of the supplemental/derived timestamp value. In at least some embodiments, different materialization strategies may be employed for different time periods, depending for example on the lifespans of the corresponding applications. For example, while materialization strategy 1956A of FIG. 19 may be applied continuously as newly committed transaction entries are appended to the journal 1910, materialization strategy 1956B may be applied to sub-groups of the entries at a time (e.g., to all the entries appended in a given hour). In at least some embodiments, the execution of a particular materialization strategy may include applying a transformation function to at least a portion of the state change information indicated in a committed transaction entry.

Figure 20:
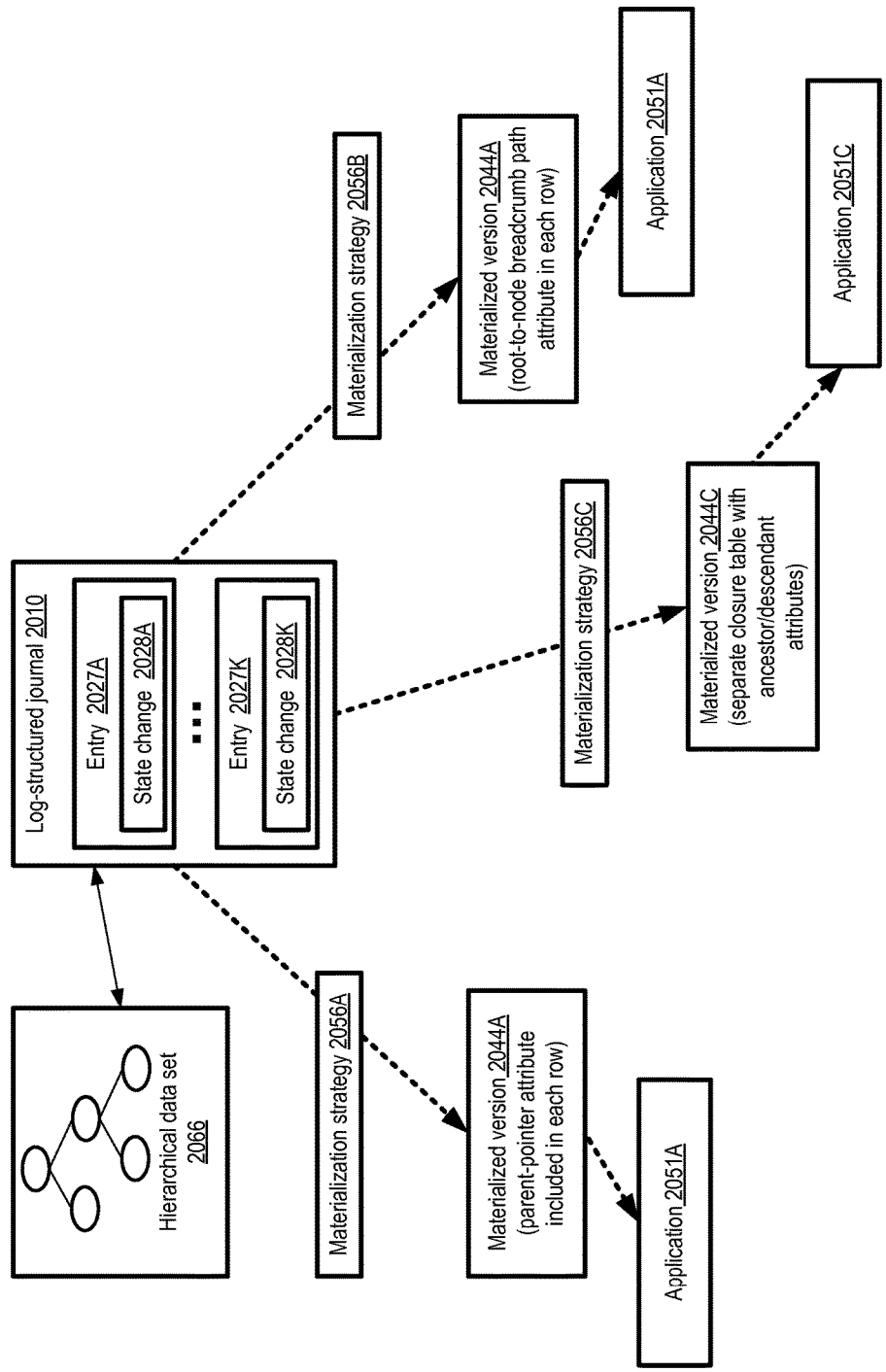
FIG. 20 illustrates an example of alternative materialization strategies which may be used for representing hierarchical data managed using a journal-based multi-data-store storage system, according to at least some embodiments.

FIG. 20 illustrates an example of alternative materialization strategies which may be used for representing hierarchical data managed using a journal-based multi-data-store storage system, according to at least some embodiments. The elements of data set 2066 may be logically related to one another via parent-child relationships similar to the relationships between the nodes of a tree data structure, for example. Respective sets of committed state changes 2028 (e.g., 2028A, 2028B) to the records may be indicated in committed transaction entries 2027 (e.g., 2027A, 2027B) which are inserted into a log-structured journal 2010 by a journal manager implementing an optimistic concurrency control algorithm similar to that described earlier (e.g., in the context of FIG. 2 and FIG. 3).

The hierarchical relationships between the elements of data set 2066 may be materialized in at least three different ways in the depicted embodiment. Using materialization strategy 2056A, selected based on the needs of application 2051A, each data element may be stored in materialized version 2044A as a respective table row which includes a parent-pointer attribute (e.g., indicating the primary key of the parent data element). For example, if each data element has a primary key "ID", an attribute "parentID" may be added, which contains the ID of the parent element for those elements which have parents. In materialization strategy 2056B, in contrast, a separate closure table in which each row comprises an ancestor attribute and a descendant attribute may be created in the materialized version 2044B, in addition to the table(s) used for data element contents. The closure table may also be termed a bridge table in some embodiments. In materialized version 2044B, if a row with a primary key value "Model1210" represents a child entity of a row with primary key "Model1200", the closure table or bridge table may include a row {ancestor="Model1200", descendant="Model1210" } to indicate the parent-child relationship. If "Model1210" is the parent of another element "Model1220", the closure table may also include respective rows {ancestor="Model1200", descendant="Model1220" } and {ancestor="Model1210", descendant="Model1220" } in various implementations. In a third approach, represented by materialization strategy 2056C, each row of the materialized version 2044C may include a root-to-current-node path indicating all the other elements that would lie between the root node of a tree structure representing the data set 2066, and the particular node represented by the row. For example, if "Model1200" represented the root in the above example, the row for representing "Model1200" may include a null "root-to-current-node path" attribute, the row used for representing "Model1210" may include a "root-to-current-node path" value of "Model1200", and the row used for representing "Model1220" may include a "root-to-current-node path" value set to "Model 1200/Model1210".

Each of the different materialization strategies 2056A-2056C may be selected for implementation based on the respective requirements of applications 2051A-2051C. For example, some materialization strategies may be better suited to extremely deep trees, while others may be better suited to bushy but shallow trees. Some materialization strategies may perform better under heavy update workloads, while others may provide better performance for read-mostly workloads. Because the architecture of a journal-based database separates the storage of the state changes (which are recorded in persistent and durable journal entries) from the manner in which those state changes are manifested at the data stores of respective materialization nodes, it may become much easier to implement materialization strategies that meet application-specific and/or workload-specific requirements.

Figure 21:
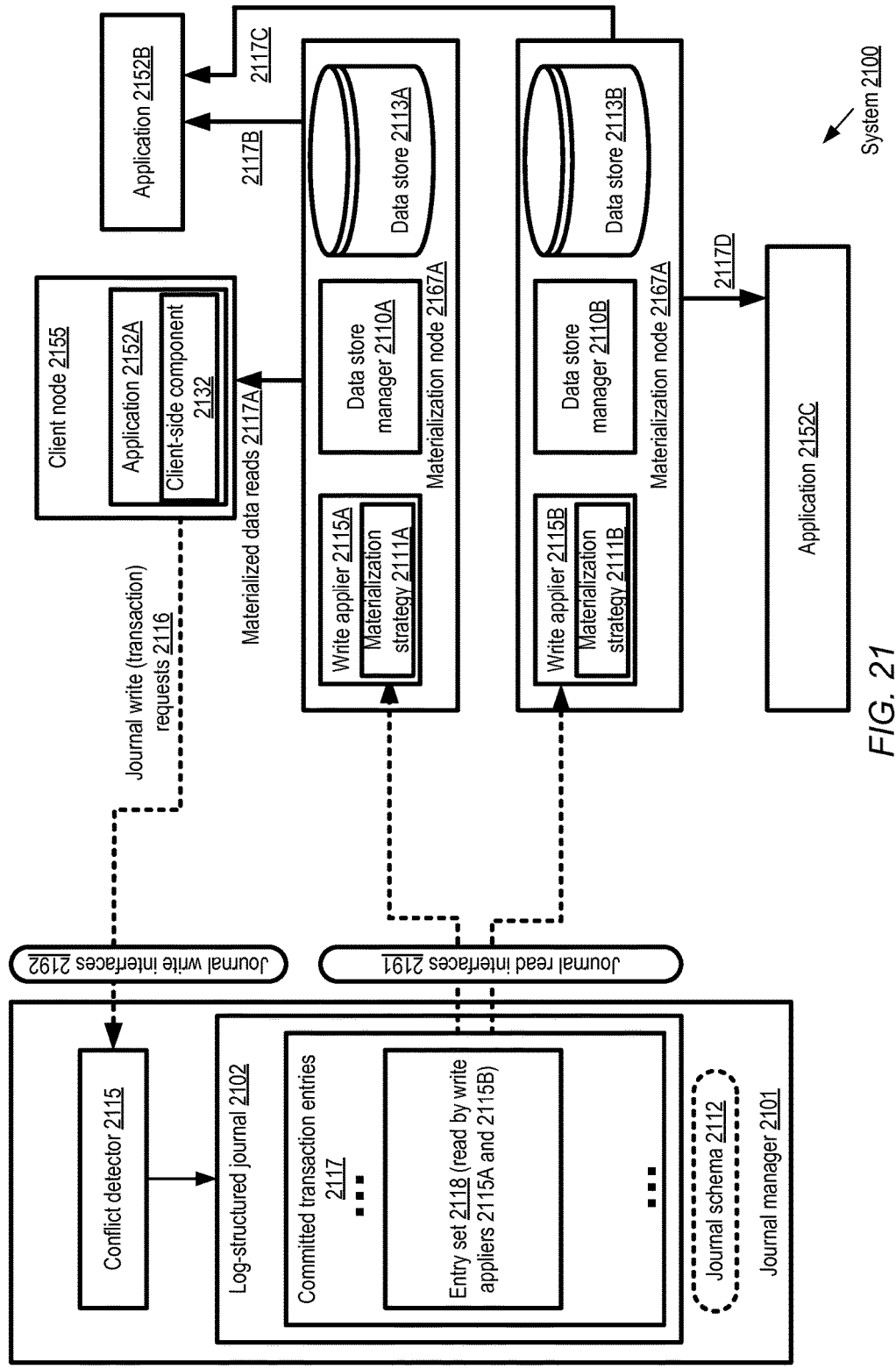
FIG. 21 illustrates an example system environment in which a variety of materialization strategies may be used for data managed using journal-based storage systems, according to at least some embodiments.

FIG. 21 illustrates an example system environment in which a variety of materialization strategies may be employed for data managed using journal-based storage systems, according to at least some embodiments. System 2100 comprises a journal manager 2101 responsible for implementing an optimistic concurrency control protocol to determine whether transaction requests are to be accepted for commit. Transaction submitters, such as client-side components 2132 of the storage system, may submit transaction requests 2116 expressed in a data-store-independent transaction language to the journal manager 2101 via a set of programmatic write interfaces 2192 in the depicted embodiment. The transaction language may be specified in a journal schema 2112 which governs various aspects of the operations of the storage system, such as the data objects (e.g., tables) managed using the storage system, attribute definitions, attribute data types or allowed value ranges, and the like.

A transaction request 2116 may include, among other elements such as those shown in FIG. 2, one or more proposed state changes or writes (e.g., in the form of a write set descriptor and a write payload), a set of reads on which the proposed writes depend (e.g., in the form of a read set descriptor), and a conflict check delimiter (e.g., a commit sequence number) indicative of the state of the storage system from which the reads were obtained. A conflict detector 2115 may check for possible read-write conflicts with respect to the transaction request 2116, using techniques similar to those discussed above in the context of FIG. 3. For example, the conflict detector 2215 may use the conflict check delimiter to identify a subset of committed transaction entries 2117 representing writes which have been committed since the reads of the transaction request were performed, and determine whether the write sets of the committed transaction entries overlap with the read set of the transaction request. If no conflicts are detected, a new committed transaction entry (which may comprise various elements of the transaction request, including information pertaining to the approved state changes such as the write set descriptor, the write payload, etc.) may be appended to the journal 2102. Each committed transaction entry may include a commit sequence number indicating the order in which the corresponding transaction request was processed by the journal manager, relative to other transaction requests. The journal entries 2117 may thus collectively represent a state machine of the storage system in the depicted embodiment, such that the current state of any particular data object defined in the journal schema at a given point in time can be ascertained by applying state changes indicated in the set of entries which included modifications to the particular data object.

The committed writes indicated in the journal entries 2117 may be applied (e.g., stored at respective storage devices of data stores 2113, such as 2113A or 2113B) according to a number of different materialization strategies at one or more materialization nodes 2167 (e.g., 2167A or 2167B) in the depicted embodiment. Each materialization node 2167 may include a respective data store manager 2110 (e.g., 2110A or 2110B) which implements programmatic read interfaces for data stores 2113, and a respective write applier 2115 (e.g., 2115A or 2115B) in the depicted embodiment. A given write applier 2115 may examine at least some of the committed transaction entries of the journal sequentially, extract the relevant subset of state change information from the examined entries, and generate the representations of the state changes which are to be materialized at the data stores 2113 in view of the particular materialization strategy 2111 (e.g., 2111A or 2111B) being used. For example, given an identical collection of journal entries such as entry set 2118 as input (e.g., using journal read interfaces 2191), the write appliers 2115A and 2115B may generate and store different materialized versions representing the state changes recorded in the entry set at the devices of data stores 2113A and 2113 respectively. The data objects (e.g., table rows if the relational data model is being used) of data store 2113A may be overwritten in place, for example, while time-stamped records of the state changes may be stored in data store 2113B without overwriting earlier timestamped records. Or, if a data set indicated in the journal schema 2112 consists of hierarchically-related objects, one materialized version of the data set at materialization node 2167A may include parent pointers, while another materialized version at node 2167B may include closure tables.

Generally speaking, a number of different applications may access and manipulate the data of the storage system 2100, e.g., via the journal write interfaces 2192 (as in the case of application 2152A at client node 2155, which comprises the transaction-submitting client-side component 2132), and/or via the materialized read interfaces supported by the data store managers 2110. Application 2152A reads materialized data from node 2167A (as indicated by arrow 2117A), application 2152C reads materialized data from node 2167B (as indicated by arrows 2117D), while application 2152B reads materialized data from both nodes 2167A and 2167B (as indicated by arrows 2117B and 2217C in the depicted embodiment). Thus, a given application may read materialized versions of the data from any of one or more materialization nodes if needed.

In at least some embodiments, two materialized versions MV1 and MV2 of the same set of committed state changes (e.g., the changes indicated in entry set 2118) may differ from one another in various ways. For example, MV1 may store values of a different set of attributes with respect to the rows of a given table (e.g., Attr1 and Attr2) than MV2 (e.g., Timestamp, Attr1, and Attr2). Some of the attributes materialized in a given version may not be indicated in the journal schema, but may instead be derived or computed based on the requirements of a particular application. One version MV1 may store the result of a transformation operation indicated in the corresponding materialization strategy, while the other version MV2 may store values which are obtained without applying the transformation function. MV1 may be maintained and updated for a different time period than MV2—e.g., some materialized versions may only be retained for the duration of an application process which performs a particular analysis. In some embodiments, different types of storage or memory devices may be used for different materialization strategies—e.g., MV1 may be stored in volatile memory, while MV2 may be stored on redundant arrays of independent disks (RAID) devices using magnetic rotating disks. The times at which the different materialized versions MV1 and MV2 are generated from the same underlying journal entry set 2218 may differ in some embodiments—e.g., MV1 may be created very shortly after the journal entries are appended, while MV2 may be created weeks later. The decoupling of the storage of state change information in a durable and persistent fashion (in the journal itself, e.g., using replication DAGs of the kind illustrated in FIG. 5) from the materialization step (performed at the materialization nodes) may enable a wide variety of highly customized materialization strategies to be implemented to suit respective needs of diverse applications.

Figure 22:
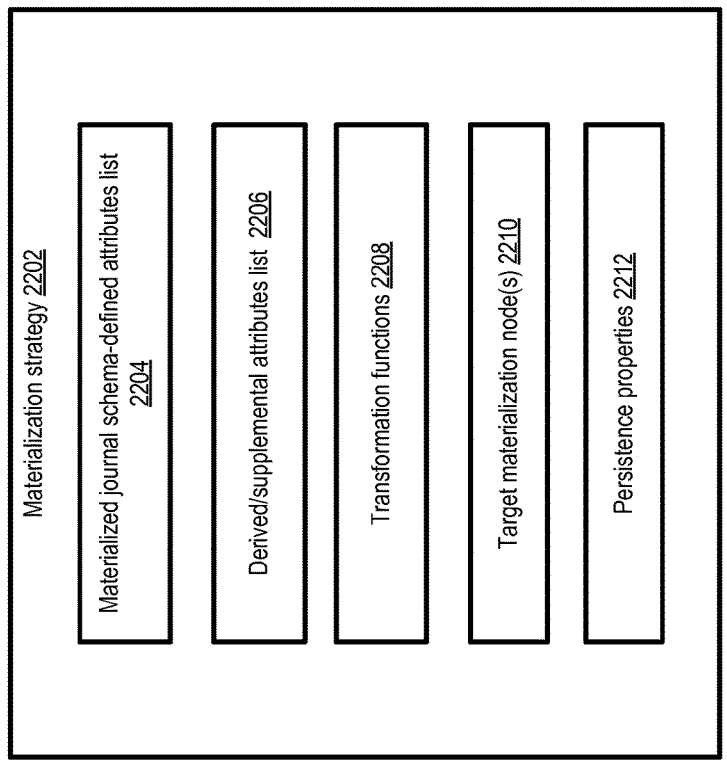
FIG. 22 illustrates examples of elements of a materialization strategy which may be used at a multi-data-store storage system, according to at least some embodiments.

FIG. 22 illustrates examples elements of a materialization strategy which may be used at a multi-data-store storage system, according to at least some embodiments. As shown, a particular materialization strategy 2202 may include a list 2204 of the journal schema-defined attributes which are to be materialized, a list 2206 of derived or supplemental attributes (which may not be defined in the journal schema), an indication of transformation functions 2208 to be applied to one or more of the journal schema-defined attributes, target materialization nodes 2210, and/or desired persistence properties 2212 of the materialized version of the data to be stored at the target materialization nodes.

As mentioned earlier, in at least some embodiments a journal schema may list and specify the data types of the attributes of various data objects whose state is to be managed using the journal. Not all the attributes of all the data objects may need to be materialized to meet the goals of some applications utilizing the storage system. The particular subset of attributes which are (a) defined in the journal schema and (b) to be represented (e.g., with or without applying transformation functions 2208) in the materialized version generated according to the materialization strategy 2202 may be indicated in list 2204. One or more derived or supplemental attributes may be indicated in a different list 2206; such attributes (e.g., timestamps) may be useful in (or required for) responding to queries generated by applications using the materialized version. In some cases, instead of storing the values of various attributes of data objects in their raw or original form (e.g., as indicated in the committed transaction entries), the results of transformation functions 2208 applied to the raw values may be stored in the materialized version governed by the strategy 2202. In some embodiments, simple transformation functions (such as the conversion of measurements to metric units) may be used, while in other embodiments, more complex functions (such as mappings of numerical values to a small range of integers using hash functions followed by modulo functions) may be employed. In the depicted embodiment, materialization strategy 2202 may indicate the particular materialization nodes 2210 at which the write appliers implementing the strategy are to store the data. In some embodiments, an indication of the desired persistence properties 2212 of the materialized version may be included in strategy 2202. For example, some materialized versions may be stored in volatile memory, and may be intended to be used for relatively short durations, while other materialized versions may be stored at disk-based persistent storage devices, or at solid-state persistent storage devices. In some embodiments the type of storage or memory devices (e.g., rotating-disk-based vs. solid-state-drive(SSD)-based vs. volatile-memory based) to be used for the materialized data may be indicated in the strategy 2202, e.g., instead of or in addition to persistence properties 2212.

Figure 23:
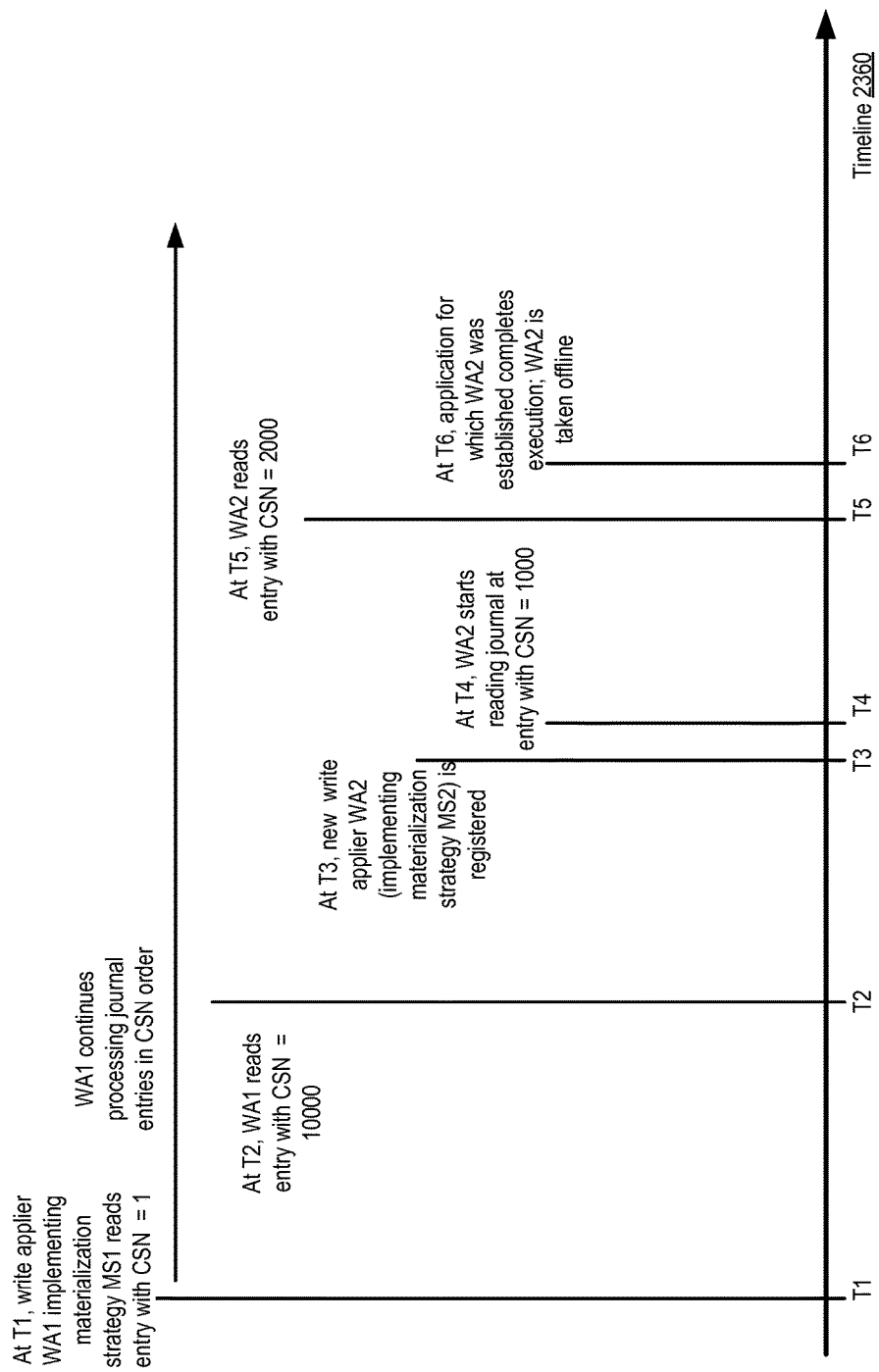
FIG. 23 illustrates an example timeline illustrating short-term materialization of committed transaction entries of a multi-data-store storage system, according to at least some embodiments.

For some applications relying on the journal-based database, materialized versions of groups of the state changes indicated in the journal may only have to be retained temporarily, e.g., for the duration of a particular phase of the application. FIG. 23 illustrates an example timeline illustrating short-term materialization of committed transaction entries of a multi-data-store storage system, according to at least some embodiments. At time T1 on timeline 2360, a write applier WA1 reads a committed transaction entry with a commits sequence number "1", and applies the writes indicated in that entry at WA1's associated data store in accordance with a particular materialization strategy MS1. WA1 processes the entries in sequence number order and materializing the applicable writes at the data store, reaching the entry with sequence number 10000 at time T2.

In the depicted embodiment, programmatic interfaces enabling the registration of new materialization nodes may be implemented, e.g., by the journal manager or by other control plane components of the storage system. Furthermore, materialization strategies which are to be applied to only a subset of journal entries, and may potentially result in ephemeral or short-lived materialized versions of subsets of the storage system's data may be supported. Such materialized versions may be used, for example, to obtain periodic samples of the state changes being committed at the storage system. A new materialization node with a different write applier WA2 configured to implement such a temporary materialization strategy MS2 may be registered at time T3 on timeline 2360. At time T4, WA2 may start reading the journal, e.g., at some selected sequence number such as 1000. WA2 may sequentially examine entries with sequence numbers in the range 1000-2000 in the depicted example, reaching sequence number 2000 at time T5. WA2 may then terminate its examination of the journal entries. At time T6, WA2 may be taken offline, e.g., when an application for which WA2 was established completes execution. As indicated in FIG. 23, different materialization strategies may be executed with respect to the same set of committed transaction entries at different times—for example, WA1 has already completed processing entries with sequence numbers up to 10000 much earlier than WA2 processes entries in the range 1000-2000.

Figure 24:
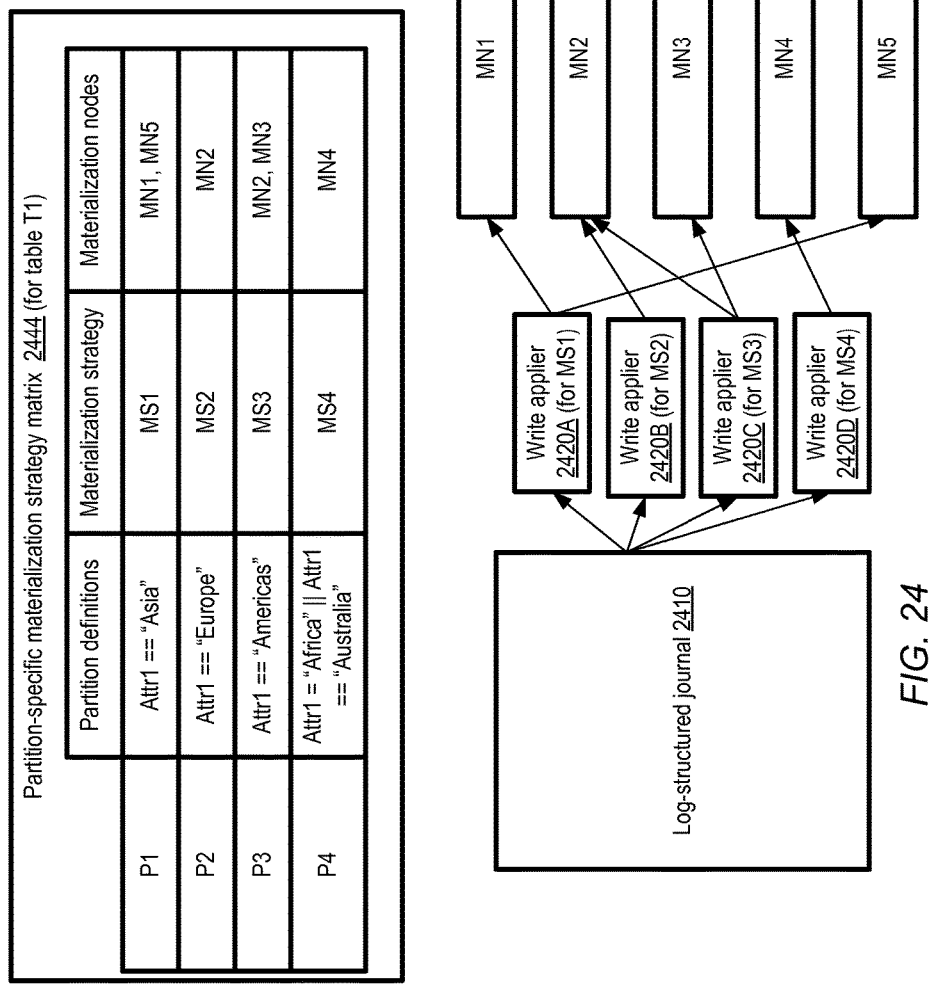
FIG. 24 illustrates examples of the use of different materialization strategies for respective attribute-value based partitions of a database, according to at least some embodiments.

In some embodiments, materialization strategies may be customized for respective subsets of the data objects being managed. For example, consider a table T1 whose primary key consists of the combination of three attributes: "Continent", "Country" and "City". T1 may be logically partitioned into subsets at the continent level, the country level, or the city level, depending on the applications accessing T1, and respective materialization strategies may be employed for the different partitions. For example, if the attributes of T1 includes measurements of areas (e.g., indicators of the sizes of various retail outlets), one materialization strategy may represent the areas (e.g., for T1 rows in a "United States" country-level partition) in units of square feet, while another (e.g., for T1 rows in a "Germany" country-level partition) may represent the areas in square meters. FIG. 24 illustrates examples of the use of different materialization strategies for respective attribute-value based partitions of a database, according to at least some embodiments. As indicated in partition-specific materialization strategy matrix 2444, the data of a table T1 being managed using a log-structured journal 2410 is divided into four partitions P1, P2, P3 and P4 based on the values of an attribute Attr1. Partition P1 comprises T1 rows with Attr1 values of "Asia", P2 comprises rows with Attr1 values of "Europe", P3 comprises rows with Attr1 values of "Americas" and P4 comprises rows with Attr1 values of "Australia" or "Australia". Corresponding to each partition, a respective materialization strategy such as MS1, MS2, MS3 or MS4 is designated, and one or more materialization nodes at which the results of implementing the materialization strategy are indicated. For partition P1, MS1 is to be applied at materialization nodes MN1 and MN5; for partition P2, MS2 is to be applied at materialization node MN2. MS3 is to be applied on partition P3 at nodes MN2 and MN3, while MS4 is to be applied on partition P4 at node MN4.

In the depicted embodiment, write appliers such as 2420A-2420D have been established to implement respective materialization strategies (for respective partitions P1-P4). Some write appliers (such as 2420A, which implements strategy MS1 at for nodes MN1 and MN5, or 2420C, which implements strategy MS3 for nodes MN2 and MN3) may apply writes at several different materialization nodes, while other write appliers such as 2420B and 2420D may apply writes at a single materialization node. As it examines successive entries in sequence number order in the journal 2410, a given write applier 2420 may determine (using the values of Attr1 indicated in the entries) which partition(s) are affected by a given entry. If the given write applier is responsible for materializing the affected partitions, the write applier may generate and store the representations of the state changes indicated in the entry in accordance with the corresponding materialization strategy from matrix 2444. In various embodiments, the mappings between partitions, materialization strategies and materialization nodes need not necessarily be 1:1:1—instead, P partitions may be mapped to S strategies and N nodes, where P, S and N may be selected based on the needs of applications using the storage system. In some embodiments, a 1:1 relationship may exist between materialization nodes and write appliers.

Figure 25:
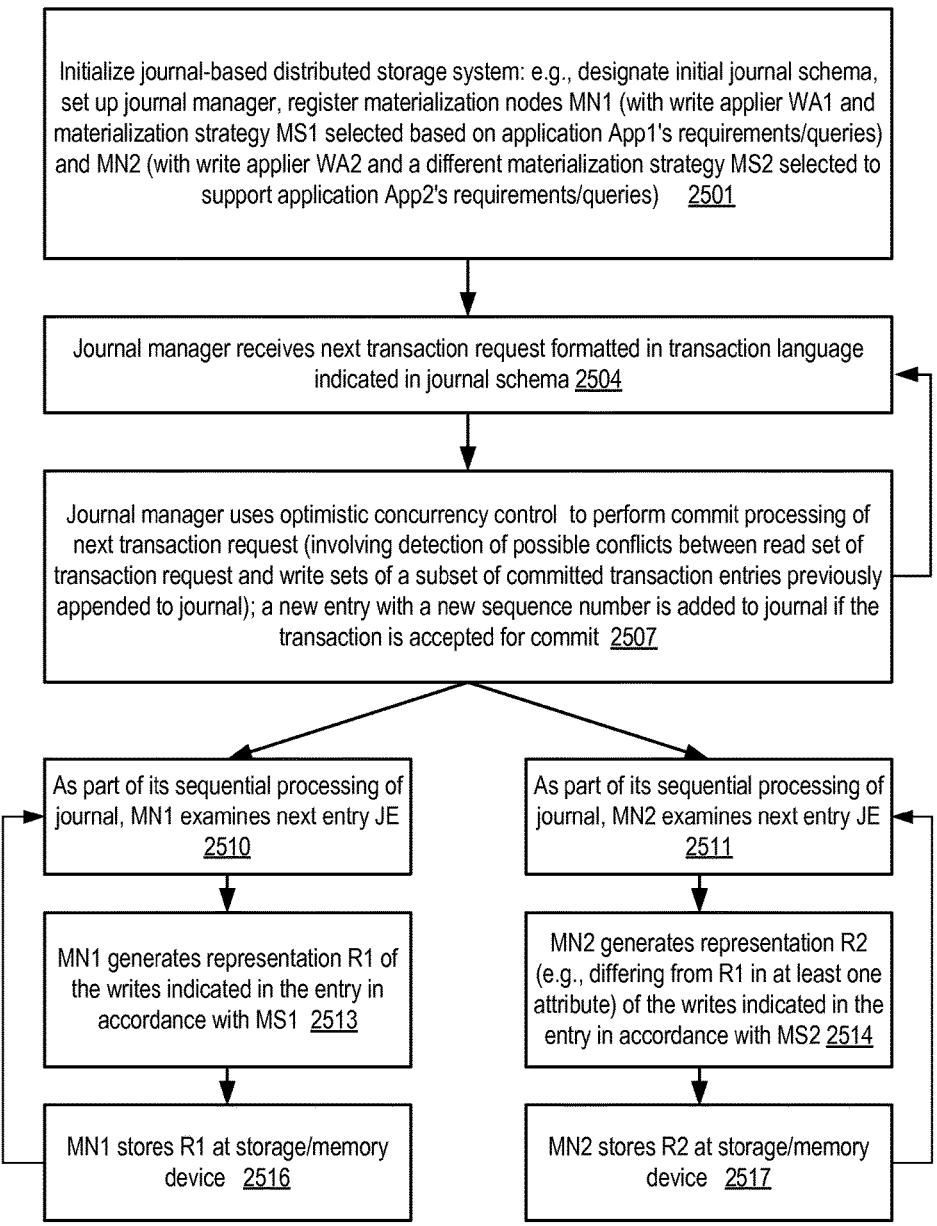
FIG. 25 is a flow diagram illustrating aspects of operations that may be performed at a journal-based multi-datastore storage system at which multiple materialization strategies for a given set of committed transactions are supported, according to at least some embodiments.

FIG. 25 is a flow diagram illustrating aspects of operations that may be performed at a journal-based multi-data-store storage system at which multiple materialization strategies for a given set of committed transactions are supported, according to at least some embodiments. As shown in element 2501, the storage system may be initialized, e.g., by designating an initial journal schema specifying a set of data object attributes and data types, the data-store-independent transaction language to be used, etc. A journal manager may be established to implement an optimistic concurrency control algorithm for submitted transaction requests, and a number of materialization nodes with respective write appliers may be registered at the storage service. A given materialization node in the depicted embodiment may be intended to serve the requirements of at least one application. If the applications differ in the kinds of queries they utilize to access materialized data (e.g., some applications may use temporal or timestamp-based queries, while others may use queries which do not refer to timestamps), different materialization strategies may be implemented at the corresponding materialization node write appliers. For example, materialization strategy MS1 may be implemented to meet App1's requirements at a registered materialization node MN1, while materialization strategy MS2 may be implemented to meet a different set of requirements of App2 at a second registered materialization node MN2 in the depicted embodiment. In at least some embodiments, new materialization nodes (which may implement their own materialization strategies) may be registered programmatically after the storage system has been initialized—e.g., as and when new applications are brought online, the same underlying state change information stored in the journal may be materialized in different ways and/or at different storage devices for the new applications. In some embodiments, the materialization strategies may result in different sets of attributes (e.g., some combinations of attributes defined in the journal schema, derived or supplemental attributes which may not be defined in the journal schema and may represent logical relationships among data objects such as table rows) being stored at the data stores of respective materialization nodes. Materialization strategies may in some cases differ from one another in the particular transformation functions applied on the raw state change information contained in the journal entries to obtain the materialized values in various embodiments, or may differ in whether transformation functions are applied or not. In some cases, different types of storage or memory devices (e.g., volatile memory versus persistent disk-based storage devices) may be employed for respective materialization strategies.

After the storage system is initialized, the journal manager may begin receiving transaction requests formatted in the transaction language specified in the journal schema, e.g., from various client-side components. Each transaction request may include, for example, a read set descriptor indicating portions of data objects that were read during preparation of the request, a write set descriptor and write payload indicating one or more writes or state changes, a conflict check delimiter, and/or other elements similar to those shown in FIG. 2. In response to receiving the next such transaction request (element 2504), the journal manager may perform commit analysis (element 2507) to determine whether the request is to be accepted or rejected. The commit analysis may include, for example, determining whether any of the reads indicated in the read set descriptor of the request may have been affected by a write of a transaction committed after the reads were performed. The conflict check delimiter indicated in the transaction request may be used to select a subset of entries of the journal which indicate the writes that have been committed since the reads were performed, in a manner similar to that shown in FIG. 3. If the transaction request is accepted, a new committed transaction entry corresponding to the request (and incorporating some or all of the elements of the request, including the state changes) may be appended to the journal with a commit sequence number indicative of the order in which the request was processed relative to other requests. If the transaction request is rejected, e.g., due to a read-write conflict, in some implementations the submitter of the request may be informed. The journal manager may then process the next received transaction request, repeating the operations corresponding to element 2504 and 2507.

Respective write applier components of the registered materialization nodes may examine the journal entries in sequence number order, e.g., asynchronously with respect to each other and asynchronously with respect to the operations of the journal manager. When MN1 examines the next entry JE as part of its sequential examination of the journal (element 2510), a first representation R1 of the writes or state changes indicated in JE may be generated according to materialization strategy MS1 (element 2513). That representation may be stored at the storage/memory devices used for MN1's data store (element 2516). When MN2 examines the next entry JE as part of its sequential examination of the journal (element 2511), a different representation R2 of the state changes of JE may be generated in accordance with the materialization strategy MS2 (element 2514), and stored at MN2's storage/memory devices (element 2517). Representation R2 may differ from representation R1 of the same journal entry in at least one attribute (e.g., an attribute which indicates a parent-child relationship, a temporal relationship, or some other relationship between table rows or other data objects) in the depicted embodiment. In other embodiments, the representations may differ in other ways—e.g., a different transformation function may be used to obtain an attribute value included in R2 than is used to obtain the corresponding attribute value in R1, or a different number of tables may be modified in R2 than in R1 (e.g., a closure table may be used for storing hierarchical data in R2, but not in R1), etc. Materialization node MN1 may repeat the operations corresponding to elements 2510, 2513 and 2516 for each entry examined, while materialization node MN2 may repeat the operations corresponding to elements 2511, 2514 and 2517 for each entry examined.

It is noted that in various embodiments, some of the operations shown in the flow diagrams of FIG. 12, FIG. 18 and/or FIG. 25 may be implemented in a different order than that shown in the figure, or may be performed in parallel rather than sequentially. Additionally, some of the operations shown in one or more of the flow diagrams may not be required in one or more implementations.

Use Cases

The techniques and algorithms described above, of implementing performance or contention analysis tools, testing frameworks, and flexible application-specific materialization strategies at journal-based storage systems may be useful in a variety of environments. At many large-scale journal-based databases, very large data sets and high volumes of transaction traffic may be supported. Contention bottlenecks may not be easy to identify without the kinds of insights provided by performance analyzers of the kind described herein. Identifying highly-contended keys may help application owners to redistribute or reorganize data and potentially decrease transaction rejection rates. In addition, identifying portions of the database that are frequently updated may indicate other opportunities for configuration changes, such as partitioning of the database.

Journal-based storage systems of the kind describe herein may typically comprise a number of relatively independently-operating and asynchronous network-linked components, and the network packets transmitted among the components may encounter unpredictable delays. The events influencing the eventual approval or rejection of various transactions (such as write propagations, reads from materialization nodes, and the like) may occur in many different orders in such asynchronous environments. To thoroughly test an application which relies on such a system, a flexible test framework of the kind described herein, in which scheduling controls can impose deterministic event scheduling, may be highly beneficial. Furthermore, such test frameworks may enable testing to be replicated in single-process volatile-memory environments, in which the diverse components of the storage system are all implemented at a single host, which may help to control testing costs.

In some cases, applications with different requirements (e.g., in the kinds of queries they issue to materialized versions of the data) may utilize a journal-based multi-data-store storage system. For example, one application may be intended for temporal analysis of the committed changes indicated in the journal, while another may access only the latest versions of the data objects. Since the journal entries represent the authoritative state of the data in such storage systems, and the process and timing of materialization is separated from the generation and persistent storage of the journal entries, it becomes possible to implement diverse materialization strategies for representing the same set of underlying state changes in different application-specific ways.

Illustrative Computer System

Figure 26:
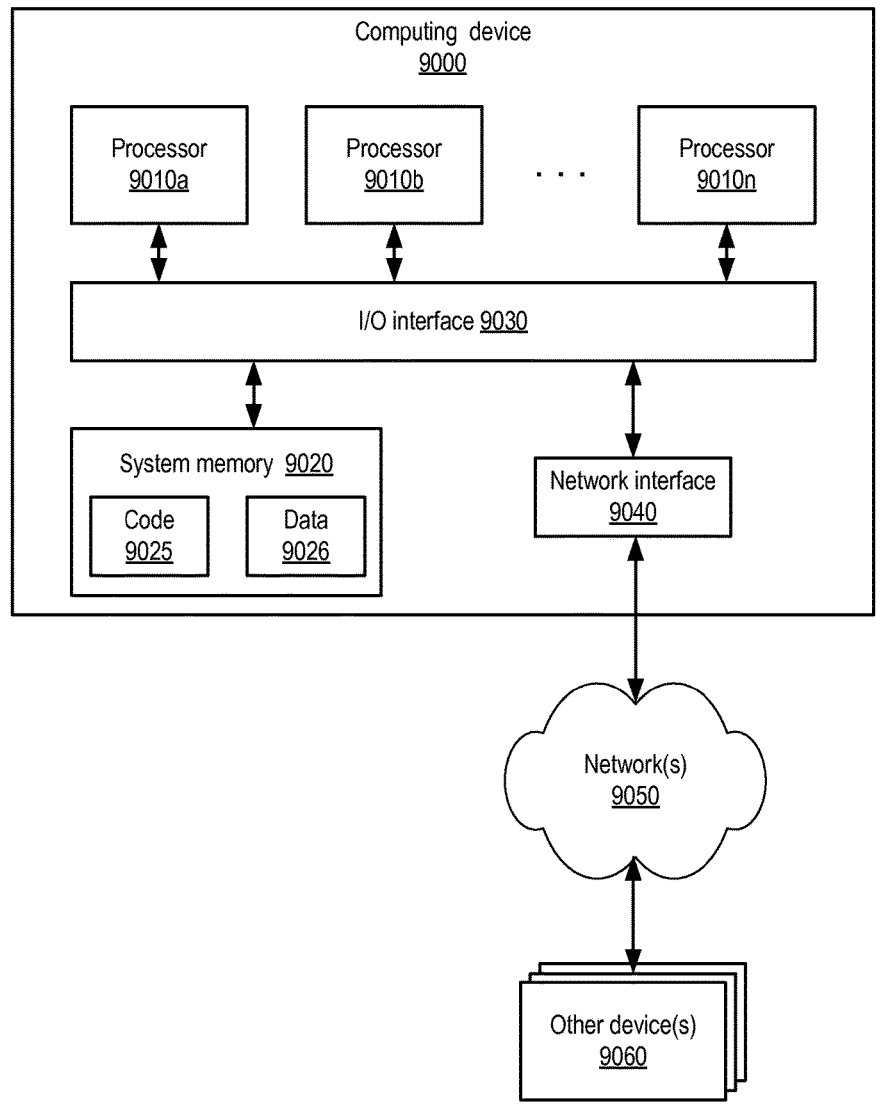
FIG. 26 is a block diagram illustrating an example computing device that may be used in at least some embodiments.

In at least some embodiments, a server that implements one or more of the techniques described above for transaction management, performance/contention analysis, testing, and implementation of alternative materialization strategies at a journal-based multi-data-store storage system (including for example the operations of journal managers, data store managers, client-side components, write appliers, data analytics tools, test coordinators and the like) may include a general-purpose computer system that includes or is configured to access one or more computer-accessible media. FIG. 26 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 25, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 25 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 26 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
 a performance analyzer implemented at one or more computing devices associated with a journal-based multi-data-store database;
 wherein the performance analyzer is configured to:
  obtain, with respect to one or more transaction requests that are rejected in accordance with an optimistic concurrency control protocol by a journal manager of the multi-data-store database, respective rejection cause descriptors, wherein a particular rejection cause descriptor corresponding to a particular transaction request indicates (a) a query predicate associated with a read set of the particular transaction request, wherein a read-write conflict between the read set and a write set of a previously-committed transaction was identified by the journal manager to reject the particular transaction request, and (b) an identifier of a commit record of the previously-committed transaction, wherein the commit record is stored in an entry of a journal of the multi-data-store database;

obtain, corresponding to a plurality of committed transactions for which respective commit records are stored in respective entries of the journal by the journal manager, respective write descriptors indicating data objects modified by the committed transactions;

in response to a first request received via a programmatic interface, transmit a database contention analysis based at least in part on the respective rejection cause descriptors, wherein the analysis comprises one or more workload configuration changes to improve performance of the multi-data-store database; and in response to second request received via a different programmatic interface, transmit a database write distribution analysis based at least in part on the respective write descriptors.

2. The system as recited in claim 1, wherein the query predicate indicates a value of a particular key of a data object of the multi-data-store database, and wherein the database contention analysis indicates a group of one or more keys, including the particular key, for which read-write conflicts were detected by the journal manager.

3. The system as recited in claim 1, wherein the particular rejection cause descriptor includes a value of a particular key of a data object of the multi-data-store database, wherein the data object was modified by the previously-committed transaction, and wherein the database contention analysis indicates a group of one or more keys, including the particular key, for which read-write conflicts were detected by the journal manager.

4. The system as recited in claim 1, wherein the performance analyzer is configured to:

receive an indication, via a programmatic interface, of a time window for which a different database contention analysis is requested; and generate the different database contention analysis using one or more of the respective rejection cause descriptors selected in accordance with the time window.

5. The system as recited in claim 1, wherein the performance analyzer is configured to:

generate, using the respective rejection cause descriptors, a list of data objects of the multi-data-store database, sorted based at least in part on respective contention metrics associated with the data objects; and provide the list to a client.

6. A method, comprising:

performing, by an analytics tool implemented at one or more computing devices associated with a journal-based multi-data-store database:

obtaining, with respect to one or more transaction requests that are rejected in accordance with an optimistic concurrency control protocol by a journal manager of the multi-data-store database, respective rejection cause descriptors, wherein a particular rejection cause descriptor corresponding to a particular transaction request indicates a query predicate associated with a read set of the particular transaction request, wherein a read-write conflict between the read set and a write set of a previously-committed transaction was identified by the journal manager to reject the particular transaction request;

generating a database contention analysis based at least in part on an examination of the respective rejection cause descriptors, wherein the analysis comprises one or more workload configuration changes to improve performance of the multi-data-store database; and transmitting the database contention analysis to a client.

7. The method as recited in claim 6, wherein the particular rejection cause descriptor includes an identifier of a commit record of the previously-committed transaction, wherein the commit record is stored in an entry of a journal of the multi-data-store database.

8. The method as recited in claim 6, wherein the query predicate indicates a value of a key of a data object of the multi-data-store database, and wherein the database contention analysis indicates the key in a group of one or more keys for which contention was detected by the journal manager.

9. The method as recited in claim 6, wherein the particular rejection cause descriptor includes a value of a key of a data object of the multi-data-store database, wherein the data object was modified by the previously-committed transaction, and wherein the database contention analysis indicates the key in a group of one or more keys for which contention was detected by the journal manager.

10. The method as recited in claim 6, further comprising performing, by the analytics tool:

receiving an indication, via a programmatic interface, of a time window for which a different database contention analysis is requested; and generating the different database contention analysis using a subset of the rejection cause descriptors selected in accordance with the time window.

11. The method as recited in claim 6, further comprising performing, by the analytics tool:

generating, using the respective rejection cause descriptors, a list of data objects of the multi-data-store database, sorted based at least in part on respective contention metrics associated with the data objects; and providing the list to a client.

12. The method as recited in claim 6, further comprising performing, by the analytics tool:

initiating a real-time display of representations of one or more data objects for which contention has been detected, wherein contents of the display are based at least in part on the respective rejection cause descriptors.

13. The method as recited in claim 6, further comprising performing, by the analytics tool:

obtaining, corresponding to a plurality of committed transactions for which respective commit records are stored in respective entries of the journal by the journal manager, respective write descriptors indicating data objects modified by the committed transactions;

transmitting a write distribution analysis based at least in part on the respective write descriptors.

14. The method as recited in claim 13, further comprising performing, by the analytics tool:

generating, based at least in part on the write descriptors, a partitioning proposal for the multi-data-store database, wherein the partitioning proposal indicates a data object attribute whose values are to be used to identify respective portions of the multi-data-store database to be materialized at respective materialization nodes; and transmitting the partitioning proposal to a client.

15. The method as recited in claim 6, further comprising performing, by the analytics tool:

determining, with respect to a plurality of transaction requests submitted to the journal manager, including the one or more transaction requests that are rejected, one or more metrics associated with the journal manager, including a first metric which indicates a rate at which transaction requests are processed by the journal manager; and transmitting the one or more metrics to a client.

16. A non-transitory computer-accessible storage medium storing program instructions that when executed on one or more processors implement an analytics tool for a journal-based multi-data-store storage system, wherein the analytics tool is configured to:

obtain, with respect to one or more transaction requests that are rejected in accordance with an optimistic concurrency control protocol by a journal manager of the multi-data-store database, respective rejection cause descriptors, wherein a particular rejection cause descriptor corresponding to a particular transaction request indicates a query predicate associated with a read set of the particular transaction request, wherein a read-write conflict between the read set and a write set of a previously-committed transaction was identified by the journal manager to reject the particular transaction request;

prepare a database contention analysis based at least in part on an examination of the respective rejection cause descriptors, wherein the analysis comprises one or more workload configuration changes to improve performance of the multi-data-store database; and transmit the database contention analysis to a client.

17. The non-transitory computer-accessible storage medium as recited in claim 16, wherein the analytics tool is configured to:

obtain, corresponding to a plurality of committed transactions for which respective commit records are stored in respective entries of the journal by the journal manager, respective write descriptors indicating data objects modified by the committed transactions;

transmit a write distribution analysis based at least in part on the respective write descriptors.

18. The non-transitory computer-accessible storage medium as recited in claim 16, wherein the particular rejection cause descriptor includes an identifier of a commit record of the previously-committed transaction, wherein the commit record is stored in an entry of a journal of the multi-data-store database.

19. The non-transitory computer-accessible storage medium as recited in claim 16, wherein the query predicate indicates a value of a key of a data object of the multi-data-store database, and wherein the database contention analysis indicates the key in a group of one or more keys for which contention was detected by the journal manager.

20. The non-transitory computer-accessible storage medium as recited in claim 16, wherein the particular rejection cause descriptor includes a value of a key of a data object of the multi-data-store database, wherein the data object was modified by the previously-committed transaction, and wherein the database contention analysis indicates the key in a group of one or more keys for which contention was detected by the journal manager.

\* \* \* \* \*